United States Patent
Nixon et al.

(10) Patent No.: US 11,169,651 B2
(45) Date of Patent: *Nov. 9, 2021

(54) METHOD AND APPARATUS FOR CONTROLLING A PROCESS PLANT WITH LOCATION AWARE MOBILE DEVICES

(71) Applicant: FISHER-ROSEMOUNT SYSTEMS, INC., Round Rock, TX (US)

(72) Inventors: Mark J. Nixon, Round Rock, TX (US); Ken J. Beoughter, Round Rock, TX (US); Daniel D. Christensen, Austin, TX (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/879,244

(22) Filed: May 20, 2020

(65) Prior Publication Data

US 2020/0326801 A1 Oct. 15, 2020

Related U.S. Application Data

(63) Continuation of application No. 14/028,897, filed on Sep. 17, 2013, now Pat. No. 10,691,281.
(Continued)

(51) Int. Cl.
*G06F 3/048* (2013.01)
*H04W 4/02* (2018.01)
(Continued)

(52) U.S. Cl.
CPC .............. *G06F 3/048* (2013.01); *G05B 11/01* (2013.01); *G05B 13/02* (2013.01); *G05B 15/02* (2013.01);
(Continued)

(58) Field of Classification Search
CPC ......... G06F 3/048; H04L 67/12; H04L 67/18; G05B 11/01; G05B 15/02; G05B 13/02; H04W 4/02; H04W 4/023
See application file for complete search history.

(56) References Cited

U.S. PATENT DOCUMENTS

| 4,451,047 A | 5/1984 | Herd et al. |
| 4,593,367 A | 6/1986 | Slack et al. |

(Continued)

FOREIGN PATENT DOCUMENTS

| AU | 2010257310 A1 | 7/2012 |
| CN | 1170464 A | 1/1998 |

(Continued)

OTHER PUBLICATIONS

Notice of Reasons for Rejection for Japanese Application No. 2014-048410, dated Jan. 14, 2020.
(Continued)

*Primary Examiner* — Mong-Shune Chung
(74) *Attorney, Agent, or Firm* — Marshall, Gerstein & Borun LLP

(57) ABSTRACT

Methods and apparatus for operating a process plant include multiple user interface devices operable to determine the location of the device in the process plant and to display data related to proximate devices. A processor in a mobile user interface device transmits a first request for data and receives the requested data in response to the request. The processor causes a display to display the received data. The processor receives an indication that the mobile user interface device is in proximity to an external device the processors transmits a second request for data according to the received indication. The processor then receives data in response to the second request.

20 Claims, 23 Drawing Sheets

Related U.S. Application Data

(60) Provisional application No. 61/792,109, filed on Mar. 15, 2013.

(51) Int. Cl.
    *H04L 29/08*     (2006.01)
    *G05B 11/01*     (2006.01)
    *G05B 15/02*     (2006.01)
    *G05B 13/02*     (2006.01)
    *H04L 29/06*     (2006.01)
    *G06F 3/0481*     (2013.01)
    *G06F 3/0484*     (2013.01)

(52) U.S. Cl.
    CPC ...... *G06F 3/04817* (2013.01); *G06F 3/04842* (2013.01); *H04L 67/12* (2013.01); *H04L 67/18* (2013.01); *H04L 67/42* (2013.01); *H04W 4/023* (2013.01); *H04W 4/02* (2013.01)

(56) References Cited

U.S. PATENT DOCUMENTS

| | | |
|---|---|---|
| 4,901,221 A | 2/1990 | Kodosky et al. |
| 4,914,568 A | 4/1990 | Kodosky et al. |
| 5,111,531 A | 5/1992 | Grayson et al. |
| 5,164,897 A | 11/1992 | Clark et al. |
| 5,291,587 A | 3/1994 | Kodosky et al. |
| 5,301,301 A | 4/1994 | Kodosky et al. |
| 5,301,336 A | 4/1994 | Kodosky et al. |
| 5,475,851 A | 12/1995 | Kodosky et al. |
| 5,481,740 A | 1/1996 | Kodosky |
| 5,481,741 A | 1/1996 | McKaskle et al. |
| 5,497,500 A | 3/1996 | Rogers et al. |
| 5,544,320 A | 8/1996 | Konrad |
| 5,568,491 A | 10/1996 | Beal et al. |
| 5,598,572 A | 1/1997 | Tanikoshi et al. |
| 5,610,828 A | 3/1997 | Kodosky et al. |
| 5,652,909 A | 7/1997 | Kodosky |
| D384,050 S | 9/1997 | Kodosky |
| D384,051 S | 9/1997 | Kodosky |
| D384,052 S | 9/1997 | Kodosky |
| D387,750 S | 12/1997 | Kodosky |
| 5,710,723 A | 1/1998 | Hoth et al. |
| 5,732,277 A | 3/1998 | Kodosky et al. |
| 5,734,863 A | 3/1998 | Kodosky et al. |
| 5,737,622 A | 4/1998 | Rogers et al. |
| 5,801,942 A | 9/1998 | Nixon et al. |
| 5,801,946 A | 9/1998 | Nissen et al. |
| 5,821,934 A | 10/1998 | Kodosky et al. |
| 5,828,851 A | 10/1998 | Nixon et al. |
| 5,838,563 A | 11/1998 | Dove et al. |
| 5,856,931 A | 1/1999 | McCasland |
| 5,862,052 A | 1/1999 | Nixon et al. |
| 5,862,054 A | 1/1999 | Li |
| 5,909,368 A | 6/1999 | Nixon et al. |
| 5,917,489 A | 6/1999 | Thurlow et al. |
| 5,940,294 A | 8/1999 | Dove |
| 5,971,747 A | 10/1999 | Lemelson et al. |
| 5,980,078 A | 11/1999 | Krivoshein et al. |
| 5,987,246 A | 11/1999 | Thomsen et al. |
| 5,988,847 A | 11/1999 | McLaughlin et al. |
| 5,990,906 A | 11/1999 | Hudson et al. |
| 5,995,916 A | 11/1999 | Nixon et al. |
| 6,009,422 A | 12/1999 | Ciccarelli |
| 6,032,208 A | 2/2000 | Nixon et al. |
| 6,064,409 A | 5/2000 | Thomsen et al. |
| 6,078,320 A | 6/2000 | Dove et al. |
| 6,098,116 A | 8/2000 | Nixon et al. |
| 6,167,464 A | 12/2000 | Kretschmann |
| 6,173,438 B1 | 1/2001 | Kodosky et al. |
| 6,178,504 B1 | 1/2001 | Fieres et al. |
| 6,195,591 B1 | 2/2001 | Nixon et al. |
| 6,219,628 B1 | 4/2001 | Kodosky et al. |
| 6,266,726 B1 | 7/2001 | Nixon et al. |
| 6,278,374 B1 | 8/2001 | Ganeshan |
| 6,285,966 B1 | 9/2001 | Brown et al. |
| 6,295,513 B1 | 9/2001 | Thackston |
| 6,324,877 B2 | 12/2001 | Neeley |
| 6,347,253 B1 | 2/2002 | Fujita et al. |
| 6,421,570 B1 | 7/2002 | McLaughlin et al. |
| 6,442,515 B1 | 8/2002 | Varma et al. |
| 6,463,352 B1 | 10/2002 | Tadokoro et al. |
| 6,529,780 B1 | 3/2003 | Soergel et al. |
| 6,535,883 B1 | 3/2003 | Lee et al. |
| 6,563,430 B1 | 5/2003 | Kemink et al. |
| 6,584,601 B1 | 6/2003 | Kodosky et al. |
| 6,608,638 B1 | 8/2003 | Kodosky et al. |
| 6,609,036 B1 | 8/2003 | Bickford |
| 6,658,114 B1 | 12/2003 | Farn et al. |
| 6,701,285 B2 | 3/2004 | Salonen |
| 6,715,078 B1 | 3/2004 | Chasko et al. |
| 6,715,139 B1 | 3/2004 | Kodosky et al. |
| 6,763,515 B1 | 7/2004 | Vazquez et al. |
| 6,768,116 B1 | 7/2004 | Berman et al. |
| 6,772,017 B1 | 8/2004 | Dove et al. |
| 6,778,873 B1 | 8/2004 | Wang et al. |
| 6,784,903 B2 | 8/2004 | Kodosky et al. |
| 6,847,850 B2 | 1/2005 | Grumelart |
| 6,868,538 B1 | 3/2005 | Nixon et al. |
| 6,917,839 B2 | 7/2005 | Bickford |
| 6,934,667 B2 | 8/2005 | Kodosky et al. |
| 6,934,668 B2 | 8/2005 | Kodosky et al. |
| 6,954,724 B2 | 10/2005 | Kodosky et al. |
| 6,961,686 B2 | 11/2005 | Kodosky et al. |
| 6,965,886 B2 | 11/2005 | Govrin et al. |
| 6,970,758 B1 | 11/2005 | Shi et al. |
| 6,971,066 B2 | 11/2005 | Schultz et al. |
| 6,983,228 B2 | 1/2006 | Kodosky et al. |
| 6,993,466 B2 | 1/2006 | Kodosky et al. |
| 7,000,190 B2 | 2/2006 | Kudukoli et al. |
| 7,006,881 B1 | 2/2006 | Hoffberg et al. |
| 7,010,470 B2 | 3/2006 | Kodosky et al. |
| 7,062,718 B2 | 6/2006 | Kodosky et al. |
| 7,072,722 B1 | 7/2006 | Colonna et al. |
| 7,123,974 B1 | 10/2006 | Hamilton |
| 7,134,086 B2 | 11/2006 | Kodosky |
| 7,134,090 B2 | 11/2006 | Kodosky et al. |
| 7,143,149 B2 | 11/2006 | Oberg et al. |
| 7,143,289 B2 | 11/2006 | Denning et al. |
| 7,177,786 B2 | 2/2007 | Kodosky et al. |
| 7,185,287 B2 | 2/2007 | Ghercioiu et al. |
| 7,200,838 B2 | 4/2007 | Kodosky et al. |
| 7,210,117 B2 | 4/2007 | Kudukoli et al. |
| 7,213,057 B2 | 5/2007 | Trethewey et al. |
| 7,216,334 B2 | 5/2007 | Kodosky et al. |
| 7,219,306 B2 | 5/2007 | Kodosky et al. |
| 7,222,131 B1 | 5/2007 | Grewal et al. |
| 7,283,914 B2 | 10/2007 | Poorman et al. |
| 7,283,971 B1 | 10/2007 | Levine et al. |
| 7,302,675 B2 | 11/2007 | Rogers et al. |
| 7,314,169 B1 | 1/2008 | Jasper et al. |
| 7,340,737 B2 | 3/2008 | Ghercioiu et al. |
| 7,343,605 B2 | 3/2008 | Langkafel et al. |
| 7,346,404 B2 | 3/2008 | Eryurek et al. |
| 7,367,028 B2 | 4/2008 | Kodosky et al. |
| 7,478,337 B2 | 1/2009 | Kodosky et al. |
| 7,506,304 B2 | 3/2009 | Morrow et al. |
| 7,530,052 B2 | 5/2009 | Morrow et al. |
| 7,530,113 B2 | 5/2009 | Braun |
| 7,536,548 B1 | 5/2009 | Batke et al. |
| RE40,817 E | 6/2009 | Krivoshein et al. |
| 7,541,920 B2 | 6/2009 | Tambascio et al. |
| 7,548,873 B2 | 6/2009 | Veeningen et al. |
| 7,558,711 B2 | 7/2009 | Kodosky et al. |
| 7,565,306 B2 | 7/2009 | Apostolides |
| 7,574,690 B2 | 8/2009 | Shah et al. |
| 7,594,220 B2 | 9/2009 | Kodosky et al. |
| 7,598,856 B1 | 10/2009 | Nick et al. |
| 7,606,681 B2 | 10/2009 | Esmaili et al. |
| 7,616,095 B2 | 11/2009 | Jones et al. |
| 7,617,542 B2 | 11/2009 | Vataja |
| 7,627,860 B2 | 12/2009 | Kodosky et al. |
| 7,630,914 B2 | 12/2009 | Veeningen et al. |
| 7,640,007 B2 | 12/2009 | Chen et al. |

(56) References Cited

U.S. PATENT DOCUMENTS

| | | |
|---|---|---|
| 7,644,052 B1 | 1/2010 | Chang et al. |
| 7,650,264 B2 | 1/2010 | Kodosky et al. |
| 7,653,563 B2 | 1/2010 | Veeningen et al. |
| 7,668,608 B2 | 2/2010 | Nixon et al. |
| 7,676,281 B2 | 3/2010 | Hood et al. |
| 7,680,546 B2 | 3/2010 | Gilbert et al. |
| 7,684,877 B2 | 3/2010 | Weatherhead et al. |
| RE41,228 E | 4/2010 | Kodosky et al. |
| 7,694,273 B2 | 4/2010 | Kodosky et al. |
| 7,707,014 B2 | 4/2010 | Kodosky et al. |
| 7,715,929 B2 | 5/2010 | Skourup et al. |
| 7,716,489 B1 | 5/2010 | Brandt et al. |
| 7,720,727 B2 | 5/2010 | Keyes et al. |
| 7,818,715 B2 | 10/2010 | Kodosky et al. |
| 7,818,716 B2 | 10/2010 | Kodosky et al. |
| 7,827,122 B1 | 11/2010 | Campbell, Jr. et al. |
| 7,831,914 B2 | 11/2010 | Kodosky et al. |
| 7,844,908 B2 | 11/2010 | Kodosky et al. |
| 7,853,431 B2 | 12/2010 | Samardzija et al. |
| 7,865,349 B2 | 1/2011 | Kodosky et al. |
| 7,882,490 B2 | 2/2011 | Kodosky et al. |
| 7,882,491 B2 | 2/2011 | Kodosky et al. |
| 7,890,461 B2 | 2/2011 | Oeda et al. |
| 7,925,979 B2 | 4/2011 | Forney et al. |
| 7,930,639 B2 | 4/2011 | Baier et al. |
| 7,934,095 B2 | 4/2011 | Laberteaux et al. |
| 7,937,665 B1 | 5/2011 | Vazquez et al. |
| 7,962,440 B2 | 6/2011 | Baier et al. |
| 7,978,059 B2 | 7/2011 | Petite et al. |
| 7,979,843 B2 | 7/2011 | Kodosky et al. |
| 7,984,423 B2 | 7/2011 | Kodosky et al. |
| 7,987,448 B2 | 7/2011 | Kodosky et al. |
| 8,014,722 B2 | 9/2011 | Abel et al. |
| 8,028,241 B2 | 9/2011 | Kodosky et al. |
| 8,028,242 B2 | 9/2011 | Kodosky et al. |
| 8,055,787 B2 | 11/2011 | Victor et al. |
| 8,060,834 B2 | 11/2011 | Lucas et al. |
| 8,073,967 B2 | 12/2011 | Peterson et al. |
| 8,074,201 B2 | 12/2011 | Ghercioiu et al. |
| 8,099,712 B2 | 1/2012 | Kodosky et al. |
| 8,102,400 B1 | 1/2012 | Cook et al. |
| 8,126,964 B2 | 2/2012 | Pretlove et al. |
| 8,132,225 B2 | 3/2012 | Chand et al. |
| 8,146,053 B2 | 3/2012 | Morrow et al. |
| 8,166,296 B2 | 4/2012 | Buer et al. |
| 8,171,137 B1 | 5/2012 | Parks et al. |
| 8,185,217 B2 | 5/2012 | Thiele |
| 8,185,495 B2 | 5/2012 | Clark et al. |
| 8,185,832 B2 | 5/2012 | Kodosky et al. |
| 8,185,833 B2 | 5/2012 | Kodosky et al. |
| 8,185,871 B2 | 5/2012 | Nixon et al. |
| 8,190,888 B2 | 5/2012 | Batke et al. |
| 8,191,005 B2 | 5/2012 | Baier et al. |
| 8,214,455 B2 | 7/2012 | Baier et al. |
| 8,218,651 B1 | 7/2012 | Eshet et al. |
| 8,219,669 B2 | 7/2012 | Agrusa et al. |
| 8,224,496 B2 | 7/2012 | Musti et al. |
| 8,239,848 B2 | 8/2012 | Ghercioiu et al. |
| 8,266,066 B1 | 9/2012 | Wezter et al. |
| 8,290,762 B2 | 10/2012 | Kodosky et al. |
| 8,307,330 B2 | 11/2012 | Kumar et al. |
| 8,316,313 B2 | 11/2012 | Campney et al. |
| 8,321,663 B2 | 11/2012 | Medvinsky et al. |
| 8,327,130 B2 | 12/2012 | Wilkinson, Jr. et al. |
| 8,350,666 B2 | 1/2013 | Kore |
| 8,359,567 B2 | 1/2013 | Kornerup et al. |
| 8,397,172 B2 | 3/2013 | Kodosky et al. |
| 8,397,205 B2 | 3/2013 | Kornerup et al. |
| 8,413,118 B2 | 4/2013 | Kodosky et al. |
| 8,417,360 B2 | 4/2013 | Sustaeta et al. |
| 8,417,595 B2 | 4/2013 | Keyes et al. |
| 8,418,071 B2 | 4/2013 | Kodosky et al. |
| 8,429,627 B2 | 4/2013 | Jedlicka et al. |
| 8,448,135 B2 | 5/2013 | Kodosky |
| 8,521,332 B2 | 8/2013 | Tiemann et al. |
| 8,532,795 B2 | 9/2013 | Adavi et al. |
| 8,570,922 B2 | 10/2013 | Pratt, Jr. et al. |
| 8,612,870 B2 | 12/2013 | Kodosky et al. |
| 8,624,725 B1 | 1/2014 | MacGregor |
| 8,640,112 B2 | 1/2014 | Yi et al. |
| 8,656,351 B2 | 2/2014 | Kodosky et al. |
| 8,688,780 B2 | 4/2014 | Gordon et al. |
| 8,781,776 B2 | 7/2014 | Onda et al. |
| 8,832,236 B2 | 9/2014 | Hernandez et al. |
| 8,886,598 B1 | 11/2014 | Emigh |
| 8,943,469 B2 | 1/2015 | Kumar et al. |
| 8,977,851 B2 | 3/2015 | Neitzel et al. |
| 9,002,973 B2 | 4/2015 | Panther |
| 9,021,021 B2 | 4/2015 | Backholm et al. |
| 9,024,972 B1 | 5/2015 | Bronder et al. |
| 9,038,043 B1 | 5/2015 | Fleetwood et al. |
| 9,047,007 B2 | 6/2015 | Kodosky et al. |
| 9,088,665 B2 | 7/2015 | Boyer et al. |
| 9,098,164 B2 | 8/2015 | Kodosky |
| 9,110,558 B2 | 8/2015 | Kodosky |
| 9,119,166 B1 | 8/2015 | Sheikh |
| 9,122,764 B2 | 9/2015 | Neitzel et al. |
| 9,122,786 B2 | 9/2015 | Cammert et al. |
| 9,134,895 B2 | 9/2015 | Dove et al. |
| 9,229,871 B2 | 1/2016 | Washiro |
| 9,235,395 B2 | 1/2016 | Kodosky et al. |
| 9,244,452 B2 | 1/2016 | Brandes et al. |
| 9,285,795 B2 | 3/2016 | Nixon et al. |
| 9,338,218 B1 | 5/2016 | Florissi et al. |
| 9,361,320 B1 | 6/2016 | Vijendra et al. |
| 9,397,836 B2 | 7/2016 | Nixon et al. |
| 9,424,398 B1 | 8/2016 | McLeod et al. |
| 9,430,114 B1 | 8/2016 | Dingman et al. |
| 9,459,809 B1 | 10/2016 | Chen et al. |
| 9,466,038 B2 | 10/2016 | Kezeu |
| 9,516,354 B1 | 12/2016 | Verheem et al. |
| 9,532,232 B2 | 12/2016 | Dewey et al. |
| 9,541,905 B2 | 1/2017 | Nixon et al. |
| 9,558,220 B2 | 1/2017 | Nixon et al. |
| 9,652,213 B2 | 5/2017 | MacCleery et al. |
| 9,678,484 B2 | 6/2017 | Nixon et al. |
| 9,697,170 B2 | 7/2017 | Nixon et al. |
| 9,804,588 B2 | 10/2017 | Blevins et al. |
| 9,892,353 B1 | 2/2018 | Lui et al. |
| 2002/0010694 A1 | 1/2002 | Navab et al. |
| 2002/0035495 A1 | 3/2002 | Spira et al. |
| 2002/0052715 A1 | 5/2002 | Maki |
| 2002/0054130 A1 | 5/2002 | Abbott et al. |
| 2002/0064138 A1 | 5/2002 | Saito et al. |
| 2002/0077711 A1 | 6/2002 | Nixon et al. |
| 2002/0080174 A1 | 6/2002 | Kodosky et al. |
| 2002/0087419 A1 | 7/2002 | Andersson et al. |
| 2002/0094085 A1 | 7/2002 | Roberts |
| 2002/0120475 A1 | 8/2002 | Morimoto |
| 2002/0123864 A1 | 9/2002 | Eryurek et al. |
| 2002/0128998 A1 | 9/2002 | Kil et al. |
| 2002/0130846 A1 | 9/2002 | Nixon et al. |
| 2002/0138168 A1 | 9/2002 | Salonen |
| 2002/0138320 A1 | 9/2002 | Robertson et al. |
| 2002/0149497 A1 | 10/2002 | Jaggi |
| 2002/0159441 A1 | 10/2002 | Travaly et al. |
| 2002/0169514 A1 | 11/2002 | Eryurek et al. |
| 2002/0188366 A1 | 12/2002 | Pepper et al. |
| 2002/0194112 A1 | 12/2002 | dePinto et al. |
| 2002/0194209 A1 | 12/2002 | Bolosky et al. |
| 2003/0020726 A1 | 1/2003 | Charpentier |
| 2003/0023795 A1 | 1/2003 | Packwood et al. |
| 2003/0028495 A1 | 2/2003 | Pallante |
| 2003/0037119 A1 | 2/2003 | Austin |
| 2003/0061295 A1 | 3/2003 | Oberg et al. |
| 2003/0083756 A1 | 5/2003 | Hsiung et al. |
| 2003/0084053 A1 | 5/2003 | Govrin et al. |
| 2003/0093309 A1 | 5/2003 | Tanikoshi et al. |
| 2003/0147351 A1 | 8/2003 | Greenlee |
| 2003/0154044 A1 | 8/2003 | Lundstedt et al. |
| 2003/0195934 A1 | 10/2003 | Peterson et al. |
| 2004/0005859 A1 | 1/2004 | Ghercioiu et al. |
| 2004/0012632 A1 | 1/2004 | King et al. |
| 2004/0014479 A1 | 1/2004 | Milman |

(56) References Cited

U.S. PATENT DOCUMENTS

| | | |
|---|---|---|
| 2004/0075689 A1 | 4/2004 | Schleiss et al. |
| 2004/0093102 A1 | 5/2004 | Liiri et al. |
| 2004/0117233 A1 | 6/2004 | Rapp |
| 2004/0133457 A1 | 7/2004 | Sadiq et al. |
| 2004/0153437 A1 | 8/2004 | Buchan |
| 2004/0153804 A1 | 8/2004 | Blevins et al. |
| 2004/0186927 A1 | 9/2004 | Eryurek et al. |
| 2004/0203874 A1 | 10/2004 | Brandt et al. |
| 2004/0204775 A1 | 10/2004 | Keyes et al. |
| 2004/0210330 A1 | 10/2004 | Birkle |
| 2004/0230328 A1 | 11/2004 | Armstrong et al. |
| 2004/0233930 A1 | 11/2004 | Colby |
| 2004/0259533 A1 | 12/2004 | Nixon et al. |
| 2005/0005259 A1 | 1/2005 | Avery et al. |
| 2005/0007249 A1 | 1/2005 | Eryurek et al. |
| 2005/0033481 A1 | 2/2005 | Budhraja et al. |
| 2005/0049835 A1 | 3/2005 | Mayer et al. |
| 2005/0060111 A1 | 3/2005 | Ramillon et al. |
| 2005/0062677 A1 | 3/2005 | Nixon et al. |
| 2005/0080799 A1 | 4/2005 | Harnden et al. |
| 2005/0096872 A1 | 5/2005 | Blevins et al. |
| 2005/0130634 A1 | 6/2005 | Godfrey |
| 2005/0164684 A1* | 7/2005 | Chen .................. G05B 19/4184 455/414.1 |
| 2005/0182650 A1 | 8/2005 | Maddox et al. |
| 2005/0187649 A1 | 8/2005 | Funk et al. |
| 2005/0197806 A1 | 9/2005 | Eryurek et al. |
| 2005/0213768 A1 | 9/2005 | Durham et al. |
| 2005/0222691 A1 | 10/2005 | Glas et al. |
| 2005/0222698 A1 | 10/2005 | Eryurek et al. |
| 2005/0264527 A1 | 12/2005 | Lin |
| 2005/0289183 A1 | 12/2005 | Kaneko et al. |
| 2006/0031826 A1 | 2/2006 | Hiramatsu et al. |
| 2006/0064291 A1 | 3/2006 | Pattipatti et al. |
| 2006/0064472 A1 | 3/2006 | Mirho |
| 2006/0069717 A1 | 3/2006 | Mamou et al. |
| 2006/0087402 A1 | 4/2006 | Manning et al. |
| 2006/0161394 A1 | 7/2006 | Dulberg et al. |
| 2006/0168396 A1 | 7/2006 | LaMothe et al. |
| 2006/0200260 A1 | 9/2006 | Hoffberg et al. |
| 2006/0200771 A1 | 9/2006 | Nielsen et al. |
| 2006/0218107 A1 | 9/2006 | Young |
| 2006/0235741 A1 | 10/2006 | Deaton et al. |
| 2006/0241792 A1 | 10/2006 | Pretlove et al. |
| 2006/0288091 A1 | 12/2006 | Oh et al. |
| 2006/0288330 A1 | 12/2006 | Bahrami et al. |
| 2006/0291481 A1 | 12/2006 | Kumar |
| 2006/0294087 A1 | 12/2006 | Mordvinov |
| 2007/0005266 A1 | 1/2007 | Blevins et al. |
| 2007/0014406 A1 | 1/2007 | Scheidt et al. |
| 2007/0038889 A1 | 2/2007 | Wiggins et al. |
| 2007/0067725 A1* | 3/2007 | Cahill .................. G05B 23/027 715/733 |
| 2007/0078696 A1 | 4/2007 | Hardin |
| 2007/0085840 A1 | 4/2007 | Asaka et al. |
| 2007/0112574 A1 | 5/2007 | Greene |
| 2007/0118516 A1 | 5/2007 | Li et al. |
| 2007/0130206 A1 | 6/2007 | Zhou et al. |
| 2007/0130310 A1 | 6/2007 | Batke et al. |
| 2007/0130572 A1 | 6/2007 | Gilbert et al. |
| 2007/0132779 A1 | 6/2007 | Gilbert et al. |
| 2007/0139441 A1 | 6/2007 | Lucas et al. |
| 2007/0142936 A1 | 6/2007 | Denison et al. |
| 2007/0168060 A1 | 7/2007 | Nixon et al. |
| 2007/0179645 A1 | 8/2007 | Nixon et al. |
| 2007/0185754 A1 | 8/2007 | Schmidt |
| 2007/0211079 A1 | 9/2007 | Nixon et al. |
| 2007/0239292 A1 | 10/2007 | Ehrman et al. |
| 2007/0250292 A1 | 10/2007 | Alagappan et al. |
| 2007/0265801 A1 | 11/2007 | Foslien et al. |
| 2007/0265866 A1 | 11/2007 | Fehling et al. |
| 2008/0040719 A1 | 2/2008 | Shimizu et al. |
| 2008/0046104 A1 | 2/2008 | Van Camp et al. |
| 2008/0058968 A1 | 3/2008 | Sharma et al. |
| 2008/0065243 A1 | 3/2008 | Fallman et al. |
| 2008/0065705 A1 | 3/2008 | Miller |
| 2008/0065706 A1 | 3/2008 | Miller et al. |
| 2008/0076431 A1 | 3/2008 | Fletcher et al. |
| 2008/0078189 A1 | 4/2008 | Ando |
| 2008/0079596 A1 | 4/2008 | Baier et al. |
| 2008/0082180 A1 | 4/2008 | Blevins et al. |
| 2008/0082181 A1 | 4/2008 | Miller et al. |
| 2008/0082195 A1 | 4/2008 | Samardzija |
| 2008/0085682 A1 | 4/2008 | Rao |
| 2008/0086428 A1 | 4/2008 | Wallace |
| 2008/0097622 A1 | 4/2008 | Forney et al. |
| 2008/0103843 A1 | 5/2008 | Goeppert et al. |
| 2008/0104189 A1 | 5/2008 | Baker et al. |
| 2008/0109090 A1 | 5/2008 | Esmaili et al. |
| 2008/0114710 A1 | 5/2008 | Pucher |
| 2008/0125912 A1 | 5/2008 | Heilman et al. |
| 2008/0126352 A1 | 5/2008 | Case |
| 2008/0126408 A1 | 5/2008 | Middleton |
| 2008/0126665 A1 | 5/2008 | Burr et al. |
| 2008/0134215 A1 | 6/2008 | Thibault et al. |
| 2008/0143482 A1 | 6/2008 | Shoarinejad et al. |
| 2008/0174766 A1 | 7/2008 | Haaslahti et al. |
| 2008/0182592 A1 | 7/2008 | Cha et al. |
| 2008/0209443 A1 | 8/2008 | Suzuki |
| 2008/0249641 A1 | 10/2008 | Enver et al. |
| 2008/0274766 A1 | 11/2008 | Pratt et al. |
| 2008/0275971 A1 | 11/2008 | Pretlove et al. |
| 2008/0288321 A1 | 11/2008 | Dillon et al. |
| 2008/0297513 A1 | 12/2008 | Greenhill et al. |
| 2008/0301123 A1 | 12/2008 | Schneider et al. |
| 2009/0048853 A1 | 2/2009 | Hall |
| 2009/0049073 A1 | 2/2009 | Cho |
| 2009/0059814 A1 | 3/2009 | Nixon et al. |
| 2009/0065578 A1* | 3/2009 | Peterson .............. G05B 19/409 235/382 |
| 2009/0070337 A1 | 3/2009 | Romem et al. |
| 2009/0070589 A1 | 3/2009 | Nayak et al. |
| 2009/0089233 A1 | 4/2009 | Gach et al. |
| 2009/0089247 A1 | 4/2009 | Blevins et al. |
| 2009/0089359 A1 | 4/2009 | Siorek et al. |
| 2009/0089709 A1 | 4/2009 | Baier et al. |
| 2009/0094531 A1 | 4/2009 | Danieli et al. |
| 2009/0097502 A1 | 4/2009 | Yamamoto |
| 2009/0112335 A1 | 4/2009 | Mehta et al. |
| 2009/0112532 A1 | 4/2009 | Foslien et al. |
| 2009/0198826 A1 | 8/2009 | Ishijima |
| 2009/0210386 A1 | 8/2009 | Cahill |
| 2009/0210802 A1 | 8/2009 | Hawkins et al. |
| 2009/0210814 A1 | 8/2009 | Agrusa et al. |
| 2009/0216341 A1 | 8/2009 | Enkerud et al. |
| 2009/0249237 A1 | 10/2009 | Jundt et al. |
| 2009/0284348 A1 | 11/2009 | Pfeffer |
| 2009/0284383 A1 | 11/2009 | Wiles et al. |
| 2009/0292514 A1 | 11/2009 | McKim et al. |
| 2009/0294174 A1 | 12/2009 | Harmer et al. |
| 2009/0300535 A1 | 12/2009 | Skourup et al. |
| 2009/0319058 A1 | 12/2009 | Rovaglio et al. |
| 2009/0325603 A1 | 12/2009 | Van Os et al. |
| 2009/0327014 A1 | 12/2009 | Labedz et al. |
| 2010/0036779 A1 | 2/2010 | Sadeh-Koniecpol et al. |
| 2010/0069008 A1 | 3/2010 | Oshima et al. |
| 2010/0076642 A1 | 3/2010 | Hoffberg et al. |
| 2010/0082132 A1 | 4/2010 | Marruchella et al. |
| 2010/0082158 A1 | 4/2010 | Lakomiak et al. |
| 2010/0106282 A1 | 4/2010 | Mackelprang et al. |
| 2010/0127821 A1 | 5/2010 | Jones et al. |
| 2010/0127824 A1 | 5/2010 | Moschl et al. |
| 2010/0145476 A1 | 6/2010 | Junk et al. |
| 2010/0169785 A1 | 7/2010 | Jesudason |
| 2010/0175012 A1 | 7/2010 | Allstrom et al. |
| 2010/0185857 A1 | 7/2010 | Neitzel et al. |
| 2010/0190442 A1 | 7/2010 | Citrano, III et al. |
| 2010/0192122 A1 | 7/2010 | Esfahan et al. |
| 2010/0218010 A1 | 8/2010 | Musti et al. |
| 2010/0222899 A1 | 9/2010 | Blevins et al. |
| 2010/0234969 A1 | 9/2010 | Inoue |
| 2010/0262929 A1 | 10/2010 | Avery |
| 2010/0275135 A1 | 10/2010 | Dunton et al. |
| 2010/0286798 A1 | 11/2010 | Keyes et al. |

(56) References Cited

U.S. PATENT DOCUMENTS

| | | |
|---|---|---|
| 2010/0290351 A1 | 11/2010 | Toepke et al. |
| 2010/0290359 A1 | 11/2010 | Dewey et al. |
| 2010/0293019 A1 | 11/2010 | Keyes et al. |
| 2010/0293564 A1 | 11/2010 | Gould et al. |
| 2010/0299105 A1 | 11/2010 | Vass et al. |
| 2010/0305736 A1 | 12/2010 | Arduini |
| 2010/0318934 A1 | 12/2010 | Blevins et al. |
| 2011/0019725 A1 | 1/2011 | Keller |
| 2011/0022193 A1 | 1/2011 | Panaitescu |
| 2011/0046754 A1 | 2/2011 | Bromley et al. |
| 2011/0071869 A1 | 3/2011 | O'Brien et al. |
| 2011/0072338 A1 | 3/2011 | Caldwell |
| 2011/0098918 A1 | 4/2011 | Siliski et al. |
| 2011/0115816 A1 | 5/2011 | Brackney |
| 2011/0130848 A1 | 6/2011 | Tegnell et al. |
| 2011/0140864 A1 | 6/2011 | Bucci |
| 2011/0144777 A1 | 6/2011 | Firkins et al. |
| 2011/0185292 A1 | 7/2011 | Chawla et al. |
| 2011/0191277 A1 | 8/2011 | Ag ndez Dominguez et al. |
| 2011/0238189 A1 | 9/2011 | Butera et al. |
| 2011/0258138 A1 | 10/2011 | Kulkarni et al. |
| 2011/0270855 A1 | 11/2011 | Antonysamy |
| 2011/0276896 A1 | 11/2011 | Zambetti et al. |
| 2011/0276908 A1 | 11/2011 | O'Riordan |
| 2011/0279323 A1 | 11/2011 | Hung et al. |
| 2011/0282793 A1 | 11/2011 | Mercuri et al. |
| 2011/0282836 A1 | 11/2011 | Erickson et al. |
| 2011/0295578 A1 | 12/2011 | Aldrich et al. |
| 2011/0295722 A1 | 12/2011 | Reisman |
| 2012/0004743 A1 | 1/2012 | Anne et al. |
| 2012/0005270 A1 | 1/2012 | Harding et al. |
| 2012/0010758 A1 | 1/2012 | Francino et al. |
| 2012/0011180 A1 | 1/2012 | Kavaklioglu |
| 2012/0011511 A1 | 1/2012 | Horvitz et al. |
| 2012/0016816 A1 | 1/2012 | Yanase et al. |
| 2012/0029661 A1 | 2/2012 | Jones et al. |
| 2012/0038458 A1 | 2/2012 | Toepke et al. |
| 2012/0040698 A1 | 2/2012 | Ferguson et al. |
| 2012/0078869 A1 | 3/2012 | Bellville et al. |
| 2012/0095574 A1 | 4/2012 | Greenlee |
| 2012/0147862 A1 | 6/2012 | Poojary et al. |
| 2012/0163521 A1 | 6/2012 | Kirrmann et al. |
| 2012/0176491 A1 | 7/2012 | Garin et al. |
| 2012/0197852 A1 | 8/2012 | Dutta et al. |
| 2012/0203728 A1 | 8/2012 | Levine |
| 2012/0210083 A1 | 8/2012 | Lawrence |
| 2012/0226985 A1 | 9/2012 | Chervets et al. |
| 2012/0230309 A1 | 9/2012 | Junk |
| 2012/0239164 A1 | 9/2012 | Smith et al. |
| 2012/0240181 A1 | 9/2012 | McCorkendale et al. |
| 2012/0249588 A1 | 10/2012 | Tison et al. |
| 2012/0251996 A1 | 10/2012 | Jung et al. |
| 2012/0259436 A1 | 10/2012 | Resurreccion et al. |
| 2012/0271962 A1 | 10/2012 | Ivanov et al. |
| 2012/0290795 A1 | 11/2012 | Dowlatkhah |
| 2012/0324365 A1 | 12/2012 | Momchilov et al. |
| 2012/0331541 A1 | 12/2012 | Hamilton, II et al. |
| 2013/0006696 A1 | 1/2013 | Louie et al. |
| 2013/0007223 A1 | 1/2013 | Luby et al. |
| 2013/0013523 A1 | 1/2013 | Herrera Campos |
| 2013/0029686 A1 | 1/2013 | Moshfeghi |
| 2013/0041479 A1 | 2/2013 | Zhang et al. |
| 2013/0060354 A1 | 3/2013 | Choi et al. |
| 2013/0086591 A1 | 4/2013 | Haven |
| 2013/0095849 A1 | 4/2013 | Pakzad |
| 2013/0120449 A1 | 5/2013 | Ihara et al. |
| 2013/0124749 A1 | 5/2013 | Thang et al. |
| 2013/0127980 A1 | 5/2013 | Haddick et al. |
| 2013/0144404 A1 | 6/2013 | Godwin et al. |
| 2013/0144405 A1 | 6/2013 | Lo |
| 2013/0144605 A1 | 6/2013 | Brager et al. |
| 2013/0151563 A1 | 6/2013 | Addepalli et al. |
| 2013/0159200 A1 | 6/2013 | Paul et al. |
| 2013/0166542 A1 | 6/2013 | Kulkarni et al. |
| 2013/0169526 A1 | 7/2013 | Gai et al. |
| 2013/0171599 A1 | 7/2013 | Bleich et al. |
| 2013/0184847 A1 | 7/2013 | Fruh et al. |
| 2013/0188557 A1* | 7/2013 | Gotou ............ H04W 88/08 370/328 |
| 2013/0197954 A1 | 8/2013 | Yankelevich et al. |
| 2013/0211555 A1 | 8/2013 | Lawson et al. |
| 2013/0212129 A1 | 8/2013 | Lawson et al. |
| 2013/0214902 A1 | 8/2013 | Pineau et al. |
| 2013/0217417 A1 | 8/2013 | Mohideen et al. |
| 2013/0231947 A1 | 9/2013 | Shusterman |
| 2013/0257627 A1 | 10/2013 | Rafael |
| 2013/0265857 A1 | 10/2013 | Foulds et al. |
| 2013/0282150 A1 | 10/2013 | Panther et al. |
| 2013/0318536 A1 | 11/2013 | Fletcher et al. |
| 2013/0321578 A1 | 12/2013 | Dini |
| 2014/0006338 A1 | 1/2014 | Watson et al. |
| 2014/0015672 A1 | 1/2014 | Ponce |
| 2014/0039648 A1 | 2/2014 | Boult et al. |
| 2014/0067800 A1 | 3/2014 | Sharma |
| 2014/0078163 A1 | 3/2014 | Cammert et al. |
| 2014/0079297 A1 | 3/2014 | Tadayon et al. |
| 2014/0089504 A1 | 3/2014 | Scholz et al. |
| 2014/0108985 A1 | 4/2014 | Scott et al. |
| 2014/0122026 A1 | 5/2014 | Aberg et al. |
| 2014/0122806 A1 | 5/2014 | Lin et al. |
| 2014/0123115 A1 | 5/2014 | Peretz |
| 2014/0123276 A1 | 5/2014 | Bush et al. |
| 2014/0129002 A1 | 5/2014 | Brandes et al. |
| 2014/0129041 A1* | 5/2014 | Williams ............ H04W 4/023 700/295 |
| 2014/0136652 A1 | 5/2014 | Narayanaswami et al. |
| 2014/0156032 A1 | 6/2014 | Jenkins et al. |
| 2014/0164603 A1 | 6/2014 | Castel et al. |
| 2014/0172121 A1* | 6/2014 | Li ............ H04W 4/029 700/12 |
| 2014/0172961 A1 | 6/2014 | Clemmer et al. |
| 2014/0180671 A1 | 6/2014 | Osipova |
| 2014/0180970 A1 | 6/2014 | Hettenkofer et al. |
| 2014/0189520 A1 | 7/2014 | Crepps et al. |
| 2014/0201244 A1 | 7/2014 | Zhou |
| 2014/0207415 A1 | 7/2014 | Bhutani et al. |
| 2014/0232843 A1 | 8/2014 | Campbell |
| 2014/0250153 A1 | 9/2014 | Nixon et al. |
| 2014/0267599 A1 | 9/2014 | Drouin et al. |
| 2014/0273847 A1 | 9/2014 | Nixon et al. |
| 2014/0274123 A1 | 9/2014 | Nixon et al. |
| 2014/0277593 A1 | 9/2014 | Nixon et al. |
| 2014/0277594 A1 | 9/2014 | Nixon et al. |
| 2014/0277595 A1 | 9/2014 | Nixon et al. |
| 2014/0277596 A1 | 9/2014 | Nixon et al. |
| 2014/0277604 A1 | 9/2014 | Nixon et al. |
| 2014/0277605 A1 | 9/2014 | Nixon et al. |
| 2014/0277607 A1 | 9/2014 | Nixon et al. |
| 2014/0277615 A1 | 9/2014 | Nixon et al. |
| 2014/0277616 A1 | 9/2014 | Nixon et al. |
| 2014/0277617 A1 | 9/2014 | Nixon et al. |
| 2014/0277618 A1 | 9/2014 | Nixon et al. |
| 2014/0277656 A1 | 9/2014 | Nixon et al. |
| 2014/0278312 A1 | 9/2014 | Nixon et al. |
| 2014/0280497 A1 | 9/2014 | Nixon et al. |
| 2014/0280678 A1 | 9/2014 | Nixon et al. |
| 2014/0282015 A1 | 9/2014 | Nixon et al. |
| 2014/0282227 A1 | 9/2014 | Nixon et al. |
| 2014/0282257 A1 | 9/2014 | Nixon et al. |
| 2014/0282722 A1 | 9/2014 | Kummer et al. |
| 2014/0297225 A1 | 10/2014 | Petroski et al. |
| 2014/0303754 A1 | 10/2014 | Nixon et al. |
| 2014/0316579 A1 | 10/2014 | Taylor et al. |
| 2014/0335480 A1 | 11/2014 | Asenjo et al. |
| 2014/0358256 A1 | 12/2014 | Billi et al. |
| 2014/0359552 A1 | 12/2014 | Misra et al. |
| 2014/0372378 A1 | 12/2014 | Long et al. |
| 2014/0372561 A1 | 12/2014 | Hisano |
| 2014/0379296 A1 | 12/2014 | Nathan et al. |
| 2015/0024710 A1 | 1/2015 | Becker et al. |
| 2015/0043626 A1 | 2/2015 | Williams et al. |
| 2015/0067163 A1 | 3/2015 | Bahnsen et al. |
| 2015/0077263 A1 | 3/2015 | Ali et al. |
| 2015/0106578 A1 | 4/2015 | Warfield et al. |

(56) References Cited

U.S. PATENT DOCUMENTS

| | | | |
|---|---|---|---|
| 2015/0172872 A1 | 6/2015 | Alsehly et al. |
| 2015/0177718 A1 | 6/2015 | Vartiainen et al. |
| 2015/0185716 A1 | 7/2015 | Wichmann et al. |
| 2015/0188975 A1 | 7/2015 | Hansen et al. |
| 2015/0193418 A1 | 7/2015 | Koska et al. |
| 2015/0199494 A1 | 7/2015 | Koduri et al. |
| 2015/0212679 A1 | 7/2015 | Liu |
| 2015/0220080 A1 | 8/2015 | Nixon et al. |
| 2015/0220311 A1 | 8/2015 | Salter |
| 2015/0221152 A1 | 8/2015 | Andersen |
| 2015/0222731 A1 | 8/2015 | Shinohara et al. |
| 2015/0246852 A1 | 9/2015 | Chen et al. |
| 2015/0254330 A1 | 9/2015 | Chan et al. |
| 2015/0261215 A1 | 9/2015 | Blevins et al. |
| 2015/0277399 A1 | 10/2015 | Maturana et al. |
| 2015/0278397 A1 | 10/2015 | Hendrickson et al. |
| 2015/0296324 A1 | 10/2015 | Garaas et al. |
| 2015/0312721 A1 | 10/2015 | Singh et al. |
| 2015/0332188 A1 | 11/2015 | Yankelevich et al. |
| 2016/0098021 A1 | 4/2016 | Zornio et al. |
| 2016/0098037 A1 | 4/2016 | Zornio et al. |
| 2016/0098388 A1 | 4/2016 | Blevins et al. |
| 2016/0098647 A1 | 4/2016 | Nixon et al. |
| 2016/0132046 A1 | 5/2016 | Beoughter et al. |
| 2016/0261482 A1 | 9/2016 | Mixer et al. |
| 2016/0281607 A1 | 9/2016 | Asati et al. |
| 2016/0327942 A1 | 11/2016 | Nixon et al. |
| 2017/0102678 A1 | 4/2017 | Nixon et al. |
| 2017/0102693 A1 | 4/2017 | Kidd et al. |
| 2017/0102694 A1 | 4/2017 | Enver et al. |
| 2017/0102696 A1 | 4/2017 | Bell et al. |
| 2017/0102969 A1 | 4/2017 | Kochunni et al. |
| 2017/0103103 A1 | 4/2017 | Nixon et al. |
| 2017/0115648 A1 | 4/2017 | Nixon et al. |
| 2017/0154395 A1 | 6/2017 | Podgurny et al. |
| 2017/0199843 A1 | 7/2017 | Nixon et al. |
| 2017/0223075 A1 | 8/2017 | Hong et al. |
| 2017/0235298 A1 | 8/2017 | Nixon et al. |
| 2017/0236067 A1 | 8/2017 | Tjiong |
| 2017/0238055 A1 | 8/2017 | Chang et al. |
| 2017/0255826 A1 | 9/2017 | Chang et al. |
| 2017/0255827 A1 | 9/2017 | Chang et al. |
| 2017/0255828 A1 | 9/2017 | Chang et al. |
| 2017/0255829 A1 | 9/2017 | Chang et al. |
| 2018/0012510 A1 | 1/2018 | Asenjo et al. |
| 2018/0151037 A1 | 5/2018 | Morgenthau et al. |
| 2018/0343544 A1 | 11/2018 | Fan et al. |
| 2019/0032948 A1 | 1/2019 | Nayak et al. |

FOREIGN PATENT DOCUMENTS

| | | |
|---|---|---|
| CN | 1409179 A | 4/2003 |
| CN | 1409232 A | 4/2003 |
| CN | 1537258 A | 10/2004 |
| CN | 1589423 A | 3/2005 |
| CN | 1757002 A | 4/2006 |
| CN | 1804744 A | 7/2006 |
| CN | 1805040 A | 7/2006 |
| CN | 1826565 A | 8/2006 |
| CN | 1864156 A | 11/2006 |
| CN | 1980194 A | 6/2007 |
| CN | 101097136 A | 1/2008 |
| CN | 101169799 A | 4/2008 |
| CN | 101187869 A | 5/2008 |
| CN | 101221415 A | 7/2008 |
| CN | 101387882 A | 3/2009 |
| CN | 101449259 A | 6/2009 |
| CN | 201374004 Y | 12/2009 |
| CN | 101713985 A | 5/2010 |
| CN | 101788820 A | 7/2010 |
| CN | 101802736 A | 8/2010 |
| CN | 101822050 A | 9/2010 |
| CN | 101828195 A | 9/2010 |
| CN | 101867566 A | 10/2010 |
| CN | 102063097 A | 5/2011 |
| CN | 102073448 A | 5/2011 |
| CN | 102124432 A | 7/2011 |
| CN | 102169182 A | 8/2011 |
| CN | 102175174 A | 9/2011 |
| CN | 102184489 A | 9/2011 |
| CN | 102200993 A | 9/2011 |
| CN | 102213959 A | 10/2011 |
| CN | 102239452 A | 11/2011 |
| CN | 102243315 A | 11/2011 |
| CN | 102278987 A | 12/2011 |
| CN | 202101268 U | 1/2012 |
| CN | 102349031 A | 2/2012 |
| CN | 102375453 A | 3/2012 |
| CN | 102378989 A | 3/2012 |
| CN | 102402215 A | 4/2012 |
| CN | 102436205 A | 5/2012 |
| CN | 102494630 A | 6/2012 |
| CN | 102494683 A | 6/2012 |
| CN | 102637027 A | 8/2012 |
| CN | 102640156 A | 8/2012 |
| CN | 102707689 A | 10/2012 |
| CN | 102710861 A | 10/2012 |
| CN | 102780568 A | 11/2012 |
| CN | 102801779 A | 11/2012 |
| CN | 102867237 A | 1/2013 |
| CN | 103106188 A | 5/2013 |
| CN | 103403686 A | 11/2013 |
| CN | 103576638 A | 2/2014 |
| CN | 103699698 A | 4/2014 |
| CN | 104035392 A | 9/2014 |
| CN | 104049575 A | 9/2014 |
| DE | 19882113 T1 | 1/2000 |
| DE | 19882117 T1 | 1/2000 |
| EP | 0 308 390 A1 | 3/1989 |
| EP | 0 335 957 A1 | 10/1989 |
| EP | 1 344 291 A1 | 9/2003 |
| EP | 1 414 215 A2 | 4/2004 |
| EP | 1 564 647 A2 | 8/2005 |
| EP | 1 912 376 A1 | 4/2008 |
| EP | 2 003 813 A1 | 12/2008 |
| EP | 2 112 614 A1 | 10/2009 |
| EP | 2 180 441 A1 | 4/2010 |
| EP | 2 469 475 A1 | 6/2012 |
| EP | 1 344 291 B1 | 8/2012 |
| EP | 2 685 329 A1 | 1/2014 |
| EP | 2 704 401 A1 | 3/2014 |
| EP | 2 746 884 A1 | 6/2014 |
| EP | 2 801 939 A1 | 11/2014 |
| FR | 2 897 453 A1 | 8/2007 |
| FR | 2 966 625 A1 | 4/2012 |
| GB | 2 336 977 B | 11/1999 |
| GB | 2 347 234 A | 8/2000 |
| GB | 2 336 923 B | 6/2002 |
| GB | 2 403 028 A | 12/2004 |
| GB | 2 453 426 A | 4/2009 |
| GB | 2 485 092 A | 5/2012 |
| GB | 2 494 778 A | 3/2013 |
| GB | 2 512 984 A | 10/2014 |
| GB | 2 512 997 A | 10/2014 |
| GB | 2 514 644 A | 12/2014 |
| GB | 2 532 849 A | 6/2016 |
| GB | 2 534 628 A | 8/2016 |
| GB | 2 536 339 A | 9/2016 |
| GB | 2 537 457 A | 10/2016 |
| JP | 64-017105 A | 1/1989 |
| JP | 01-291303 A | 11/1989 |
| JP | 05-073131 A | 3/1993 |
| JP | 05-142033 A | 6/1993 |
| JP | 05-187973 A | 7/1993 |
| JP | 05-346807 A | 12/1993 |
| JP | 06-052145 A | 2/1994 |
| JP | 06-307897 A | 11/1994 |
| JP | 08-234951 | 9/1996 |
| JP | 9-160798 A | 6/1997 |
| JP | 9-196714 A | 7/1997 |
| JP | 09-330861 A | 12/1997 |
| JP | 10-116113 A | 5/1998 |
| JP | 10-326111 A | 12/1998 |
| JP | 11-327628 A | 11/1999 |

(56) References Cited

FOREIGN PATENT DOCUMENTS

| | | |
|---|---|---|
| JP | 2000-194414 A | 7/2000 |
| JP | 2000-214914 A | 8/2000 |
| JP | 2001-036542 A | 2/2001 |
| JP | 2001-195123 A | 7/2001 |
| JP | 2001-512593 A | 8/2001 |
| JP | 2001-265821 A | 9/2001 |
| JP | 2002-010489 A | 1/2002 |
| JP | 2002-024423 A | 1/2002 |
| JP | 2002-099325 A | 4/2002 |
| JP | 2003-029818 A | 1/2003 |
| JP | 2003-067523 A | 3/2003 |
| JP | 2003-109152 A | 4/2003 |
| JP | 2003-140741 A | 5/2003 |
| JP | 2003-167621 A | 6/2003 |
| JP | 2003-167624 A | 6/2003 |
| JP | 2003-177818 A | 6/2003 |
| JP | 2003-250232 A | 9/2003 |
| JP | 2003-295944 A | 10/2003 |
| JP | 2003-337794 A | 11/2003 |
| JP | 2004-030492 A | 1/2004 |
| JP | 2004-102765 A | 4/2004 |
| JP | 2004-171127 A | 6/2004 |
| JP | 2004-199624 A | 7/2004 |
| JP | 2004-227561 A | 8/2004 |
| JP | 2004-265302 A | 9/2004 |
| JP | 2004-348582 A | 12/2004 |
| JP | 2004-537820 A | 12/2004 |
| JP | 2005-100072 A | 4/2005 |
| JP | 2005-107758 A | 4/2005 |
| JP | 2005-216137 A | 8/2005 |
| JP | 2005-242830 A | 9/2005 |
| JP | 2005-293600 A | 10/2005 |
| JP | 2005-301546 A | 10/2005 |
| JP | 2005-332093 A | 12/2005 |
| JP | 2006-172462 A | 6/2006 |
| JP | 2006-185120 A | 7/2006 |
| JP | 2006-221376 A | 8/2006 |
| JP | 2006-221563 A | 8/2006 |
| JP | 2006-260411 A | 9/2006 |
| JP | 2006-527426 A | 11/2006 |
| JP | 2007-137563 A | 6/2007 |
| JP | 2007-148938 A | 6/2007 |
| JP | 2007-164764 A | 6/2007 |
| JP | 2007-207065 A | 8/2007 |
| JP | 2007-242000 A | 9/2007 |
| JP | 2007-286798 A | 11/2007 |
| JP | 2007-299228 A | 11/2007 |
| JP | 2007-334438 A | 12/2007 |
| JP | 2007-536631 A | 12/2007 |
| JP | 2007-536648 A | 12/2007 |
| JP | 2008-009793 A | 1/2008 |
| JP | 2008-065821 A | 3/2008 |
| JP | 2008-158971 A | 7/2008 |
| JP | 2008-171152 A | 7/2008 |
| JP | 2008-177929 A | 7/2008 |
| JP | 2008276297 A | 11/2008 |
| JP | 2008-305419 A | 12/2008 |
| JP | 2009-500767 A | 1/2009 |
| JP | 2009-044288 A | 2/2009 |
| JP | 2009-53938 A | 3/2009 |
| JP | 2009-064451 A | 3/2009 |
| JP | 2009-135892 A | 6/2009 |
| JP | 2009-140380 A | 6/2009 |
| JP | 2009-211522 A | 9/2009 |
| JP | 2009-251777 A | 10/2009 |
| JP | 2009-538567 A | 11/2009 |
| JP | 2010-181949 A | 8/2010 |
| JP | 2010-527486 A | 8/2010 |
| JP | 2010-250825 A | 11/2010 |
| JP | 2011-022920 A | 2/2011 |
| JP | 2011-034180 A | 2/2011 |
| JP | 2011-034564 A | 2/2011 |
| JP | 2011-108112 A | 6/2011 |
| JP | 2011-180629 A | 9/2011 |
| JP | 2011-204237 A | 10/2011 |
| JP | 2011-204238 A | 10/2011 |
| JP | 2012-022558 A | 2/2012 |
| JP | 2012-048762 A | 3/2012 |
| JP | 2012-069118 A | 4/2012 |
| JP | 2012-084162 A | 4/2012 |
| JP | 4-934482 B2 | 5/2012 |
| JP | 2012-88953 A | 5/2012 |
| JP | 2012-190477 A | 10/2012 |
| JP | 2012-215547 A | 11/2012 |
| JP | 2012-527059 A | 11/2012 |
| JP | 2012-252604 A | 12/2012 |
| JP | 2013-15899 A | 1/2013 |
| JP | 2014-116027 A | 6/2014 |
| JP | 2014-170552 A | 9/2014 |
| JP | 2014-523579 A | 9/2014 |
| TW | 201408020 A | 2/2014 |
| WO | WO 02/35302 A1 | 5/2002 |
| WO | WO-02/50971 | 6/2002 |
| WO | WO-03/073344 A2 | 9/2003 |
| WO | WO-03/073688 A1 | 9/2003 |
| WO | WO-2003/073688 A1 | 9/2003 |
| WO | WO-2005/083533 A1 | 9/2005 |
| WO | WO-2005/109123 A1 | 11/2005 |
| WO | WO-2007/052342 A1 | 5/2007 |
| WO | WO-2008/042786 A2 | 4/2008 |
| WO | WO-2009/021900 A1 | 2/2009 |
| WO | WO-2009/046095 A1 | 4/2009 |
| WO | WO-2010/041462 A1 | 4/2010 |
| WO | WO-2011/120625 A1 | 10/2011 |
| WO | WO-2012/016012 A2 | 2/2012 |
| WO | WO-2012/022358 A1 | 2/2012 |
| WO | WO-2012/022381 A1 | 2/2012 |
| WO | WO-2012/096877 A1 | 7/2012 |
| WO | WO-2012/129400 A2 | 9/2012 |
| WO | WO-2012/177812 A1 | 12/2012 |
| WO | WO-2014/005073 A1 | 1/2014 |
| WO | WO-2014/145801 A2 | 9/2014 |
| WO | WO-2015/138706 A1 | 9/2015 |
| WO | WO-2016/057365 A1 | 4/2016 |

OTHER PUBLICATIONS

"ANSI/ISA-S5.4-1991 American National Standard Instrument Loop Diagrams" by Instrument Society of America, 1986, 22 pages.
"Control Loop Foundation—Batch and Continuous Processes", by Terrence Blevins and Mark Nixon, *International Society of Automation*, 2011, Chapter 7.
"IoT and Big Data Combine Forces," (2013). Retrieved from the Internet at: <URL:http://wiki.advantech.com/images/7/73/iot2013_whitepaper.pdf>.
Adrian et al., "Model Predictive Control of Integrated Unit Operations Control of a Divided Wall Column," Chemical Engineering and Processing: Process Information, 43(3):347-355 (2004).
Aouada et al., "Source Detection and Separation in Power Plant Process Monitoring: Application of the Bootstrap," IEEE International Conference on Acoustics Speech and Signal Processing Proceedings (2006).
Bassat et al., "Workflow Management Combined with Diagnostic and Repair Expert System Tools for Maintenance Operations," IEEE, pp. 367-375 (1993).
Bruzzone et al., "Different Modeling and Simulation Approaches Applied to Industrial Process Plants," Proceedings of the Emerging M&S Applications in Industry & Academia/Modeling and Humanities Symposium (2013).
Bryner, "Smart Manufacturing: The Next Revolution," Chemical Engineering Process (2012). Retrieved from the Internet at: <URL:http://www.aiche.org/sites/default/files/cep/20121004a.pdf>.
Building Smarter Manufacturing with the Internet of Things (IoT), (2014). Retrieved from the Internet at: <URL:http://www.cisco.com/web/solutions/trends/iot/iot_in_manufacturing_january.pdf>.
Communication Relating to the Results of the Partial International Search, dated Jul. 11, 2014.
Daniel et al., "Conceptual Design of Reactive Dividing Wall Columns," Symposium Series No. 152, pp. 364-372 (2006).

(56) References Cited

OTHER PUBLICATIONS

Decision of Refusal for Japanese Application No. 2014-041785, dated May 7, 2019.
Decision of Refusal for Japanese Application No. 2014-048410, dated May 29, 2018.
Decision of Refusal for Japanese Application No. 2014-048411, dated Mar. 1, 2019.
Decision of Refusal for Japanese Application No. 2014-048412, dated Oct. 26, 2018.
Decision of Refusal for Japanese Application No. 2014-049918, dated Aug. 21, 2018.
Decision of Refusal for Japanese Application No. 2014-049920, Apr. 9, 2019.
Decision of Refusal for Japanese Application No. 2014-051595, dated Sep. 11, 2018.
Decision of Refusal for Japanese Application No. 2014-051596, dated Oct. 23, 2018.
Decision of Refusal for Japanese Application No. 2014-051597, dated Nov. 13, 2018.
Decision of Rejection for Chinese Application No. 201410097675.2, dated Jul. 2, 2018.
Decision of Rejection for Chinese Application No. 201410097873.9, dated Dec. 5, 2018.
Decision of Rejection for Chinese Application No. 201410098326.2, dated Jul. 3, 2019.
Decision of Rejection for Chinese Application No. 201410098982.2, dated Jan. 23, 2019.
Dejanovic et al., "Conceptual Design and Comparison of Four-Products Dividing Wall Columns for Separation of a Multicomponent Aromatics Mixture," Distillation Absorption, pp. 85-90 (2010).
Dongargaonkar et al., "PLC Based Ignition System," Conference Records of the 1999 IEEE Industry Application Conference, 1380-1387 (1999).
Examination Report for Application No. EP 14724871.0, dated Aug. 10, 2018.
Examination Report for Application No. EP 14724871.0, dated Aug. 17, 2016.
Examination Report for Application No. EP 17157505.3, dated Sep. 6, 2019.
Examination Report for Application No. GB1017192.4, dated May 28, 2014.
Examination Report for Application No. GB1017192.4, dated Sep. 5, 2013.
Examination Report for Application No. GB1402311.3, dated Aug. 6, 2019.
Examination Report for Application No. GB1402311.3, dated Sep. 28, 2018.
Examination Report for Application No. GB1403251.0, dated Oct. 10, 2019.
Examination Report for Application No. GB1403407.8, dated Dec. 2, 2019.
Examination Report for Application No. GB1403407.8, dated Feb. 24, 2020.
Examination Report for Application No. GB1403471.4, dated Nov. 15, 2019.
Examination Report for Application No. GB1403472.2, dated Nov. 19, 2019.
Examination Report for Application No. GB1403474.8, dated Dec. 3, 2019.
Examination Report for Application No. GB1403475.5, dated Nov. 12, 2019.
Examination Report for Application No. GB1403476.3, dated Nov. 4, 2019.
Examination Report for Application No. GB1403477.1, dated Nov. 7, 2019.
Examination Report for Application No. GB1403478.9, dated Nov. 21, 2019.
Examination Report for Application No. GB1403480.5, dated Oct. 24, 2019.
Examination Report for Application No. GB1403615.6, dated Nov. 20, 2019.
Examination Report for Application No. GB1403616.4, dated Nov. 15, 2019.
Examination Report for Application No. GB1403617.2, dated Nov. 28, 2019.
Examination Report for Application No. GB14724871.0, dated Oct. 8, 2018.
Examination Report for Application No. GB1614666.4 dated Jan. 6, 2020.
Examination Report for Application No. GB1901546.0, dated Aug. 6, 2019.
Extended European Search Report for Application No. 17157505.3, dated Jun. 30, 2017.
Final Rejection for Japanese Application No. 2014-048410, dated May 29, 2018.
Final Rejection for Japanese Application No. 2014-049915, dated Nov. 6, 2018.
First Office Action for Chinese Application No. 201010589029.X, dated Dec. 10, 2013.
First Office Action for Chinese Application No. 201410080524.6, dated Sep. 13, 2017.
First Office Action for Chinese Application No. 201410088828.7, dated Aug. 1, 2017.
First Office Action for Chinese Application No. 201410097623.5, dated Sep. 26, 2017.
First Office Action for Chinese Application No. 201410097675.2, dated May 10, 2017.
First Office Action for Chinese Application No. 201410097872.4, dated Aug. 23, 2017.
First Office Action for Chinese Application No. 201410097873.9, dated Aug. 9, 2017.
First Office Action for Chinese Application No. 201410097874.3, dated Aug. 18, 2017.
First Office Action for Chinese Application No. 201410097875.8, dated Jul. 7, 2017.
First Office Action for Chinese Application No. 201410097921.4, dated Oct. 10, 2017.
First Office Action for Chinese Application No. 201410097922.9, dated Aug. 18, 2017.
First Office Action for Chinese Application No. 201410097923.3, dated Aug. 28, 2017.
First Office Action for Chinese Application No. 201410098326.2, dated Jul. 27, 2017.
First Office Action for Chinese Application No. 201410098327.7, dated Jul. 26, 2017.
First Office Action for Chinese Application No. 201410098982.2, dated Aug. 9, 2017.
First Office Action for Chinese Application No. 201410099103.8, dated Aug. 9, 2017.
First Office Action for Chinese Application No. 201480014734.3, dated Apr. 19, 2017.
First Office Action for Chinese Application No. 201510049715.0, dated May 4, 2018.
First Office Action for Chinese Application No. 201510113223.3, dated Jul. 4, 2018.
First Office Action for Chinese Application No. 201510640227.7, dated Mar. 15, 2019.
First Office Action for Chinese Application No. 201510640439.5, dated Feb. 25, 2019.
First Office Action for Chinese Application No. 201510641015.0, dated Feb. 27, 2019.
First Office Action for Chinese Application No. 201580014241.4, dated Jun. 22, 2018.
First Office Action for Chinese Application No. 201580054441.2, dated Feb. 27, 2019.
Fourth Office Action for Chinese Application No. 201410098327.7, dated Mar. 28, 2019.
Hiller et al., "Multi Objective Optimisation for an Economical Dividing Wall Column Design," Distillation Absorption, pp. 67-72 (2010).
Hu et al., "Toward Scalable Systems for Big Data Analytics: A Technology Tutorial," IEEE, 2:652-687 (2014).

(56) References Cited

OTHER PUBLICATIONS

International Preliminary Report on Patentability for Application No. PCT/US2014/030627, dated Sep. 15, 2015.
International Preliminary Report on Patentability for Application No. PCT/US2015/020148, dated Sep. 14, 2016.
International Preliminary Report on Patentability for Application No. PCT/US2015/053931, dated Apr. 11, 2017.
International Search Report and Written Opinion for Application No. PCT/US2014/030627, dated Sep. 11, 2014.
International Search Report and Written Opinion for Application No. PCT/US2015,053931, dated Jan. 26, 2016.
International Search Report and Written Opinion for Application No. PCT/US2015/020148, dated Jun. 18, 2015.
Kiss et al., "A control Perspective on Process Intensification in Dividing-Wall Columns," Chemical Engineering and Processing: Process Intensification, 50:281-292 (2011).
Krumeich et al., "Big Data Analytics for Predictive Manufacturing Control—A Case Study from Process Industry," IEEE International Congress on Big Data, pp. 530-537 (2014).
Lee et al., "Recent Advances and Trends in Predictive Manufacturing Systems in Big Data Environment," Manufacturing Letters, 1(1):38-41 (2013).
Mandavi et al., "Development of a Simulation-Based Decision Support System for Controlling Stochastic Flexible Job Shop Manufacturing Systems," Simulation Modeling Practice and Theory, 18:768-786 (2010).
Mezmaz et al., "A Parallel Bi-Objective Hybrid Metaheuristic for Energy-Aware Scheduling for Cloud Computing Systems," Journal of Parallel and Distributed Computing, Elsevier (2011).
Notice of Reasons for Rejection for Japanese Application No. 2010-229513, dated Jul. 29, 2014.
Notice of Reasons for Rejection for Japanese Application No. 2014-041785, dated Dec. 5, 2017.
Notice of Reasons for Rejection for Japanese Application No. 2014-041785, dated Nov. 30, 2017.
Notice of Reasons for Rejection for Japanese Application No. 2014-048410, dated Dec. 29, 2017.
Notice of Reasons for Rejection for Japanese Application No. 2014-048411, dated Dec. 5, 2017.
Notice of Reasons for Rejection for Japanese Application No. 2014-048411, dated Jul. 31, 2018.
Notice of Reasons for Rejection for Japanese Application No. 2014-048412, dated Feb. 27, 2018.
Notice of Reasons for Rejection for Japanese Application No. 2014-048412, dated Nov. 26, 2019.
Notice of Reasons for Rejection for Japanese Application No. 2014-049915, dated Mar. 13, 2018.
Notice of Reasons for Rejection for Japanese Application No. 2014-049916, dated Aug. 28, 2018.
Notice of Reasons for Rejection for Japanese Application No. 2014-049916, dated Feb. 27, 2018.
Notice of Reasons for Rejection for Japanese Application No. 2014-049917, dated Dec. 4, 2018.
Notice of Reasons for Rejection for Japanese Application No. 2014-049917, dated Mar. 6, 2018.
Notice of Reasons for Rejection for Japanese Application No. 2014-049918, dated Apr. 10, 2018.
Notice of Reasons for Rejection for Japanese Application No. 2014-049918, dated Dec. 12, 2017.
Notice of Reasons for Rejection for Japanese Application No. 2014-049919, dated Jul. 31, 2018.
Notice of Reasons for Rejection for Japanese Application No. 2014-049919, dated Nov. 29, 2017.
Notice of Reasons for Rejection for Japanese Application No. 2014-049920, dated Feb. 20, 2018.
Notice of Reasons for Rejection for Japanese Application No. 2014-049920, dated Jun. 5, 2018.
Notice of Reasons for Rejection for Japanese Application No. 2014-049920, dated Oct. 23, 2018.
Notice of Reasons for Rejection for Japanese Application No. 2014-051114, dated Dec. 28, 2017.
Notice of Reasons for Rejection for Japanese Application No. 2014-051114, dated Mar. 5, 2019.
Notice of Reasons for Rejection for Japanese Application No. 2014-051595, dated Dec. 10, 2019.
Notice of Reasons for Rejection for Japanese Application No. 2014-051595, dated Jan. 16, 2018.
Notice of Reasons for Rejection for Japanese Application No. 2014-051595, dated May 29, 2018.
Notice of Reasons for Rejection for Japanese Application No. 2014-051596, dated Dec. 3, 2019.
Notice of Reasons for Rejection for Japanese Application No. 2014-051596, dated Jan. 16, 2018.
Notice of Reasons for Rejection for Japanese Application No. 2014-051596, dated May 29, 2018.
Notice of Reasons for Rejection for Japanese Application No. 2014-051597, dated Jan. 9, 2018.
Notice of Reasons for Rejection for Japanese Application No. 2014-051597, dated Jul. 31, 2018.
Notice of Reasons for Rejection for Japanese Application No. 2014-051598, dated Jul. 30, 2019.
Notice of Reasons for Rejection for Japanese Application No. 2014-051598, dated Mar. 13, 2018.
Notice of Reasons for Rejection for Japanese Application No. 2014-051598, dated Nov. 13, 2018.
Notice of Reasons for Rejection for Japanese Application No. 2014-051599, dated Nov. 28, 2017.
Notice of Reasons for Rejection for Japanese Application No. 2015-015738, dated Jun. 18, 2019.
Notice of Reasons for Rejection for Japanese Application No. 2015-015738, dated Mar. 12, 2019.
Notice of Reasons for Rejection for Japanese Application No. 2015-052138, dated May 13, 2019.
Notice of Reasons for Rejection for Japanese Application No. 2015-052138, dated Nov. 5, 2019.
Notice of Reasons for Rejection for Japanese Application No. 2015-159015, dated Aug. 27, 2019.
Notice of Reasons for Rejection for Japanese Application No. 2015-159015, dated Mar. 19, 2019.
Notice of Reasons for Rejection for Japanese Application No. 2015-198444, dated Sep. 3, 2019.
Notice of Reasons for Rejection for Japanese Application No. 2015-198445, dated Aug. 27, 2019.
Notice of Reasons for Rejection for Japanese Application No. 2015-198446, dated Dec. 17, 2019.
Notice of Reasons for Rejection for Japanese Application No. 2016-503431, dated Apr. 3, 2018.
Notice of Reasons for Rejection for Japanese Application No. 2016-503431, dated Jan. 8, 2019.
Notice of Reasons for Rejection for Japanese Application No. 2016-557216, dated Dec. 10, 2019.
Notice of Reasons for Rejection for Japanese Application No. 2016-557216, dated May 14, 2019.
Notice of Reasons for Rejection for Japanese Application No. 2017-518462, dated Oct. 8, 2019.
Notice of Reasons for Rejection for Japanese Application No. 2018-017060, dated Oct. 15, 2019.
Notice of Reasons for Rejection for Japanese Application No. 2019-003425, dated Feb. 3, 2020.
Notice of Reasons for Rejection for Japanese Application No. 2019-002497, dated Nov. 25, 2019.
Notice of Reasons for Rejection for Japanese Application No. 2019-045165, dated Nov. 6, 2019.
Notification of First Office Action for Chinese Application No. 201410099068.X, dated Sep. 15, 2017.
Notification of Reexamination for Chinese Application No. 201410099103.8, dated Dec. 16, 2019.
Office Action, Japanese Application No. 2018-239741, dated Feb. 4, 2020.
Pendergast et al., "Consider Dividing Wall Columns," Chemical Processing (2008). Retrieved from the Internet at: <URL:http://www.chemicalprocessing.com/articles/2008/245/?show=all>.

(56) References Cited

OTHER PUBLICATIONS

Razik et al., "The Remote Surveillance Device in Monitoring and Diagnosis of Induction Motor by Using a PDA," IEEE (2007).
Sailer et al., "Attestation-Based Policy Enforcement for Remote Access," Proceedings of the 11th ACM Conference on Computer and Communications Security (2004).
Sander et al., "Methyl Acetate Hydrolysis in a Reactive Divided Wall Column," Symposium Series No. 152, pp. 353-363 (2006).
Schultz et al., "Reduce Costs with Dividing-Wall Columns," Reactions and Separations, pp. 64-71 (2002).
Search Report for Application No. GB1017192.4, dated Feb. 15, 2011.
Search Report for Application No. GB1402311.3, dated Aug. 6, 2014.
Search Report for Application No. GB1403251.0, dated Aug. 8, 2014.
Search Report for Application No. GB1403407.8, dated Aug. 8, 2014.
Search Report for Application No. GB1403408.6, dated Aug. 8, 2014.
Search Report for Application No. GB1403471.4, dated Sep. 9, 2014.
Search Report for Application No. GB1403472.2, dated Aug. 22, 2014.
Search Report for Application No. GB1403474.8, dated Aug. 26, 2014.
Search Report for Application No. GB1403475.5, dated Sep. 3, 2014.
Search Report for Application No. GB1403476.3, dated Aug. 27, 2014.
Search Report for Application No. GB1403477.1, dated Aug. 28, 2014.
Search Report for Application No. GB1403478.9, dated Aug. 21, 2014.
Search Report for Application No. GB1403480.5, dated Aug. 28, 2014.
Search Report for Application No. GB1403615.6, dated Aug. 18, 2014.
Search Report for Application No. GB1403616.4, dated Sep. 1, 2014.
Search Report for Application No. GB1501042.4, dated Feb. 2, 2016.
Search Report for Application No. GB1503743.5, dated Apr. 25, 2019.
Search Report for Application No. GB1513617.9, dated Jan. 21, 2016.
Search Report for Application No. GB1517034.3, dated May 26, 2016.
Search Report for Application No. GB1517038.4, dated Mar. 22, 2016.
Search Report for Application No. GB1617019.3, dated Feb. 27, 2017.
Search Report for Application No. GB1617020.1, dated Apr. 13, 2017.
Search Report for Application No. GB1617021.9, dated Apr. 5, 2017.
Search Report for Application No. GB1617022.7, dated Apr. 18, 2017.
Search Report for Application No. GB1617023.5, dated Apr. 7, 2017.
Search Report for Application No. GB16702014.0, dated Aug. 3, 2017.
Second Office Action for Chinese Application No. 201410088828.7, dated Apr. 27, 2018.
Second Office Action for Chinese Application No. 201410097623.5, dated Jun. 26, 2018.
Second Office Action for Chinese Application No. 201410097675.2, dated Feb. 11, 2018.
Second Office Action for Chinese Application No. 201410097872.4 dated Jul. 12, 2018.
Second Office Action for Chinese Application No. 201410097873.9, dated May 15, 2018.
Second Office Action for Chinese Application No. 201410097875.8, dated Jun. 6, 2018.
Second Office Action for Chinese Application No. 201410097921.4, dated Jul. 5, 2018.
Second Office Action for Chinese Application No. 201410097922.9, dated Jan. 9, 2018.
Second Office Action for Chinese Application No. 201410098326.2, dated Jun. 19, 2018.
Second Office Action for Chinese Application No. 201410098327.7, dated Feb. 27, 2018.
Second Office Action for Chinese Application No. 201410098982.2, dated Jun. 11, 2018.
Second Office Action for Chinese Application No. 201410099068.X, dated Jun. 14, 2018.
Second Office Action for Chinese Application No. 201410099103.8, dated Jun. 5, 2018.
Second Office Action for Chinese Application No. 201510640227.7, dated Nov. 26, 2019.
Second Office Action for Chinese Application No. 201510640439.5, dated Nov. 12, 2019.
Second Office Action for Chinese Application No. 201510641015.0, dated Nov. 8, 2019.
Second Office Action for Chinese Application No. 201580054441.2, dated Nov. 15, 2019.
Shah et al., "Multicomponent Distillation Configurations with Large Energy Savings," Distillation Absorption, pp. 61-66 (2010).
Siltanen et al., "Augmented Reality for Plant Lifecycle Management," IEEE (2007).
Smalley, "GE Invests in Project to Embed Predictive Analytics in Industrial Internet," (2013). Retrieved from the Internet at: <URL:http://data-informed.com/ge-invents-in-project-to-embed-predictive-analytics-in-industrial-internet/>.
Sunindyo et al., "An Event-Based Empirical Process Analysis Framework," ESEM (2010).
Third Office Action for Chinese Application No. 201410097922.9, dated Aug. 3, 2018.
Third Office Action for Chinese Application No. 201410098326.2, dated Jan. 17, 2019.
Third Office Action for Chinese Application No. 201410098327.7, dated Sep. 30, 2018.
Third Office Action for Chinese Application No. 201410099068.X, dated Jan. 16, 2019.
Thotla et al., "Cyclohexanol Production from Cyclohexene in a Reactive Divided Wall Column: A Feasibility Study," Distillation Absorption, pp. 319-324 (2010).
Tomoyuki Tanabe, "Comparative evaluation of information dissemination methods for effective and efficient information sharing in wireless sensor networks," 2011 Research Report of the Information Processing Society of Japan [CD-ROM], Japan, Information Processing Society of Japan, Aug. 15, 2011.
Tututi-Avila et al., "Analysis of Multi-Loop Control Structures of Dividing-Wall Distillation Columns Using a Fundamental Model," Processes, 2:180-199 (2014).
U.S. Office Action for U.S. Appl. No. 13/784,041 dated Apr. 6, 2015.
U.S. Office Action for U.S. Appl. No. 13/784,041, dated Feb. 26, 2016.
U.S. Office Action for U.S. Appl. No. 13/784,041, dated Oct. 15, 2015.
U.S. Appl. No. 13/784,041, filed Mar. 4, 2013.
U.S. Appl. No. 14/028,785, filed Sep. 17, 2013.
U.S. Appl. No. 14/028,897, filed Sep. 17, 2013.
U.S. Appl. No. 14/028,913, filed Sep. 17, 2013.
U.S. Appl. No. 14/028,921, filed Sep. 17, 2013.
U.S. Appl. No. 14/028,923, filed Sep. 17, 2013.
U.S. Appl. No. 14/028,964, filed Sep. 17, 2013.
U.S. Appl. No. 14/174,413, filed Feb. 6, 2014, "Collecting and Delivering Data to a Big Data Machine in a Process Control System".

(56) References Cited

OTHER PUBLICATIONS

U.S. Appl. No. 14/212,411, filed Mar. 14, 2014, "Determining Associations and Alignments of Process Elements and Measurements in a Process".
U.S. Appl. No. 14/212,493, filed Mar. 14, 2014, "Distributed Big Data in a Process Control System".
U.S. Appl. No. 14/506,863, filed Oct. 6, 2014, "Streaming Data for Analytics in Process Control Systems".
U.S. Appl. No. 14/507,252, filed Oct. 6, 2014, "Automatic Signal Processing-Based Learning in a Process Plant".
U.S. Appl. No. 62/060,408, filed Oct. 6, 2014, "Data Pipeline for Process Control System Analytics".
Woo, "Intel Drops a Big Data Shocker", downloaded from the Internet at: <http://forbes.com/sites/bwoo/2013/02/27/intel-drops-a-big-data-shocker/?partner=ya>dated Feb. 27, 2013.
Xu, "From Cloud Computing to Cloud Manufacturing," Robotics and Computer-Integrated Manufacturing 28:75-86 (2012).
Zhu et al., "Localization Optimization Algorithm of Maximum Likelihood Estimation Based on Received Signal Strength," IEEE 9th International Conference on Communication Software and Networks (ICCSN), pp. 830-834 (2017).
Notice of Reasons for Rejection for Japanese Application No. 2018-239741, dated Jan. 28, 2020.
Notice of Reasons for Rejection for Japanese Application No. 2019-003424, dated Feb. 3, 2020.
Examination Report for Application No. GB1517038.4, dated Mar. 10, 2020.
Notification of Reexamination for Chinese Application No. 201410099103.8, dated Mar. 5, 2020.
Examination Report for Application No. GB1403408.6, dated Mar. 26, 2020.
Examination Report for Application No. GB1403406.0, dated Mar. 26, 2020.
Notice of Reasons for Rejection for Japanese Application No. 2019-045165, dated Mar. 3, 2020.
Examination Report for Application No. GB1403480.5, dated Mar. 27, 2020.
Notice of Reasons for Refusal for Japanese Application No. 2017-518462, dated Mar. 10, 2020.
Notice of Reasons for Rejection for Japanese Application No. 2019-009298, dated Feb. 18, 2020.
Examination Report for Application No. GB1403476.3, dated Apr. 15, 2020.

* cited by examiner

METHOD AND APPARATUS FOR CONTROLLING A PROCESS PLANT WITH LOCATION AWARE MOBILE DEVICES

TECHNICAL FIELD

The present disclosure relates generally to process plants and to process control systems, and more particularly, to the use of mobile user-interface devices in process plants and in process control systems.

BACKGROUND

Distributed process control systems, like those used in chemical, petroleum or other process plants, typically include one or more process controllers communicatively coupled to one or more field devices via analog, digital or combined analog/digital buses, or via a wireless communication link or network. The field devices, which may be, for example, valves, valve positioners, switches, and transmitters (e.g., temperature, pressure, level and flow rate sensors), are located within the process environment and generally perform physical or process control functions such as opening or closing valves, measuring process parameters, etc. to control one or more process executing within the process plant or system. Smart field devices, such as field devices conforming to the well-known Fieldbus protocol may also perform control calculations, alarming functions, and other control functions commonly implemented within the controller. The process controllers, which are also typically located within the plant environment, receive signals indicative of process measurements made by sensors and/or field devices and/or other information pertaining to the field devices and execute a controller application that runs, for example, different control modules that make process control decisions, generate control signals based on the received information and coordinate with the control modules or blocks being performed in the field devices, such as HART®, Wireless HART®, and FOUNDATION® Fieldbus field devices. The control modules in the controller send the control signals over the communication lines or links to the field devices to thereby control the operation of at least a portion of the process plant or system.

Information from the field devices and the controller is usually made available over a data highway to one or more other hardware devices, such as operator workstations, personal computers or computing devices, data historians, report generators, centralized databases, or other centralized administrative computing devices that are typically placed in control rooms or other locations away from the harsher plant environment. Each of these hardware devices typically is centralized across the process plant or across a portion of the process plant. These hardware devices run applications that may, for example, enable an operator to perform functions with respect to controlling a process and/or operating the process plant, such as changing settings of the process control routine, modifying the operation of the control modules within the controllers or the field devices, viewing the current state of the process, viewing alarms generated by field devices and controllers, simulating the operation of the process for the purpose of training personnel or testing the process control software, keeping and updating a configuration database, etc. The data highway utilized by the hardware devices, controllers and field devices may include a wired communication path, a wireless communication path, or a combination of wired and wireless communication paths.

As an example, the DeltaV™ control system, sold by Emerson Process Management, includes multiple applications stored within and executed by different devices located at diverse places within a process plant. Each of these applications provides a user-interface (UI) to allow a user (e.g., a configuration engineer, an operator, a maintenance technician, etc.) to view and/or modify aspects of the process plant operation and configuration. Throughout this specification, the phrase "user interface" or "UI" is used to refer to an application or screen that allows a user to view or modify the configuration, operation, or status of the process plant. Similarly, the phrase "user-interface device" or "UI device" is used to refer to a device on which a user interface is operating, whether that device is stationary (e.g., a workstation, wall-mounted display, process control device display, etc.) or mobile (e.g., a laptop computer, tablet computer, smartphone, etc.). A configuration application, which resides in one or more operator workstations or computing devices, enables users to create or change process control modules and download these process control modules via a data highway to dedicated distributed controllers. Typically, these control modules are made up of communicatively interconnected function blocks, which are objects in an object oriented programming protocol that perform functions within the control scheme based on inputs thereto and that provide outputs to other function blocks within the control scheme. The configuration application may also allow a configuration designer to create or change operator interfaces which are used by a viewing application to display data to an operator and to enable the operator to change settings, such as set points, within the process control routines. Each dedicated controller and, in some cases, one or more field devices, stores and executes a respective controller application that runs the control modules assigned and downloaded thereto to implement actual process control functionality. The viewing applications, which may be executed on one or more operator workstations (or on one or more remote computing devices in communicative connection with the operator workstations and the data highway), receive data from the controller application via the data highway and display this data to process control system designers, operators, or users using the UIs, and may provide any of a number of different views, such as an operator's view, an engineer's view, a technician's view, etc. A data historian application is typically stored in and executed by a data historian device that collects and stores some or all of the data provided across the data highway while a configuration database application may run in a still further computer attached to the data highway to store the current process control routine configuration and data associated therewith. Alternatively, the configuration database may be located in the same workstation as the configuration application.

The architecture of process control plants and process control systems has been strongly influenced by limited controller and device memory, communications bandwidth, and controller and device processor capability. For example, the use of dynamic and static non-volatile memory in the controller is usually minimized or, at the least, carefully managed. As a result, during system configuration (e.g., a priori), a user typically must choose which data in the controller is to be archived or saved, the frequency at which it will be saved, and whether or not compression is used, and the controller is accordingly configured with this limited set of data rules. Consequently, data which could be useful in troubleshooting and process analysis is often not archived, and if it is collected, the useful information may have been lost due to data compression.

Additionally, to minimize controller memory usage in currently known process control systems, data that is to be archived or saved is reported to the workstation or computing device for storage, e.g., at the appropriate historian or data silo. The current techniques used to report the data utilize communication resources poorly and induce excessive controller loading. Additionally, due to the time delays in communication and sampling at the historian or silo, the data collection and time stamping are often out of sync with the actual process.

Similarly, in batch process control systems, to minimize controller memory usage, batch recipes and snapshots of controller configuration typically remain stored at a centralized administrative computing device or location (e.g., at a data silo or historian), and are transferred to a controller only when needed. Such a strategy introduces significant burst loads in the controller and in communication channels between the workstation or centralized administrative computing device and the controller.

Furthermore, the capability and performance limitations of relational databases of process control systems, combined with the high cost of disk storage, play a large part in structuring application data into independent entities or silos to meet the objectives of specific applications. For example, within the DeltaV™ system, process models, continuous historical data, and batch and event data are saved and/or archived in three different application databases or silos of data. Each silo has a different interface to access the data stored therein.

Structuring data in this manner creates a barrier in the way that historized data are accessed and used. For example, the root cause of variations in product quality may be associated with data in one or more of these data files. However, because of the different file structures it is not possible to provide tools that allow this data to be quickly and easily accessed for analysis. Further, audit or synchronizing functions must be performed to ensure that data across different silos is consistent.

The limitations of process plants and process control system discussed above, and other limitations, may undesirably manifest themselves in the operation and optimization of process plants or process control systems, for instance, during plant operations, trouble shooting, and/or predictive modeling. For example, such limitations force cumbersome and lengthy work flows that must be performed in order to obtain data for troubleshooting and generating updated models. Additionally, the obtained data may be inaccurate due to data compression, insufficient bandwidth, or shifted time stamps.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

In a first embodiment, a mobile user interface device for controlling a process plant includes a processor communicatively coupled to a network, a memory communicatively coupled to the processor and a display communicatively coupled to the processor. The mobile user interface device also includes a communication circuit operable to detect the proximity of the mobile user interface device to an external device and one or more routines stored on the memory device and executable by the processor. The routines cause the processor to transmit, via the network, a first request for first data and to receive first data, via the network, in response to the first request. The routines also cause the processor to cause the display to display the received first data, to receive an indication that the mobile user interface device is in proximity to an external device, to transmit, via the network, a second request for second data according to the received indication; and to receive second data, via the network, in response to the second request.

In another embodiment, a method performed by a mobile user interface device for a process plant includes transmitting, via a network, a first request for first data from a data storage area and receiving, in response to the first request, first data from the storage area. The method also includes causing a display of the mobile user interface device to display the received first data, receiving an indication that the mobile user interface device is in proximity to an external device, transmitting a second request for second data according to the received indication, and receiving second data in response to the second request.

DETAILED DESCRIPTION

Figure 1A:
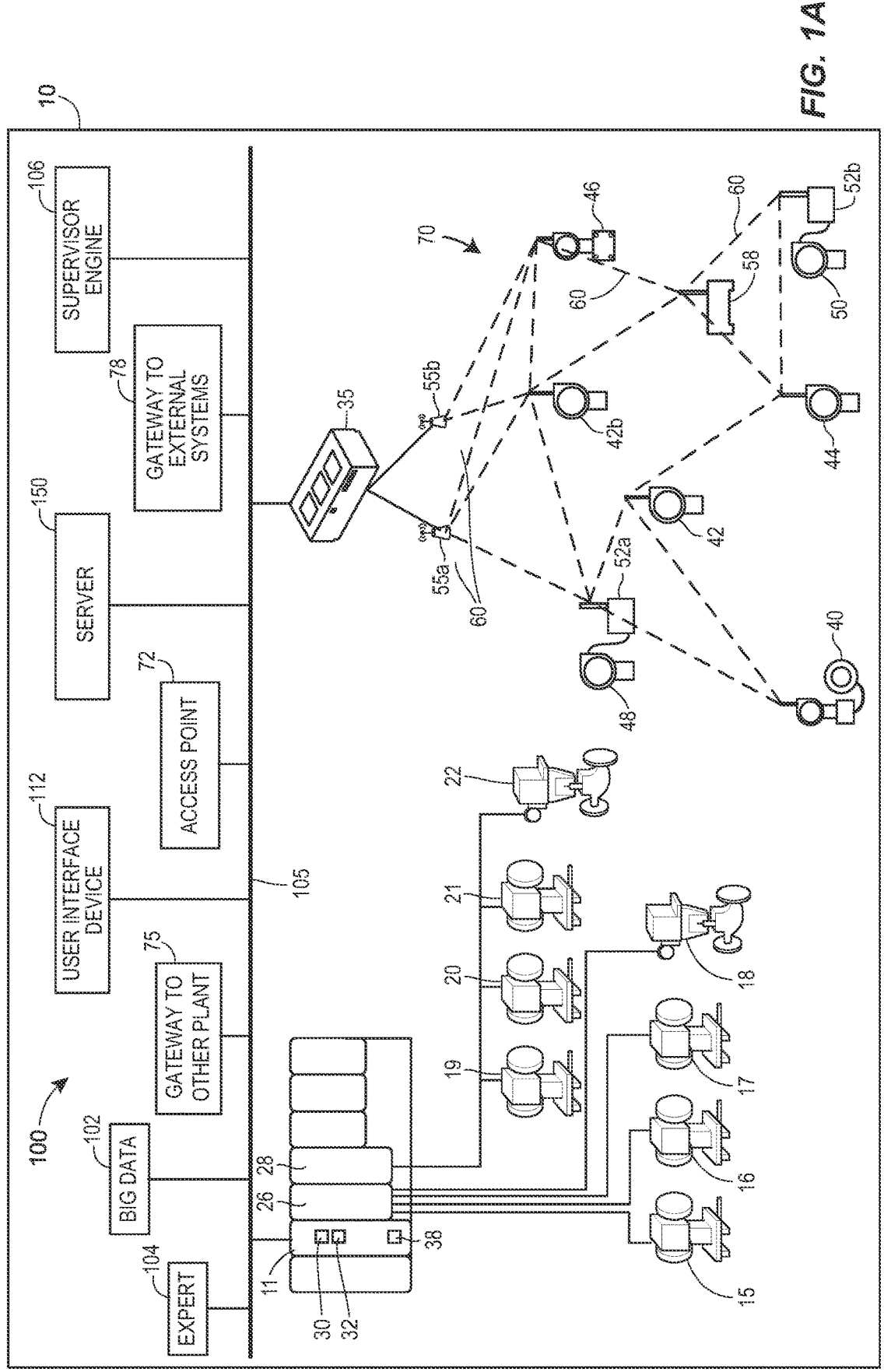
FIG. 1A is a block diagram of an exemplary process control network operating in a process control system or process plant.

Decentralization and mobilization of the control and maintenance facilities associated with a process plant brings with it a variety of attendant advantages. For example, mobile user interface devices cooperate with stationary user interface devices to free operators, maintenance personnel, and other plant personnel from a centralized location, allowing personnel to move throughout the process plant without sacrificing access to information about the operation and status of the process plant. Through implementation of "big data" concepts—i.e., the collection, storage, organization, and mining of one or more collections of data so large or complex that traditional database management tools and/or data processing applications are unable to manage the data sets within a tolerable amount of time—in combination with expert systems, supervisory systems, and context-aware mobile user-interface devices, the process plant can advantageously be managed and maintained more efficiently (e.g., with less maintenance, greater yield, less down time, fewer personnel, less risk to the safety of personnel and equipment, etc.), as described throughout this disclosure.

Generally, the context-aware mobile user interface devices cooperate with the expert systems, supervisory systems, and big data systems to facilitate improved operation of the process plant. The improved operation may be implemented using one or more of the presently described concepts which include, among others, aspects of collaboration, mobility, workflow management, personnel management, automation, accountability, verification, and diagnostics. For example, the apparatus, systems, and methods described herein may facilitate seamless transition from one user-interface device to another (e.g., from a workstation to a tablet device or from a tablet device to a mobile phone) so that a user may have the same or similar information available regardless of moving from one device to another, and/or may facilitate collaboration between multiple personnel in the same or different locations viewing the same or different data, and/or may facilitate the initiation or resumption of a user session regardless of the device on which the user happens to be operating. Mobile ones of the user-interface devices may be device aware and/or location aware, so as to automatically display relevant information (e.g., maps, procedures, diagrams, user manuals), launch applications, and the like. Additionally, cooperation between the expert and supervisory systems and the user-interface devices may facilitate automatic generation, assignment, and management of work items related to operator and/or maintenance personnel activities. For example, as will be described in greater detail below, the expert system may analyze information stored in the big data system and to determine that some task should be performed and may, by cooperating with the supervisor system, create a work item, assign the work item to a person, create a checklist of items necessary for the performance of the work item task, walk the assigned person through the performance of the associated task, and track the progress of the task. These and other aspects will be described throughout.

Turning first to the overall architecture of an example process plant, FIG. 1A is a block diagram of an exemplary process control network 100 operating in a process control system or process plant 10. The process control network 100 may include a network backbone 105 providing connectivity directly or indirectly between a variety of other devices. The devices coupled to the network backbone 105 include, in various embodiments, combinations of access points 72, gateways 75 to other process plants (e.g., via an intranet or corporate wide area network), gateways 78 to external systems (e.g., to the Internet), UI devices 112, servers 150, big data appliances 102 (e.g., including big data historians), big data expert systems 104, supervisor engines 106, controllers 11, input/output (I/O) cards 26 and 28, wired field devices 15-22, wireless gateways 35, and wireless communication networks 70. The communication networks 70 may include wireless devices 40-58, which include wireless field devices 40-46, wireless adapters 52*a* and 52*b*, access points 55*a* and 55*b*, and router 58. The wireless adapters 52*a* and 52*b* may be connected to non-wireless field devices 48 and 50, respectively. The controller 11 may include a processor 30, a memory 32, and one or more control routines 38. Though FIG. 1A depicts only a single one of some of the devices connected to the network backbone 105, it will be understood that each of the devices could have multiple instances on the network backbone 105 and, in fact, that the process plant 10 may include multiple network backbones 105.

The UI devices 112 may be communicatively connected to the controller 11 and the wireless gateway 35 via the network backbone 105. The controller 11 may be communicatively connected to wired field devices 15-22 via input/output (I/O) cards 26 and 28 and may be communicatively connected to wireless field devices 40-46 via the network backbone 105 and a wireless gateway 35. The controller 11 may operate to implement a batch process or a continuous process using at least some of the field devices 15-22 and 40-46. The controller 11, which may be, by way of example, the DeltaV™ controller sold by Emerson Process Management, is communicatively connected to the process control network backbone 105. The controller 11 may be also communicatively connected to the field devices 15-22 and 40-46 using any desired hardware and software associated with, for example, standard 4-20 mA devices, I/O cards 26, 28, and/or any smart communication protocol such as the FOUNDATION® Fieldbus protocol, the HART® protocol, the Wireless HART® protocol, etc. In the embodiment illustrated in FIG. 1A, the controller 11, the field devices 15-22 and the I/O cards 26, 28 are wired devices, and the field devices 40-46 are wireless field devices.

In operation of the UI device 112, the UI device 112 may, in some embodiments, execute a user interface ("UI"), allowing the UI device 112 to accept input via an input interface and provide output at a display. The UI device 112 may receive data (e.g., process related data such as process parameters, log data, sensor data, and/or any other data that may be captured and stored in the big data appliance 102), from the server 150. In other embodiments, the UI may be executed, in whole or in part, at the server 150, where the server 150 may transmit display data to the UI device 112. The UI device 112 may receive UI data (which may include display data and process parameter data) via the backbone 105 from other nodes in the process control network 100, such as the controller 11, the wireless gateway 35, or the server 150. Based on the UI data received at the UI device 112, the UI device 112 provides output (i.e., visual representations or graphics) representing aspects of the process associated with the process control network 100, allowing the user to monitor the process. The user may also affect control of the process by providing input at the UI device 112. To illustrate, the UI device 112 may provide graphics representing, for example, a tank filling process. In such a scenario, the user may read a tank level measurement and decide that the tank needs to be filled. The user may interact with an inlet valve graphic displayed at the UI device 112 and input a command causing the inlet valve to open.

Figure 27:
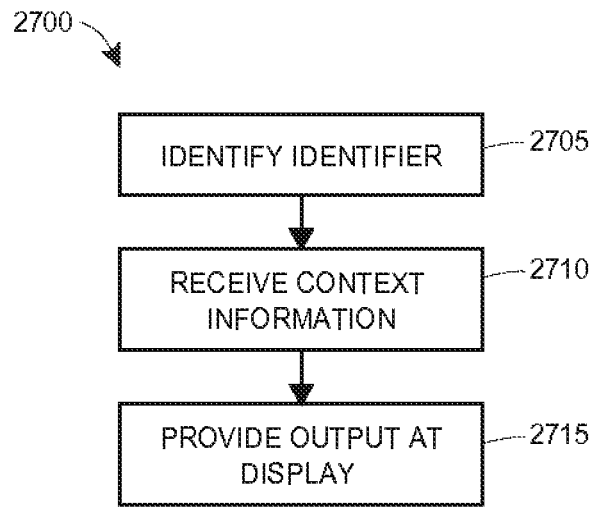
FIG. 27 is a flow chart depicting an exemplary method for generating a graphical user interface.

In further operation, the UI device 112 may execute a number of routines, modules, or services in addition to the UI. In one embodiment the UI device 112 may execute a context awareness routine, which may include, for example, various routines or sub-routines related to location awareness, equipment awareness, or scheduling awareness (as shown in FIG. 27). These context routines may enable the UI device 112 to render a graphical user interface configuration ("GUI configuration") suited to a particular environment or context in which the UI device 112 is operating. The UI device 112 may also execute a state determination routine, enabling the UI device 112 to track and save the state of the UI device 112, including the state of the applications being executed at the UI device 112 (such as the UI). By tracking the state of applications on the UI device 112, the UI device 112 may allow a user to, for example, initiate a session on a first UI device 112 and start using a second UI device 112, resuming work flow from his previous session with minimal interruption.

The UI device 112 (or the server serving an application or screen to the UI device 112) may also execute routines related to managing plant assets. For example, some routines may be used for installing, replacing, maintaining, calibrating, diagnosing, or commissioning assets in the process plant. Other routines may be used to prepare or complete work orders associated with particular assets and/or to notify plant personnel (e.g., personnel in the vicinity of a particular device) of a work order. The UI device 112 may execute routines related to monitoring the process. For example, some routines may be used for field logging instrument data, reporting lab samples, displaying real-time asset parameters, and the like. The UI device 112 may further execute routines related to compliance with plant procedures and workflow. For example, some routines may provide information related to standard operating procedures (SOPs), start-up procedures, shut-down procedures, lockout procedures, work instructions, or other product/asset documentation. Still additional routines may, when the UI device 112 is coupled to a network, facilitate immediate delivery of work orders and immediate system availability to off-line, manually entered data. Communication routines may include e-mail routines, text messaging routines, instant messaging routines, etc., for facilitating communication between plant personnel and/or external parties providing technical or other support.

The UI device 112 (or the server serving an application or screen to the UI device 112) may further include routines supporting and/or facilitating one or more audit processes. The audit processes may include, for example, work audits and/or regulatory audits. In embodiments, the routines may allow a user to view data and/or generate reports related to data collected, maintained, and/or collated for the purposes of satisfying regulatory requirements. For purposes of illustration, where the mobile control room is implemented in a pharmaceutical manufacturing plant, the mobile control room may facilitate viewing or reporting of data collected for the purposes of satisfying government requirements related to the safety of the product output of the plant. In embodiments, the routines may allow a user to view and/or generate reports related to auditing of work orders, maintenance, or other plant processes.

In certain embodiments, the UI device 112 may implement any type of client, such as a thin client, web client, or thick client. For example, the UI device 112 may depend on other nodes, computers, or servers for the bulk of the processing necessary for operation of the UI device 112. In such an example, the UI device 112 may communicate with the server 150, where the server 150 may communicate with one or more other nodes on the process control network 100 and may determine the display data and/or process data to transmit to the UI device 112. Furthermore, the UI device 112 may pass any data related to received user input to the server 150 so that the server 150 may process the data related to user input and operate accordingly. In other words, the UI device 112 may do little more than render graphics and act as a portal to one or more nodes or servers that store the data and execute the routines necessary for operation of the UI device 112. A thin client UI device offers the advantage of minimal hardware requirements for the UI device 112.

In other embodiments, the UI device 112 may be a web client. In such an embodiment, a user of the UI device 112 may interact with the process control system via a browser at the UI device 112. The browser enables the user to access data and resources at another node or server 150 (such as the server 150) via the backbone 105. For example, the browser may receive UI data, such as display data or process parameter data, from the server 150, allowing the browser to depict graphics for controlling and/or monitoring some or all of the process. The browser may also receive user input (such as a mouse click on a graphic). The user input may cause the browser to retrieve or access an information resource stored on the server 150. For example, the mouse click may cause the browser to retrieve (from the server 150) and display information pertaining to the clicked graphic.

In yet other embodiments, the bulk of the processing for the UI device 112 may take place at the UI device 112. For example, the UI device 112 may execute the previously discussed UI, state determination routine, and context awareness routine. The UI device 112 may also store, access, and analyze data locally.

In operation, a user may interact with the UI device 112 to monitor or control one or more devices in the process control network 100, such as any of the field devices 15-22 or the devices 40-48. The user may interact with the UI device 112, for example, to modify or change a parameter associated with a control routine stored in the controller 11. The processor 30 of the controller 11 implements or oversees one or more process control routines (stored in a memory 32), which may include control loops. The processor 30 may communicate with the field devices 15-22 and 40-46 and with other nodes that are communicatively connected to the backbone 105. It should be noted that any control routines or modules (including quality prediction and fault detection modules or function blocks) described herein may have parts thereof implemented or executed by different controllers or other devices if so desired. Likewise, the control routines or modules described herein which are to be implemented within the process control system 10 may take any form, including software, firmware, hardware, etc. Control routines may be implemented in any desired software format, such as using object oriented programming, ladder logic, sequential function charts, function block diagrams, or using any other software programming language or design paradigm. In particular, the control routines may be implemented by a user through the UI device 112. The control routines may be stored in any desired type of memory, such as random access memory (RAM), or read only memory (ROM). Likewise, the control routines may be hard-coded into, for example, one or more EPROMs, EEPROMs, application specific integrated circuits (ASICs), or any other hardware or firmware elements. Thus, the controller 11 may be configured (by a user using a UI device 112 in certain embodiments) to implement a control strategy or control routine in any desired manner.

In some embodiments of the UI device 112, a user may interact with the UI device 112 to implement a control strategy at the controller 11 using what are commonly referred to as function blocks, wherein each function block is an object or other part (e.g., a subroutine) of an overall control routine and operates in conjunction with other function blocks (via communications called links) to implement process control loops within the process control system 10. Control based function blocks typically perform one of an input function, such as that associated with a transmitter, a sensor or other process parameter measurement device; a control function, such as that associated with a control routine that performs PID, fuzzy logic, etc. control; or an output function which controls the operation of some device, such as a valve, to perform some physical function within the process control system. Of course, hybrid and other types of function blocks exist. The function blocks may have graphical representations that are provided at the UI device 112, allowing a user to easily modify the types of function blocks, the connections between the function blocks, and the inputs/outputs associated with each of function blocks implemented in the process control system. Function blocks may be stored in and executed by the controller 11, which is typically the case when these function blocks are used for, or are associated with standard 4-20 mA devices and some types of smart field devices such as HART devices, or may be stored in and implemented by the field devices themselves, which can be the case with Fieldbus devices. The controller 11 may include one or more control routines 38 that may implement one or more control loops. Each control loop is typically referred to as a control module, and may be performed by executing one or more of the function blocks.

The UI device 112 interacts, in embodiments, with the big data appliance 102 and/or the expert system 104 and/or the supervisor engine 106. The big data appliance 102 may collect and store all types of process control data from the process plant 10, including sensor data, control parameters, manually input data (e.g., data collected by personnel as they move around the process plant 10), personnel locations and command inputs, time stamps associated with all of the data, and any other type of data available in the process plant 10. The expert system 104, communicatively coupled to the big data appliance 102, may operate independently or according to specific user inputs to analyze process plant data stored in the big data appliance 102. The expert system 104 may develop and/or use models, recognize data trends and/or correlations, alert plant personnel to actual or predicted problems and/or abnormal situations and/or sub-optimal conditions that may be affecting or will soon affect the process plant 10, etc. In some embodiments, the expert system 104 performs these functions without being programmed specifically to associate a particular set of data or trends with a particular problem or condition and, instead, recognizes that a current trend or data concurrence has occurred before at or around the time of a previous condition (which could be a positive/desirable condition or a negative/undesirable condition). From the recognition of the prior occurrence of the trend or data concurrence, the expert system 104 may predict the condition ("pro-nostics"). The expert system 104 may also determine from the data stored in the big data appliance 102 which process variables, sensor readings, etc. (i.e., which data) are most important in detecting, predicting, preventing and/or correcting an abnormal situation in the process plant 10. For example, the expert system 104 may determine that hydrocarbons are being vented from a stack and may automatically determine the cause of the hydrocarbon venting and/or cause work items to be generated (e.g., by the supervisor engine 106) to correct the problem causing the hydrocarbon venting and/or cause work items to be generated to inspect equipment or observe/record a parameter that is not available via the network. As another example, the expert system 104 may determine that a trend indicated by a series of previous data points indicates a predicted abnormal situation, a predicted maintenance concern, a predicted failure, etc.

As described in detail below, the supervisor engine 106 may interact with the big data appliance 102 and/or the expert system 104 to perform automatically and/or facilitate various supervisory activities. For example, the supervisor engine 106 may monitor trends identified by the expert system 104 and create work items for plant personnel. As another example, the supervisor engine 106 may monitor calibration status of process plant resources and may create work items for plant personnel. In connection with these functions, the supervisor engine 106 may also manage personnel certifications, permissions to access equipment during performance of scheduled work items, and timing of work item performance. The supervisor engine 106 may interact with the UI devices 112 to assign and track the performance of work items, and follow-up after the completion of a work item to verify that the status or indication that resulted in the creation of the work item (e.g., the identified trend, abnormal situation, etc.) is resolved. For instance, the supervisor engine 106 may determine from the expert engine 104 that a valve is faulty and create a work item. The supervisor engine 106 may later determine that an maintenance worker carrying a UI device 112 is in the vicinity of the faulty valve, and request to assign the work item to the maintenance worker, who may, via the UI device 112, accept the work item. The supervisor engine 106 may verify that the maintenance worker has the proper skill set to perform the work item, and may provide the necessary permissions for the maintenance worker to perform the work item. Additionally, the supervisor engine 106 may reschedule process control activities so that the work item may be completed. The supervisor engine 106 may provide standard operating procedures, manuals, and other documentation to the personnel before and/or during the performance of the work item. These are but a few examples of the supervisor engine 106, which will be further explained below.

Referring still to FIG. 1A, the wireless field devices 40-46 communicate in a wireless network 70 using a wireless protocol, such as the Wireless HART protocol. In certain embodiments, the UI device 112 may be capable of communicating with the wireless field devices 40-46 using the wireless network 70. Such wireless field devices 40-46 may directly communicate with one or more other nodes of the process control network 100 that are also configured to communicate wirelessly (using the wireless protocol, for example). To communicate with one or more other nodes that are not configured to communicate wirelessly, the wireless field devices 40-46 may utilize a wireless gateway 35 connected to the backbone 105. Of course, the field devices 15-22 and 40-46 could conform to any other desired standard(s) or protocols, such as any wired or wireless protocols, including any standards or protocols developed in the future.

The wireless gateway 35 is an example of a provider device 110 that may provide access to various wireless devices 40-58 of a wireless communication network 70. In particular, the wireless gateway 35 provides communicative coupling between the wireless devices 40-58 and other nodes of the process control network 100 (including the controller 11 of FIG. 1A). The wireless gateway 35 provides communicative coupling, in some cases, by the routing, buffering, and timing services to lower layers of the wired and wireless protocol stacks (e.g., address conversion, routing, packet segmentation, prioritization, etc.) while tunneling a shared layer or layers of the wired and wireless protocol stacks. In other cases, the wireless gateway 35 may translate commands between wired and wireless protocols that do not share any protocol layers. In addition to protocol and command conversion, the wireless gateway 35 may provide synchronized clocking used by time slots and superframes (sets of communication time slots spaced equally in time) of a scheduling scheme associated with the wireless protocol implemented in the wireless network 30. Furthermore, the wireless gateway 35 may provide network management and administrative functions for the wireless network 70, such as resource management, performance adjustments, network fault mitigation, monitoring traffic, security, and the like.

Similar to the wired field devices 15-22, the wireless field devices 40-46 of the wireless network 70 may perform physical control functions within the process plant 10, e.g., opening or closing valves or take measurements of process parameters. The wireless field devices 40-46, however, are configured to communicate using the wireless protocol of the network 70. As such, the wireless field devices 40-46, the wireless gateway, and other wireless nodes 52-58 of the wireless network 70 are producers and consumers of wireless communication packets.

In some scenarios, the wireless network 70 may include non-wireless devices. For example, a field device 48 of FIG. 1A may be a legacy 4-20 mA device and a field device 50 may be a traditional wired HART device. To communicate within the network 30, the field devices 48 and 50 may be connected to the wireless communication network 70 via a wireless adaptor (WA) 52a or 52b. Additionally, the wireless adaptors 52a, 52b may support other communication protocols such as Foundation® Fieldbus, PROFIBUS, DeviceNet, etc. Furthermore, the wireless network 30 may include one or more network access points 55a, 55b, which may be separate physical devices in wired communication with the wireless gateway 35 or may be provided with the wireless gateway 35 as an integral device. The wireless network 70 may also include one or more routers 58 to forward packets from one wireless device to another wireless device within the wireless communication network 30. The wireless devices 32-46 and 52-58 may communicate with each other and with the wireless gateway 35 over wireless links 60 of the wireless communication network 70.

Accordingly, FIG. 1A includes several examples of provider devices which primarily serve to provide network routing functionality and administration to various networks of the process control system. For example, the wireless gateway 35, the access points 55a, 55b, and the router 58 include functionality to route wireless packets in the wireless communication network 70. The wireless gateway 35 performs traffic management and administrative functions for the wireless network 70, as well as routes traffic to and from wired networks that are in communicative connection with the wireless network 70. The wireless network 70 may utilize a wireless process control protocol that specifically supports process control messages and functions, such as Wireless HART.

In certain embodiments, the process control network 100 may include other nodes connected to the network backbone 105 that communicate using other wireless protocols. For example, the process control network 100 may include one or more wireless access points 72 that utilize other wireless protocols, such as WiFi or other IEEE 802.11 compliant wireless local area network protocols, mobile communication protocols such as WiMAX (Worldwide Interoperability for Microwave Access), LTE (Long Term Evolution) or other ITU-R (International Telecommunication Union Radiocommunication Sector) compatible protocols, short-wavelength radio communications such as near field communications (NFC) and Bluetooth, or other wireless communication protocols. Typically, such wireless access points 72 allow handheld or other portable computing devices to communicate over a respective wireless network that is different from the wireless network 70 and that supports a different wireless protocol than the wireless network 70. In some embodiments, the UI device 112 communicates over the process control network 100 using a wireless access point 72. In some scenarios, in addition to portable computing devices, one or more process control devices (e.g., controller 11, field devices 15-22, or wireless devices 35, 40-58) may also communicate using the wireless network supported by the access points 72.

Additionally or alternatively, the provider devices may include one or more gateways 75, 78 to systems that are external to the immediate process control system 10. In such embodiments, the UI device 112 may be used to control, monitor, or otherwise communicate with said external systems. Typically, such systems are customers or suppliers of information generated or operated on by the process control system 10. For example, a plant gateway node 75 may communicatively connect the immediate process plant 10 (having its own respective process control data network backbone 105) with another process plant having its own respective network backbone. In an embodiment, a single network backbone 105 may service multiple process plants or process control environments.

In another example, the plant gateway node 75 may communicatively connect the immediate process plant to a legacy or prior art process plant that does not include a process control network 100 or backbone 105. In this example, the plant gateway node 75 may convert or translate messages between a protocol utilized by the process control big data backbone 105 of the plant 10 and a different protocol utilized by the legacy system (e.g., Ethernet, Profibus, Fieldbus, DeviceNet, etc.). In such an example, the UI device 112 may be used to control, monitor, or otherwise communicate with systems or networks in said legacy or prior art process plant.

The provider devices may include one or more external system gateway nodes 78 to communicatively connect the process control network 100 with the network of an external public or private system, such as a laboratory system (e.g., Laboratory Information Management System or LIMS), a personnel rounds database, a materials handling system, a maintenance management system, a product inventory control system, a production scheduling system, a weather data system, a shipping and handling system, a packaging system, the Internet, another provider's process control system, or other external systems. The external system gateway nodes 78 may, for example, facilitate communication between the process control system and personnel outside of the process plant (e.g., personnel at home). In one such instance, an operator or maintenance technician may use the UI device 112 from her home, connecting to the network backbone 105 via a home network (not shown), the Internet, and the gateway 78. In another instance, an operator or maintenance technician may use the UI device 112 from any location, connecting to the network backbone 105 via a mobile telephony network (not shown), the Internet, and the gateway 78. The gateway nodes 78 may also facilitate communication between plant personnel in the process plant and entities or people outside of the process plant. For example, a technician performing service on a process control device in the process plant may communicate from her UI device 112 with a support representative from the manufacturer of the process control device. In still another example, the supervisor engine 106 may monitor weather, track incoming supply shipments, track financial data (e.g., commodity futures), and the like, to assist the supervisor engine 106 in scheduling work items, managing production schedules, etc. Of course, all connections formed via the gateway 78 (or the gateway 75 or, in fact, between any two devices) may be secured connections (e.g., encrypted connections, firewalled connections, etc.).

Although FIG. 1A illustrates a single controller 11 with a finite number of field devices 15-22 and 40-46, this is only an illustrative and a non-limiting embodiment. Any number of controllers 11 may be included in the provider devices of the process control network 100, and any of the controllers 11 may communicate with any number of wired or wireless field devices 15-22, 40-46 to control a process in the plan 10. Furthermore, the process plant 10 may also include any number of wireless gateways 35, routers 58, access points 55, wireless process control communication networks 70, access points 72, and/or gateways 75, 78.

Figure 1B:
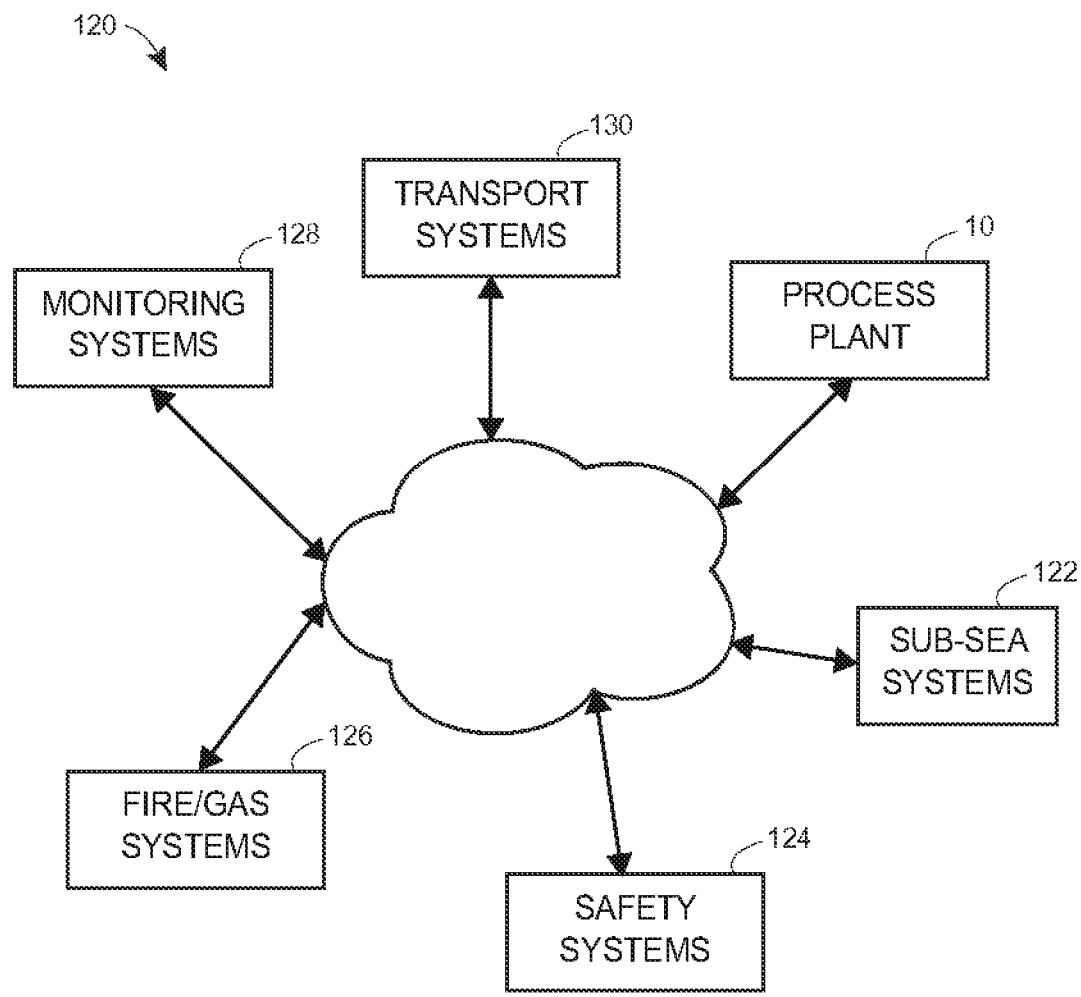
FIG. 1B is a block diagram depicting a broader control network.

FIG. 1B is a block diagram illustrating a broader control system 120, which may include a variety of different systems or system functions. The control system 120 includes the process plant 10, which, as a non-limiting example, may be a crude oil refinery. The system 120 may also be coupled to sub-sea systems 122, such as drilling or exploration systems, for example. Various safety systems 124 may likewise be included in the system 120, as may fire & gas systems 126, monitoring systems 128, and transport systems 130 (e.g., for transporting crude oil to a refinery). While FIG. 1B depicts each of the elements 10 and 122-130 as a separate aspects, it is noted that various ones of the aspects could be combined. For example, the process plant 10 may, in some embodiments, include the safety systems 124 and/or the fire and gas systems 126. FIG. 1B is intended to illustrate that the present description is not limited in scope to the process plant described with respect to FIG. 1A, and may be applicable to other control, monitoring, and safety systems, and the like. While the present description describes embodiments in terms of the process control plant 10, this convention is for purposes of convenience only, and is not intended to be limiting.

The following examples illustrate several scenarios implementing in a process plant, such as the process plant 10, the concepts described in this specification, and highlight the advantages of such implementations.

Example 1

A first user assigned to a particular area of the plant may monitor the assigned plant area via a stationary workstation in a control room. The first user monitors and controls the process via a browser or other application executing on the workstation, which browser or application communicates with a routine executing at a server. The first user, may decide to go to the floor of the process plant, to inspect the plant, for example. As the user leaves the control room, the user may pick up a touch-sensitive tablet device (i.e., a second, mobile user-interface device) and walk out of the control room toward the plant. The tablet, like the workstation, enables the first user to access the routine at the server via a browser or application executing on the tablet device. The first user may be already authenticated on the tablet, or the tablet may be associated with the first user. The tablet communicates with the server to establish a session unique to the first user. The server may store state information associated with the first user at the workstation and provide the first user, via the browser or application operating on the tablet, a user interface on the tablet according to the stored state information. Thus, the first user is able to resume a workflow initiated at the workstation.

In some circumstances, the a routine operating on the mobile device may generate a route for the first user. The routine, perhaps cooperating with the expert and/or supervisor systems, may identify plant assets that need to be monitored or serviced. In some cases there may be a priority associated with each asset that needs monitoring or servicing, indicating the urgency to monitor or service the asset. The routine may determine a route for the first user that allows the user to efficiently visit at least some of the assets that need monitoring or servicing.

As the first user moves around the plant, a context awareness routine executing at the tablet receives data from various sensors and receivers in the tablet device (e.g., an NFC or RFID transceiver). The sensors and receivers detect devices, equipment, and/or tags proximate to the tablet. In other embodiments, the tablet may have a GPS receiver for receiving location data and may upload the location data to the server so that the routine may execute with an awareness of the user's location. In any event, the routine may identify the tablet's location or proximity to certain devices and cause the tablet to display for the first user a process plant overview map/graphic, zoomed into the general location of the first user and tablet. As the first user moves through the plant, the plant map display may dynamically change to focus on the area of the map corresponding to the tablet's location.

In some instances, the plant map may include navigation functionality. For example, the first user may select a particular plant area/device/asset as a destination. The routine may then use location data (e.g., received from a GPS receiver) to provide directions to the particular plant area/device/asset.

The tablet may also display various process data or alarms as the first user walks through the plant 10. For example, the first user may pass a pump, causing the tablet to display operational data, graphics, and alarms pertaining to the pump, especially if the pump requires attention. The tablet may, for instance, receive a unique identifier from an NFC or RFID tag on or near the pump. The tablet may transmit the unique identifier to the routine via the server. The routine may receive the unique identifier and access a database that correlates the unique identifier to entities in the process plant. For example, the unique identifier may correlate to pump data, such as display data, parameter data, and alarm data pertaining to the pump. After identifying the pump data, the routine may transmit the pump data to the tablet, resulting in the tablet rendering graphics and providing graphics, parameters, and/or alarms pertaining to the pump.

In a further example, the first user may realize that the pump is malfunctioning. The first user may interact with a pump graphic or menu depicted at the tablet display, and may touch the tablet display at the graphic location, the graphic representing a shut-off command. The tablet may detect the first user input (e.g., capacitive touch input) and generate corresponding input data. The tablet may then transmit the input data to the server, which receives the input data transmits a shut-down signal to the controller that controls the pump. The controller receives the signal and turns the pump off. The first user may create a task or work item associated with the pump. For example, the work item may be a request for maintenance personnel to inspect and/or fix the pump.

The routine on the tablet may also facilitate a lockout/tagout procedure. For example, the routine may display the proper lockout/tagout procedure for the particular pump. In some instances, the first user, wishing to lockout the pump for safety reasons, may interact with a task list displayed by the tablet to indicate that a particular task in the lockout procedure has been completed, for example. In other circumstances, the first user may interact with the routine to test a fail-safe condition for the pump. For example, a simulated signal may be generated to simulate the fail-safe condition, allowing the first user to observe the pump's response.

Example 2

The first user, still carrying the tablet, may begin walking from the process plant toward a control room of the process plant. The first user may walk by a boiler. As the first user comes into proximity with the boiler, the tablet establishes RFID communication with a boiler context ID device. The tablet may receive a unique identifier from the context ID device and transmit the unique identifier to the server. The server may identify the boiler based on the unique identifier. The server may access context data to determine that the boiler has an associated work item, and compare a skill threshold associated with the work item to a skill level associated with the first user's profile. Determining that the first user is unqualified to work on the work item associated with the boiler, the server may forego altering the display of tablet instead of updating the display with information about the work item.

The user may continue walking through the plant, still carrying the tablet, and may walk by a valve. As described above, the tablet may establish communication with a valve context ID device. The tablet may then receive from the device a unique identifier and transmit the unique identifier to the server. The server may identify the valve based on the unique identifier. The server may then access context data to determine that the valve has an associated schedule indicating that the valve is currently scheduled to be out of commission for maintenance. The server transmits data to the tablet, causing the tablet to provide information to the first user, where the information indicates to the first user that the valve is currently scheduled for maintenance.

Example 3

The first user continues walking through the plant, still with the tablet in hand. A second user, in the control room and now logged into the workstation formerly occupied by the first user (or a different workstation), may notice that a critical O2 gas measurement associated with a furnace stack is dropping. The second user creates a work item requesting assistance with the furnace stack. As the first user passes the furnace stack on his way back to the control room, the tablet may automatically establish communication with a furnace stack context ID device, resulting in the tablet receiving a unique identifier associated with the furnace stack. The tablet may transmit the unique identifier to the server, which may return information associated with the unique identifier (e.g., information about the furnace stack), including a notification graphic that the furnace stack requires attention. The first user may see and select the notification graphic, resulting in display of information pertaining to the created work item. The first user may select a graphic to indicate acceptance of the work item.

The work item may request that the first user take one or more pictures of the flame at the furnace (e.g., because flame color may indicate inadequate air flow). The picture of the flame may be transmitted to the server. An analysis routine operating on the server, on a big data appliance, or as part of an expert system, may analyze aspects of the image or may compare the image of the flame to other images, captured at other times and/or under other conditions, stored on the big data system or appliance. The analysis routine may analyze the images (by comparing the images to the collection of previous flame images and corresponding operational data, for example). The big data analysis routine may indicate that air flow at the furnace is low. Based on the analysis, the expert system may direct the first user to increase the air flow to the furnace. In some embodiments, the first user may use the tablet to retrieve and display operating procedures for increasing air to the furnace and, in fact, the tablet may automatically display the procedures when the expert system directs the user to increase the air flow, in embodiments. If desired, the first user may capture an additional image of the flame, after the adjustment, and transmit the image to the analysis routine to confirm that the furnace stack is operating properly.

The first user may also use the tablet to capture audio associated with the furnace and transmit the audio to the server, big data appliance, or expert system. An analysis routine operating, for example, on the expert system, may compare the audio to a sound signature associated with the furnace to determine if the furnace is operating normally. The analysis routine may also compare the captured audio to audio associated with known problems. For example, belt or motor problems may be associated with particular sounds, and the analysis routine may detect such problems by comparing the captured audio to said sounds. Similarly, the first user may place the tablet on or near the furnace to detect vibration associated with the furnace. The tablet may receive vibration data via a motion sensor and transmit the vibration data to a server or big data appliance. An analysis routine may compare the detected vibration to a signature vibration level associated with the furnace (or to vibration levels associated with known problems) to determine if the furnace is operating normally. In any event, the analysis of audio/vibration may reveal no other problems associated with the furnace and/or confirm that the furnace needs increased air-flow.

While the first user increases air flow at the furnace, the second user may run a query on the furnace to see if previous users have also been increasing air flow over the past several shifts. The query confirms that they have. The second user may pull up a graph showing air flow through the furnace with event information for each time air flow was increased, who made the changes, etc., all of which has been stored in the big data appliance. The second user may share this information with the first user, for example by requesting a shared user-interface (UI) session. The first user may receive, via the server, the request for the UI session. If the first user accepts the request, the server may capture state information associated with the UI displayed to the second user, and may cause the display of the tablet the first user is using to display data according to the state information from the second user. Together, the first and second users may review the data regarding the furnace and may determine that the furnace frequently experiences similar problems. The second user may then query the big data system about low O2 gas measurement events at the furnace. The big data system may provide a number of events, devices, users, times, and other factors that correlate to low O2 gas measurement events at the furnace. For example, the big data analysis may reveal that low O2 gas measurements are strongly correlated to events at related process units, where the correlated events frequently precede the low O2 gas measurements. In another example, the analysis may reveal that a particular user is strongly correlated to the low O2 gas measurement events. In other words, the analysis may reveal that the particular user is controlling the furnace in a manner that is causing the low O2 gas measurements. While this example illustrates a user utilizing a UI device to request an analysis and display the results of the analysis, it should be noted that the big data system may also use data from and collected by the UI device (tablet in this scenario) to use for other analysis that may or may not be related to the UI device. In any event, the second user may flag the work item for further review and create a maintenance ticket to have someone check the furnace at some point in the near future.

Example 4

At a later time, maintenance personnel may inspect the furnace and find that the furnace was operating improperly because of at a point at which a fuel input is coupled to the furnace, and may create a work item to correct the problem. The work item may have an associated task indicating that the fuel input pipe should be welded to the furnace fuel input, specifying the target equipment (i.e., the furnace), and indicating the skills required to perform the task (i.e., welding skills) The work item may optionally specify a deadline for performance of the work item.

The supervisor module may schedule the performance of the work item. For example, the supervisor module may schedule the performance of the work item for a day when the plant (or the area of the plant in which the furnace is located) is scheduled to be offline for maintenance. Alternatively or additionally, the supervisor module may schedule it according to the availability of personnel with the required skills Having identified a welder with the appropriate skills, the supervisor module may assign the work item to the welder, and wait for the welder to accept the assigned work item. When the welder accepts the work item, the supervisor module creates permission tokens granting the welder access to the necessary plant functions and equipment at the time at which the work item is to be performed.

At the appointed time, the welder may arrive at an equipment room with his assigned mobile user interface device, which may have reminded her that she is scheduled to perform the work item (i.e., to weld the furnace connection). Upon acknowledging the reminder, the UI device may display a checklist, generated by the supervisor module, relating to the work item. The checklist may remind the welder that she needs to bring with her safety equipment (e.g., a welding mask and gloves), welding equipment (e.g., a welding power supply, electrodes, a filler material, etc.), and anything else necessary to perform the task (e.g., replacement parts). The checklist may also specify certain tasks to be performed before moving to the target equipment. As the welder verifies (e.g., via the user interface device) to the supervisor module that she has all of the equipment on the checklist, and has performed the specified tasks on the checklist, the welder may leave the equipment room.

Sensing that the welder has exited the equipment room, the UI device switches into a map or guidance mode and displays information about the location of the welder within the process plant, as well as information that guides the welder to the target equipment (the furnace, in this case). When the UI device senses that the welder has arrived at the furnace, the UI device automatically displays procedures relevant to the work item task (which may be provided by the supervisor module, for example). For example, the UI device may first display for the welder the safety procedures and information necessary to make sure that the work item task can be performed safely, such as displaying information about what material the fuel pipe to be welded to the furnace normally carries, what material was the last material flowing through the pipe, whether the pipe has been drained, whether the pipe is currently in service, and whether any residual material is detectable in the pipe. The UI device may also display, step by step and/or with graphics, a procedure for clearing any residual material from the pipe to make sure that the welding procedure can be performed safely (e.g., without causing an explosion). The UI device may also provide instructions for, and facilitate, shutting down and/or locking out portions of the system such as, for example, upstream valves that would allow gas to flow into the pipe, igniters in the furnace, and any other equipment that could subject the procedure, the welder, or the process plant to unnecessary risk. The welder may then perform the welding procedure, following instructions or other guidance if provided by the UI device, before releasing any lockouts and indicating the supervisor module, via the UI device, that the procedure is complete, after which the supervisor module may automatically create a work item to have a second person check the weld before returning the plant (or portion of the plant) to service.

These examples are illustrative of some of the advantages of the systems, apparatus, and methods described throughout the rest of this specification.

It is contemplated that the presently described concepts are integrated with systems already implemented in the process control plant. That is, in embodiments, implementation of these concepts do not require an entirely new process control system and, instead, may be integrated seamlessly with existing software and hardware elements in the plant.

The Big Data Network

In certain embodiments, the disclosed UI devices, servers, and routines may be implemented in a process control network supporting a big data infrastructure (i.e., a big data network). A big data network may support large scale data mining and data analytics of process data. A big data network or system may also include a plurality of big data network nodes to collect and store all (or almost all) data that is generated, received, and/or observed by devices included in and associated with the process control system or plant 10. A big data network may include a big data appliance (e.g., the big data appliance 102), which may include a unitary, logical data storage area configured to store, sometimes using a common format, multiple types of data that are generated by or related to the process control system, to the process plant 10, and to one or more processes being controlled by the process plant 10. For example, the unitary, logical data storage area may store time-stamped configuration data, continuous data, event data, plant data, data indicative of a user action, network management data, and data provided by or to systems external to the process control system or plant. These data may also include data related to personnel, data related to raw and/or processed materials, data related to personnel restrictions, qualification, and certifications, data related to calibration and maintenance schedules, and the like. The data collected by the big data network may, for instance, be data logs that track personnel and inputs received from those personnel. Such data can be helpful for improving plant operation and efficiency. For example, the log data may be mined and analyzed by the expert system to provide valuable insight into operator inputs in various situations. The results may be used to improve operator training and/or to improve responses—either automated or manual—in various situations. In any event, such data is required in many instances for regulatory purposes.

As used herein, the word "unitary," when applied to the logical data storage area of the big data appliance 102, is not intended to mean a single storage device. As generally known, multiple (indeed many) storage devices of a first size (or various first sizes) may be communicatively coupled to form a storage area of a second, larger size. These may nevertheless be considered a "unitary" logical data storage for the purposes of this description. Generally, the big data appliance 102 is configured to receive data (e.g., via streaming and/or via some other protocol) from the big data network nodes of the big data network and to store the received data. As such, the process control big data appliance 102 may include the unitary, logical data storage area for historizing or storing the data that is received from the big data nodes, a plurality of appliance data receivers for receiving the data, and a plurality of appliance request servicers, as described in U.S. patent application Ser. No. 13/784,041, which is hereby incorporated herein by reference, in its entirety and for all purposes.

A process control big data system may automatically collect all data that is generated at, received by or obtained by the nodes at the rate at which the data are generated, received or obtained, and may cause the collected data to be delivered in high fidelity (e.g., without using lossy data compression or any other techniques that may cause loss of original information) to the process control system big data appliance 102 to be stored (and, optionally, delivered to other nodes of the network). The process control system big data system also may be able to provide sophisticated data and trending analyses for any portion of the stored data. For example, the process control big data system may be able to provide automatic data analysis across process data (that, in prior art process control systems, is contained in different database silos) without requiring any a priori configuration and without requiring any translation or conversion. Based on the analyses, the process control system big data system may be able to automatically provide in-depth knowledge discovery, and may suggest changes to or additional entities for the process control system. Additionally or alternatively, the process control system big data system may perform actions (e.g., prescriptive, predictive, or both) based on the knowledge discovery. The process control system big data system may also enable and assist users in performing manual knowledge discovery, and in planning, configuring, operating, maintaining, and optimizing the process plant and resources associated therewith.

Expert System

The expert system 104 is a collection of routines and/or modules configured to access and analyze data that is collected and stored by the big data appliance 102. Though illustrated and described throughout the specification as a module separate from the big data appliance 102, in embodiments, the expert system 104 may be incorporated within the big data appliance 102. Additionally, the expert system 104 may include a multiplicity of modules or routines operating in different process areas and/or in different process equipment. For example, expert system functionality may reside in one or more controllers 11, in one or more process control devices 15-22, etc. In any event, the expert system 104 uses the data collected and stored by the big data appliance 102 to identify trends, perform diagnostics, monitor operator inputs, improve modeling of the process plant and/or of portions of the process plant, monitor material supplies, monitor output quality and quantity, model various aspects of the operation of the plant, and countless other activities. The expert system 104 may use pre-defined models to perform analysis of the collected data and/or may actively (and possibly automatically) generate models according to analysis of the data. Though the expert system 104 may perform many different types of analysis, some examples are provided below. The examples are not intended to limit the scope of the functionality of the expert system 104, but instead to illustrate a portion of the possible functionality.

In an example, the expert system 104 monitors (in real time or after collection and storage) data collected and stored by the big data appliance 102, and performs analysis of data related to a specific alarm or alarm type. The expert system 104 may be programmed to analyze the process parameters, process inputs, sensor data, and any other data stored in the big data appliance 102 to determine any common characteristics (trends, values, etc.) that are associated with a particular alarm. The association may be a temporal association, but need not be concurrent with the alarm. For example, the expert system 104 may analyze the data to determine whether a particular operator input occurs with a similar temporal relationship to the alarm. More specifically, the expert system 104 may determine a confluence of multiple factors that precedes, or is otherwise predictive, of the alarm condition, determining, for example, that when the temperature in a particular tank is rising, and an operator releases a particular catalyst in a specific amount into the tank, the pressure in the tank rises at a specific rate and causes the alarm condition.

In another example, the expert system 104 may be programmed to perform statistical analysis on data collected and stored by the big data appliance 102 to determine the strength of correlations between events and process parameters. For instance, while a veteran operator may have a "gut" feeling about the relationships between various processors, the operator's intuition is likely less reliable than a rigorous analysis of the data, which may lead the operator to respond to a process control situation (e.g., a rising tank temperature, a dipping pressure, etc.) by making adjustments to the process that may exacerbate the situation or, at least, may not correct the situation as quickly or to the same extent as other or additional adjustments might. Thus, the expert system 104 may improve overall control, safety, quality, and output of the process by providing information to operators and other personnel that they might otherwise not know or understand.

In still another example, the expert system 104 is programmed to make adjustments to the process operating on the process plant 10 in accordance with analysis (e.g., the analysis described in the preceding paragraphs). The expert system 104 may identify a sub-optimal or abnormal condition and may act to correct the condition by changing one or more process inputs and/or set points. Additionally, the expert system 104 may be integrated with other safety systems in the process plant 10 to arrest and/or correct process conditions that may result in safety hazards to equipment and/or personnel.

Supervisor Engine

The implementation of the mobile control room by way of the UI devices 112 facilitates dispersion of control, maintenance, and other aspects of the process plant (or of other, similar environments). That is, operators are no longer tied to a workstation to maintain optimal control of the process plant and, accordingly, the lines between operators and maintenance personnel—who before typically spend time in the plant, not the control room—are blurred or removed. More personnel are available to move through the plant environment. At the same time, the big data appliance 102 stores more complete data about every aspect of the plant environment, and the expert system 104 provides more complete analysis of the operation and condition of the process plant. The expert system 104 and the big data appliance 102 cooperate to provide information about the state of the processes operating in the plant, the state of the equipment in the plant, the location of and tasks associated with personnel in the plant, and countless other aspects related to plant management, materials management, personnel management, optimization, etc.

Figure 2:
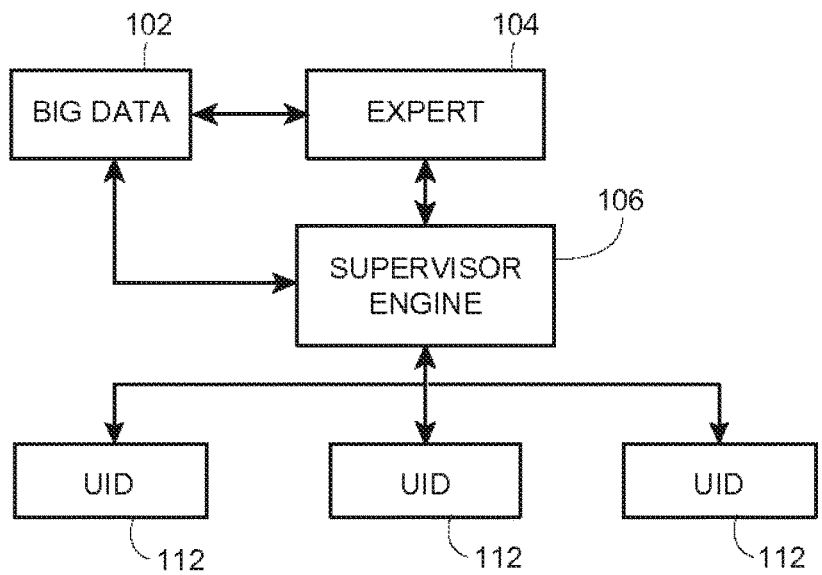
FIG. 2 is a block diagram illustrating a communication architecture, including a mobile control room, in accordance with the present description.

The supervisor engine 106 utilizes the data and analysis provided by the expert system 104 to manage the personnel within the process plant. Specifically, the supervisor engine 106 may monitor trends identified by the expert system 104 and may create work items for plant personnel. Though illustrated and described throughout the specification as a module separate from the big data appliance 102 and the expert system 104, in embodiments, the supervisor engine 106 may be incorporated within the big data appliance 102 and/or within the expert system 104. FIG. 2 is a block diagram illustrating the communication architecture between the mobile control room UI devices 112, the supervisor engine 106, and the expert system 104 and big data appliance 102. As described above, the expert system 104 may obtain and analyze data stored in the big data appliance 102 and may, in some embodiments, store data in the big data appliance 102. For example, the expert system 104 may obtain data related to an aspect of the process control system and perform one or more analyses on the data obtained. The analyses performed by the expert system 104 may be performed according to a preprogrammed model or, in embodiments, may be performed without a model (i.e., the expert system 104 may search data for unknown correlations or relationships). In any event, the expert system 104 may store analytical data (e.g., regression data, correlated data, etc.) within the big data appliance 102.

The supervisor engine 106 may use data received/retrieved from the expert system 104 and/or data received from the big data appliance 102. For example, the supervisor engine 106 may receive data from the expert system 104 indicating that a particular parameter is most closely correlated with a particular abnormal condition or with a particular optimal condition. As another example, the supervisor engine 106 may receive data from the expert system 104 indicating that a particular parameter should be checked, or that a particular adjustment to a process control device/routine needs to be made to avoid an abnormal condition. As yet another example, the supervisor engine 106 may receive data from the expert system 104 indicating that the expert system 104 has identified a trend that indicates maintenance is needed or will be needed at a predicted time. Alternatively or additionally, the supervisor engine 106 may receive or retrieve data from the big data appliance 102. For example, a routine executed by the supervisor engine 106 may relate to periodic, scheduled maintenance (i.e., maintenance that occurs at routine, scheduled intervals or intervals determined by a parameter of the plant). That is, the supervisor engine 106 may monitor a parameter of the process plant or of a device within the process plant, for example to determine how many hours the device has been in service since the most recent maintenance, or how many times the device (e.g., a valve) has been actuated since the most recent maintenance. This type of data may be stored in the big data appliance 102 and retrieved by the supervisor engine 106.

Work Item Creation

Figure 3:
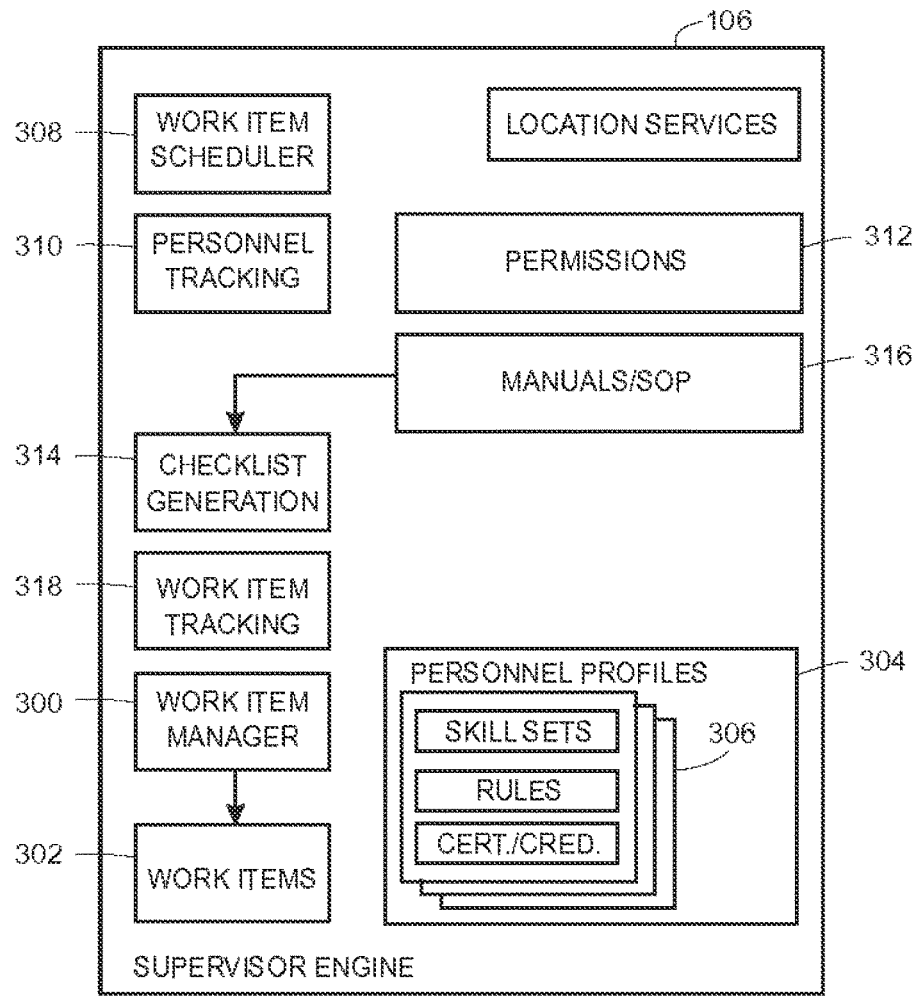
FIG. 3 is a block diagram illustrating an embodiment of a supervisor engine according to the present description.
Figure 4:
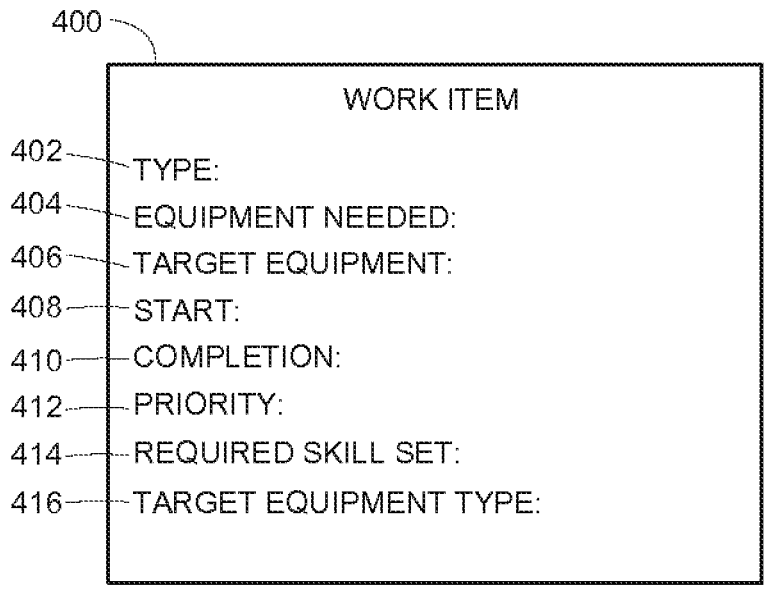
FIG. 4 depicts an example work item that may be generated by the supervisor engine of FIG. 23.

The supervisor engine 106 may use the received data to create work items for plant personnel and/or otherwise cause certain actions to be taken in the process plant. FIG. 3 is a block diagram illustrating an embodiment of the supervisor engine 106. The supervisor engine 106 may include a work item manager 300. The work item manager 300 may be a set of routines and/or instructions stored on a computer readable medium and executed by a processor and operable to create work items. Each work item may be a task or procedure to be completed by one or more process plant personnel. For example, a work item may include replacing or repairing a device, taking a parameter reading, making an adjustment to a device or parameter, inspecting equipment or product, performing a calibration procedure, programming a device, or any other action that requires personnel to complete. As the work item manager 300 generates work items, the work items may be stored in a work item list 302 existing in a memory associated with the supervisor engine 106. With reference to FIG. 4, an exemplary work item 400 may include a variety of information including a work type or function 402 (e.g., wiring check out, equipment replacement, equipment calibration, maintenance (e.g., lubrication, etc.), etc.); a list 404 of equipment needed to execute the work item; a target equipment field 406 identifying the equipment to which the work item pertains; a target start time/date 408; a target completion time/date 410; a priority field 412 (e.g., "immediate," "within 12 hours," "within 24 hours," "after current batch", "during next shutdown," "high," "medium," "low," etc.); a required skill set field 414 and/or required credential field (not shown); and a target equipment type field 416. Of course, fewer or additional fields may be included in the work item 400.

Referring again to FIG. 3, the supervisor engine 106 may also include a set 304 of personnel profiles 306. Each of the personnel profiles 306 contains information related to a particular operator, maintenance technician, or other plant personnel. The information in a personnel profile 306 may include skill sets, certifications and/or credentials, roles (e.g., operator, maintenance, security, safety), working hours/schedules, rounding schedules (i.e., routine and/or scheduled routes that personnel take through the plant to record parameter data or visually inspect aspects of the process plant), and/or any other information that may be relevant to the performance of various duties within the process plant.

Work Flow Management

A work item scheduler 308 may be stored as a set of instructions on a machine-readable medium. The instructions may be executable by a processor to perform scheduling of work items stored in the work item list 302. The work item scheduler 308 may schedule work items according to any of a variety of factors. For instance, the work item scheduler 308 may schedule work items according to the priority of each work item; according to the personnel that are scheduled to be at a location ("target location") proximate a piece of equipment ("target equipment") related to the work item; according to the personnel that are currently at a target location proximate the target equipment; according to the current availability of personnel (e.g., personnel that are or will be on shift at the desired time of work item start/completion and/or personnel that are otherwise unassigned at the desired time of work item start/completion); according to the necessary/required/desired skill sets, roles, certifications, and/or credentials of personnel; according to scheduled plant maintenance and/or shut-down schedules; etc. By way of example, and without limitation, the work item scheduler 308 may track the work items in the work item list 302, noting the target locations and/or target equipment associated with each work item. The work item scheduler 308 may receive information from a personnel tracking routine 310 that tracks the location of the personnel via the UI devices 112 carried by the personnel. When the personnel tracking routine 310 reports that a mobile operator is located proximate a target location or target equipment (e.g., by determining the personnel logged into or assigned to a UI device 112 for which a location is known), the work item scheduler 308 may consult the personnel profile 306 associated with the mobile operator to determine if the mobile operator has the skill set and/or credentials necessary to perform the task ("target function") associated with the work item. If the mobile operator has the appropriate skill set and/or credentials, the work item scheduler 308 may assign the work item to the mobile operator and, if the operator accepts the work item, the work item scheduler 308 may create any necessary permissions for the operator to perform the target function on the target equipment. Of course, it will be understood that one or more persons may be assigned a single work item, as certain tasks require more than one person to complete.

In embodiments, the permissions are created as tokens or entries in a database 312 stored in a memory associated with the supervisor engine 106. Each permission token defines the target function (e.g., wiring checkout), the target equipment, the ID(s) of the worker(s) assigned to the work item, and, optionally, the expiration time and date of the token. Permission tokens may be required for all work items, for some work items, for work items associated with specific equipment or equipment types, with particular target functions (i.e., work item tasks), and the like. The permission token gives specific access rights to the mobile personnel assigned to the work item, and can be revoked by the system and at any time. In some embodiments, permission may also be dependent on external factors. For example, a permission token may specify that a mobile worker has permission to perform a target function during a particular time period, during a particular plant event (e.g., during a shutdown of an area of the plant), etc.

Additionally, the supervisor engine 106 and, specifically, the work item scheduler 308 may schedule work items according to external factors, especially (though not exclusively) where the work items will result in production schedule changes or significant down time. For example, the supervisor engine 106 may communicate via the network backbone 105 and the gateway 78 with systems outside of the immediate process plant to obtain data related to weather, deliveries of raw materials or other supplies, deliveries of parts, tools, or equipment required for execution of the work item, product shipping schedules, and the like. As a non-limiting example, the work item scheduler 308 may delay the scheduling of a work item if the work item will interfere with production and a shipment of a perishable raw material is scheduled to be received before the work item can be completed. As another example, a particular work item in an outdoor location may require dry conditions (i.e., not raining) for completion of the target function (e.g., wiring checkout), and the work item scheduler 308 may schedule a work item according to a weather forecast.

Figure 5:
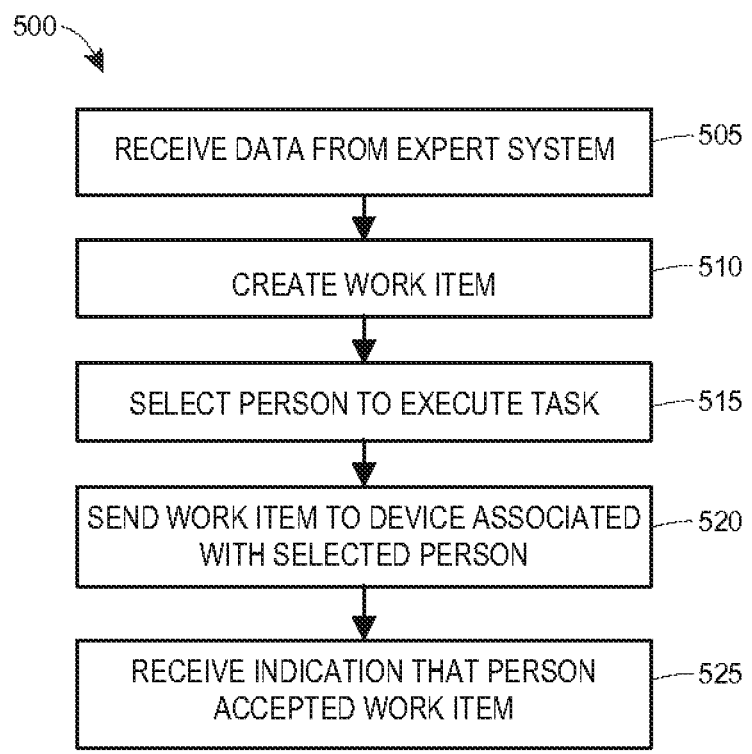
FIG. 5 is a flow chart depicting a method for assigning tasks to personnel in a process plant.

A method 500 of assigning tasks to personnel in a process plant is depicted in a flow chart in FIG. 5. The method 500 may include receiving data from an expert system (block 505) and creating a work item specifying a task according to the data received from the expert system (block 510). The method may also include selecting a person to execute the task specified in the work item (block 515), sending the work item to a device associated with the selected person (block 520), and may include receiving an indication that the selected person has accepted the work item (block 525). Receiving data from the expert system may include receiving data indicating a predicted problem in the process plant, receiving data indicating a trend associated with a process parameter, receiving a request to provide the expert system with a parameter value, receiving an instruction to perform a particular action with respect to a process control device, and the like. Where receiving data includes receiving a request to provide a parameter value, creating the work item may include creating a work item in which the specified task is to observe and record a parameter value that is not transmitted automatically from a device that senses or otherwise receives the parameter. Creating a work item may include, in embodiments, creating a work item in which the specified task is to perform a maintenance task, a calibration task, a replacement task, an inspection task, or a repair task. Creating a work item may also include specifying an equipment target (e.g., a piece of equipment on which the specified task will be performed) related to the specified task. Selecting a person to execute the task may include selecting a person according to location data received from a device (e.g., a mobile user interface device, a GPS device, a proximity card device, etc.) associated with the selected person. The method 500 may also include creating and storing a permission token associated with the specified task, associated with a process control device associated with the specified task, or both. The permission token may be required in order for the selected person to perform the specified task on the process control device associated with the specified task. The permission token may be an entry in a database, a discrete file, or any computer construct implemented for the purpose of creating and/or granting permission for a person to perform an action on or related to a piece of equipment. Selecting a person to execute the task may also include selecting a person according to the task specified in the work item, a process control device associated with the specified task, or both, and a plurality of personnel profiles accessible by the supervisor module. In embodiments, selecting a person according to a plurality of personnel profiles includes selecting a person according to a skill set, a role, a certification, and/or a credential. Selecting a person may also or alternatively include storing the work item in a database from which personnel select a work item to execute, and/or receiving from a device associated with a person a request to execute the work item and comparing a profile associated with the person to information stored in the work item to determine whether the person is qualified to execute the work item.

Receiving data from the expert system may include receiving an instruction to perform an action such as observing and recording a parameter, inspecting a process control device, calibrating a process control device, recording an audio sample, capturing an image or a video, performing maintenance on a process control device, repairing a process control device, replacing a process control device, and/or adjusting a process control parameter. Creating a work item may include specifying tools or equipment necessary to perform the specified task, a priority level for the work item, a required skill set necessary to perform the specified task, a required start time and/or date, and/or a required completion time and/or date. The method 500 may also include scheduling the execution of the work item according to a scheduled route through the process plant associated with the selected person, a scheduled delivery of input materials for a process executed by the process plant, a scheduled delivery of a product produced by the process plant, predicted weather conditions, a scheduled shipping time of a product produced by the process plant, a predicted or scheduled completion time of a process of the process plant, and/or a predicted or scheduled arrival of tools, equipment, or parts necessary to complete the specified task.

Referring again to FIG. 3, the supervisor engine 106 may also store (or otherwise have access to) documentation such as equipment manuals, maintenance manuals, and standard operating procedures (SOPs) 316. The documentation may be provided automatically to mobile operators via the UI devices 112 as the mobile operators perform tasks in the process plant or tasks associated with particular work items. In embodiments, documents are provided to mobile operators at appropriate (i.e., useful) times during the performance of a target function associated with a work item. For example, personnel performing a wiring checkout function associated with a work item may be presented with a SOP for performing the wiring checkout. As another example, personnel performing routine maintenance (e.g., lubrication, cleaning, etc.) on a valve may be presented with SOPs for each procedure and/or with a manual for the target valve. In some embodiments, relevant portions of documentation are provided to personnel at each step in the process of performing the target function. That is, a maintenance technician my first be presented (via the mobile UI device 112) with a SOP for locking out a valve and taking the valve out of service. Then the maintenance technician may be presented with pages from the operational manual for the valve that relate to performing cleaning and/or lubrication of the valve. Later, the maintenance technician may be presented with a SOP for returning the valve to operational service and removing the lockout of the device. Of course, these examples are intended as non-limiting, as there are multitudes of situations where SOPs and manuals could be presented to personnel during performance of duties.

As a mobile operator or technician performs the target tasks associated with a work item, the supervisor engine 106 and, specifically, a work item tracking module 318 may track the progress of the tasks associated with the work item. In some embodiments, the supervisor engine 106 cooperates with the mobile UI device 112 to guide the mobile operator through each step of the process or processes required to perform the work item. The guidance may include lockout procedures, shut-down procedures, device disassembly, device repair, maintenance steps such as calibration, lubrication, and the like, check-out and verification procedures, device re-assembly, start-up procedures, unlock procedures, and any other steps of the process. The work item tracking module 318 may communicate with the mobile UI device 112 and, for example, receive indications as the mobile operator requests each subsequent instruction, step, or guide. As the work item tracking module 318 receives the indication that each subsequent instruction, step, or guide, is requested, the work item tracking module 318 may assume that the previous step is complete, thereby tracking the progress of the execution of the work item. In embodiments, the work item tracking module 318 may be operative to communicate with the target equipment (i.e., the equipment that is the subject of the work item), or equipment proximate or communicatively coupled to the target equipment, to verify that one or more of the steps is complete. In still another embodiment, two mobile operators may be engaged in a collaborative session, and as one mobile operator completes each step of the work item presented to the technician via the mobile UI device 112, the second technician may mark each step complete on another UI device 112, sending to the work item tracking module 318 an indication that each step is complete. That is, two users collaborating using respective UI devices 112 need not be viewing the same display of the information, and need not be viewing the same information at all. As another example, the first user may be viewing on a first UI device 112 the standard operating procedures for performing a work item, while the other user is viewing live data related to a piece of equipment associated with work item on a second UI device 112. Upon completion of the work item, the supervisor module 106 and, in embodiments, the work item tracking module 318, may mark the item complete, remove it from a list of active work items, remove or expire any permissions associated with the work item, assign another work item, notify personnel that the work item is complete, notify personnel that a dependent work item can be started (i.e., a work item dependent on the prior work item to be complete before it can be started), and the like.

Figure 6:
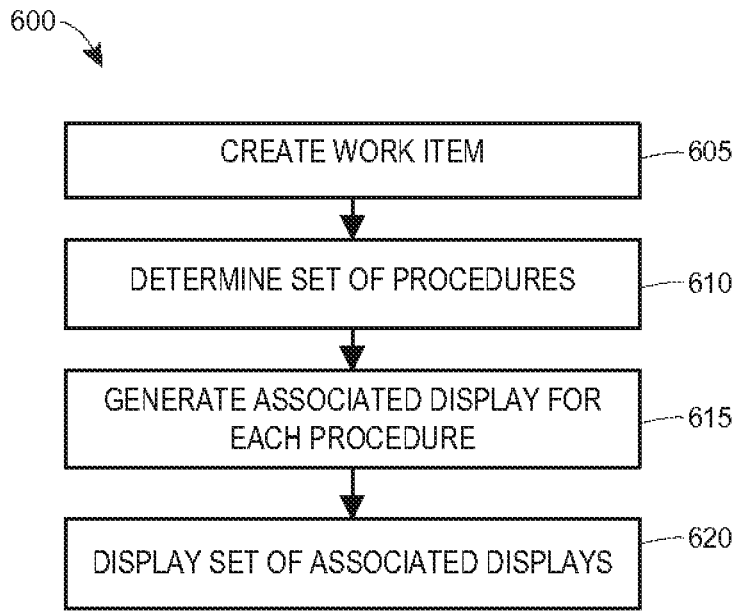
FIG. 6 is a flow chart depicting a method for managing a work flow in a process plant.

Turning to FIG. 6, a flow chart depicts a method 600 for managing a work flow in a process plant. The method 600 includes creating a work item specifying a task to be performed in the process plant (block 605), determining from the specified task a set of procedures for execution of the work item (block 610), generating for each of the procedures in the set of procedures an associated display (block 615), and displaying on a mobile user interface device the set of associated displays sequentially in an order in which the set of procedures are to be performed (block 620). Creating a work item may include receiving data from an expert system and/or specifying a task according to data received from the expert system. Receiving data from the expert system may include receiving an instruction to perform a particular action with respect to a process control device. Creating the work item may also or alternatively include specifying a maintenance task, a calibration task, a replacement task, an inspection task, and/or a repair task. Creating the work item may also include specifying a task that requires a safety lockout procedure, a shut-down procedure, and/or a start-up procedure, etc. Generating an associated display may include generating a display presenting a set of steps for performing the procedure, generating a display including one or more images depicting the performance of the procedure, generating a display including an image of a target piece of equipment in the context of its surroundings to assist a person in locating the target piece of equipment, generating a display including a parameter entry field for recording a parameter associated with a target piece of equipment, and/or generating a display including a set of standard operating procedures. The method may also include depicting on a display of the mobile user interface device the location of a target piece of equipment in the context of the process plant, which may include providing a user interface control that causes the display to zoom in on the target piece of equipment and/or providing a set of user interface controls to allow a user of the mobile user interface device to navigate between the set of associated displays. In some embodiments, a procedure context pane may be displayed indicating which procedure of the set of procedures associated with the specified task is currently being executed. The method may also include providing access to documentation related to a target piece of equipment associated with the specified task. Further, the method may include determining a set of tools and equipment necessary to perform the set of procedures, generating a checklist display including the list of determined set of tools and equipment and displaying the checklist Creating w work item may include specifying a manual data collection task. Determining a set of procedures may include determining a route to collect the manual data.

The supervisor engine 106 may also store data associated with the execution of the work item. In particular, the supervisor engine 106 may store data captured by the mobile UI device(s) 112 associated with execution of the work item, may store data pertaining to the effects of the execution of the work item on the operation of the process plant (e.g., variations in the performance of the process plant caused by or correlated with the execution of the work item), and the like. In embodiments, the mobile UI devices 112 may capture video, audio, or vibration data as part of a diagnostic procedure or a repair or maintenance procedure, and the mobile UI devices 112 may transmit the captured data back to the supervisor engine 106, which may store the data as associated with the particular work item and, alternatively or additionally, may store the data in the big data appliance 102.

Checklists

Referring again to FIG. 3, the supervisor engine 106 may perform other tasks related to supervising mobile personnel. As just one example, the supervisor engine 106 may include a checklist generation routine 314. The checklist generation routine 314 may generate checklists for mobile personnel corresponding to a work item assigned to the mobile personnel. Checklists generated by the routine 314 may include, for example, safety equipment (e.g., respirators, harnesses, carabiners, radiation detection devices/dosimeters, etc.) needed for an area or procedure, tools necessary to perform a procedure, parts needed to perform the procedure (e.g., replacement parts or maintenance parts such as seals, lubricants, etc.), and the like. The checklist generation routine 314 may generate the check list and store the check list as associated with the work item, in some embodiments. Alternatively, the checklist generation routine 314 may generate and display the checklist in real time. In either event, it is contemplated that the mobile personnel will be presented with the checklist shortly before the work item is executed. For example, the checklist may be automatically presented to a mobile operator when the mobile operator indicates that he or she is preparing to execute the work item. In other embodiments, the checklist may be manually requested by the mobile operator as the operator is preparing to execute the work item. In some embodiments, the supervisor engine 106 determines that the operator is preparing to execute the work item and presents the checklist to the mobile operator automatically. For example, the supervisor engine 106 may receive an indication that the mobile operator has transferred the state of a workstation UI device 112 to a mobile UI device 112 at the time that the work item is scheduled to be performed. Upon detecting the transfer of state, the supervisor engine 106 may present the checklist, prompting the mobile operator to acknowledge that he or she has the appropriate equipment and resources to perform the work item. Alternatively, the mobile UI device 112 may automatically retrieve (e.g., from the supervisor engine 106) the checklist when the mobile operator opens a work item, preferably before entering the process plant environment. In still another embodiment, the mobile UI device 112 may detect that it has entered a supply room or a preparation room, and may automatically present the checklist to the mobile operator so that the mobile operator may collect the required tools, equipment, and supplies.

Figure 7:
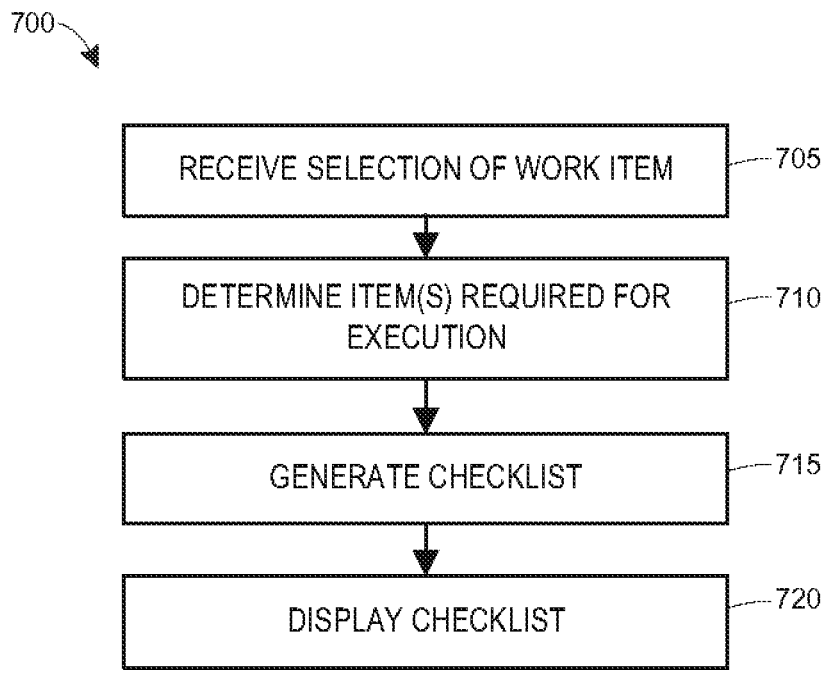
FIG. 7 is a flow chart depicting a method for facilitating task completion in a process plant.

Turning now to FIG. 7, a flow chart depicts a method 700 for facilitating task completion in a process plant. The method includes receiving a selection of a work item from a plurality of work items stored in a database of work items (block 705), and determining from the selected work item one or more items required for the execution of the work item (block 710). A checklist is generated of the one or more items for display to a person executing the work item (block 715), and the checklist is displayed to the person executing the work item (block 720). In an embodiment, determining from the selected work item one or more work items includes reading one or more fields of the work item, which may include reading a required equipment field, reading a required safety equipment field, reading a required tool field, and/or reading a field indicating a location of a target piece of equipment within the process plant. Reading one or more fields may include reading a field specifying a target task to be completed. Reading a field may include reading a field specifying a target task to be completed and a target equipment or a target equipment type. Further, determining one or more items required for execution of the work item may include determining the task to be completed, the equipment on which the task to be completed will be performed, or both. Generating a checklist of one or more items for display to a person executing the work item may include generating a check list that includes any one or combination of a piece of safety equipment, a tool, a process control device, a part for a process control device, a maintenance material, etc. Generating the check list may include retrieving information from one or more of an equipment manual associated with a process control device associated with the work item, an equipment manual associated with a tool required to execute the work item, a safety document, a standard operating procedure, and/or a document associated with a location of a process control device associated with the work item. Generating the check list may also, in embodiments, include determining the location(s) associated with the work item or through which the assigned personnel will have to pass to reach the location associated with the work item, and retrieving special safety equipment and/or tools necessary to access or pass through the location(s). Displaying the checklist to a person executing the work item may include receiving an indication that a user assigned to execute the work item has activated a mobile user interface device and displaying the checklist to the user on the activated mobile user interface device. Receiving a selection of a work item may include receiving the section on a first user interface device and displaying the checklist to the person executing the work item may include receiving an indication that a state of the first user interface device has been transferred to a second user interface device and displaying the checklist on the second user interface device. The method 700 may also include receiving, for each of the one or more items on the checklist, an indication that a person viewing the displayed checklist has the item.

UI Devices

Figure 8:
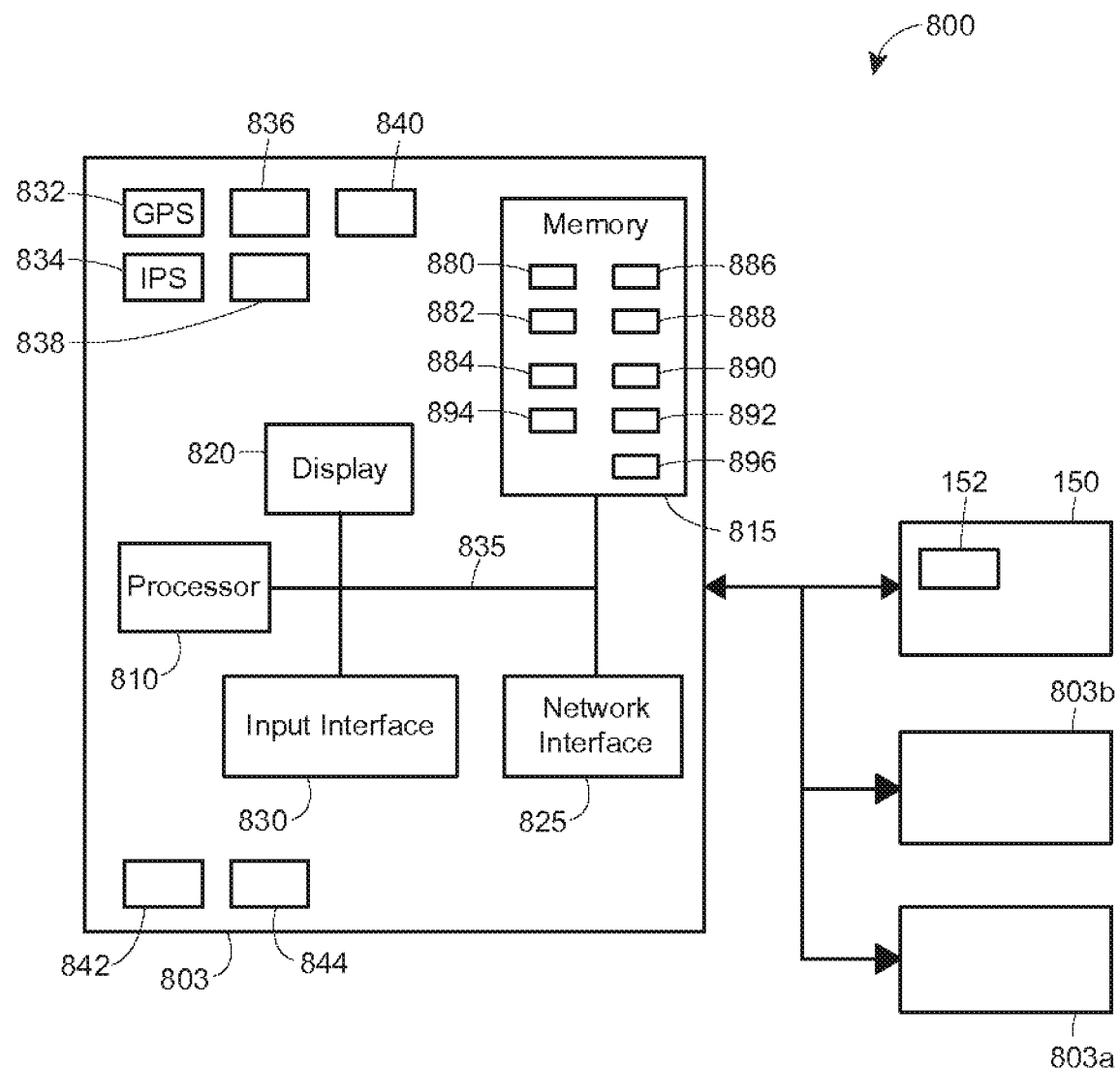
FIG. 8 is a block diagram of a UI device.

FIG. 8 is a block diagram of a UI device 803 in the context of a mobile control room 800. The mobile control room 800 may enable the UI device 803 to transmit a state of operation to another system or device and/or receive a UI state of operation from another system or device. The mobile control room 800 also includes a UI device 803a, the server 150, and a UI device 803b. Each of the UI devices 803, 803a, 803b may be any one of a variety of UI device types, as described below with reference to FIG. 9B. The server 150 may include a web service or web routine 152, which may be stored at a memory at the server 150 and executed by a processor at the server 150. Each of the UI devices 803a and 803b (as well as any other UI devices 803) includes a processor 810, a memory 815, a display 820, a network interface 825, an input interface 830, a system bus 835, and one or more transceivers 850. The UI devices 803a, 803b may also include one or more positioning devices including, for example, a Global Positioning System (GPS) (or any other satellite navigation system) receiver 832, an inertial positioning system chip 834, discrete positioning components such as a compass 836, gyroscopes 838, accelerometers 840, etc. The memory 815 may include an operating system 880, a user interface ("UI") routine 882, a context awareness routine 884, a state determination routine 886, a browser routine 888, an image capture routine 890, and a sound capture routine 892, local process control data storage 894, UI state information 896, and other data. In some embodiments, one or more of the operating system 880, UI routine 882, context awareness routine 884, and/or state determination routine 886 may reside at a memory external to the UI device 803 and may be executed by a processor external to the UI device 803 (e.g., at a device or system such as the server 150). It should be understood that the mobile control room 800 described here is merely one example. Other configurations are contemplated. For example, the mobile control room 800 need not include multiple UI devices and, indeed, need not include any particular number of UI devices.

In certain embodiments of the memory 815 of the UI device 803, the memory 815 may include volatile and/or non-volatile memory and may be removable or non-removable memory. For example, the memory 815 may include computer storage media in the form of random access memory (RAM), read only memory (ROM), EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information. The processor 810 is configured to fetch and execute instructions stored in the memory 815. The memory 815 may store data such as operating system data or program data.

The network interface 825 may include or be coupled to one or more antennas for wireless communication, one or more ports for wired connection, or both. In some embodiments, the network interface may be coupled to the GPS receiver 832, allowing the network interface 825 to receive location or coordinate data. The network interface 825 may also or alternatively include a Bluetooth transceiver, allowing the network interface 825 to establish a personal area network with an external device or system. Additionally or alternatively, the network interface may include a near field communication ("NFC") transceiver, a radio frequency identification ("RFID") transceiver, and/or a local area network transceiver (enabling the network interface 825 to communicate using the IEEE 802.11 protocol, for example).

The network interface 825 may communicate with the server 150 and/or one of the UI devices 803 via a network such as the process control network 100 shown in FIG. 1A. Users may interact with the UI device 803 via the input interface 830. The input interface 830 may accept input via mechanical actuation (e.g., a keyboard or mouse). The input interface 830 may alternatively or additionally accept input via detection of electromagnetic fields, signals, or properties (e.g., a resistive or capacitive touchscreen). Furthermore, the input interface 830 may accept input via detection of sound, light, or motion (e.g., voice inputs via a microphone 842, an image sensor or camera 844, etc.). Still further, the input interface 830 may accept input from a Bluetooth device coupled to the network interface 825. The display 820 may provide output in the form of images or video, and may utilize any type of monitor, projector, or display technology including CRT, LCD, plasma, LED, and OLED technology.

In some embodiments, one or more input sources, such as the microphone 842, the image sensor or camera 844, or other sensors (e.g., Oxygen sensors, toxic gas sensors, motion sensors, vibration sensors, RFID sensors) may be located outside of the UI device 803 and coupled to the UI device 803 via wired communication channels (e.g., via a headphone port or a USB port) or wireless communication channels (e.g., wireless USB, Bluetooth, Wi-Fi, or proprietary protocols). For example, a user carrying the UI device 803 may also carry one or more of the input sources on a utility belt, on a case in which the UI device 803 is carried, etc.

Each of the routines 880-896 may be one or more instructions, routines, modules, processes, services, programs, and/or applications, and may be stored on a computer readable medium, such as on the memory 815. The operating system 880 may support the basic functions and manage the resources of the UI device 803. In particular, the operating system 880 may manage the hardware and software of the UI device 803. The UI routine 882 may, when executed by the processor, cause the display 820 to display information to a user, and may cause the input interface 830 to receive input from the user or from other external stimuli. The context awareness routine 884 may cause the display 820 to display information in response to context information received at the network interface 825, at the input interface 830, or at one or more sensors. The context awareness routine 884 may additionally, or alternatively, cause the UI device 803 to identify a context (such as a location, time, or schedule) and/or receive the context from system or device external to the UI device 803.

The state determination routine 886 may collect information about the operation of the UI device 803. For example, the state determination routine 886 may collect UI state information 896 by monitoring the processes executed by the processor 810 and the data associated with the processes. The state determination routine 886 may identify the information depicted at the display 820, and may identify process entities associated with the depicted information. In some embodiments, the state determination routine 886 may transmit the collected UI state routine to an external node, such as the server 150 or the UI device 803*b*. In embodiments where the UI device 803 implements a thin client or a web client, the state determination routine 886 may be stored at a memory on the server 150, where it may be executed by a processor at the server 150.

The browser routine 888 may be an application for accessing, presenting, and navigating one or more information resources. An information resource may be a web page, image, video, document, or any other content. The browser routine 888 may interact with information resources located on the UI device 803 or with information resources external to the UI device 803. For example, the UI device 803 may access information resources at other systems or devices (such as the server 150 or the UI device 803*b*) via the world wide web or via a network such as the process control network 100. In some embodiments, the browser routine 888 may access information associated with and/or generated by a UI routine executed at the server 150. In particular, the browser routine 888 may access the web service 152 at the server 150, where the web service 152 may correspond to the UI routine executed at the server 150. For example, the browser routine 888 may receive an address or identifier, such as a uniform resource identifier or uniform resource locator (from a user via the input interface 830, for example). The address or identifier may direct the browser routine 888 to the web service 152. The browser routine 888 may receive UI data, such as display data or process parameter data, from the UI routine 882 via the web service 152, allowing the browser routine 888 to depict graphics for controlling and/or monitoring some or all of the process. The browser routine 888 may also receive user input (such as a mouse click on a graphic) and transmit data representing the user input to the UI routine 882 via the web service 152. In alternative embodiments, the browser routine 888 may be a plug-in or web client application.

While the various routines 880-896 are described as stored in the memory 815, the UI device 803 may also be operable to request, retrieve, receive and/or download, via the network interface 825, additional routines (e.g., applications, applets, updates, patches, etc.) as needed. As but one of many conceivable examples, the UI device 112 may request and receive information for facilitating direct (or indirect) communication between the UI device 112 and a process control device in the process plant. In any event, it should be understood that the UI device 112 is not limited to those applications, routines, and modules that reside in the memory 815 and that are described herein.

The image capture routine 890 may operate to capture an image via the image sensor or camera 844. In some embodiments, the image may be transmitted to a node on the network 100 via the network interface 825, where the node may analyze the image to identify process data. For example, in one embodiment the image capture routine 890 may cause the image sensor 844 to capture an image of a flame. The image capture routine 890 may transmit the image of the flame to a node (e.g., the server 150, the expert system 104, etc.) via the network 100, where the node may analyze the image to identify the color and corresponding temperature of the flame. Similarly, the sound capture routine 892 may be one or more instructions or routines for capturing sound via the microphone 842. The captured sound data may be transmitted to a node on the network 100 for analysis.

With regard to capturing sound, the microphone 842 may capture audio associated with a plant asset. The captured audio may be used to identify the plant asset or diagnose the plant asset. For example, a pump may have an expected sound signature. In such an example, the UI device 803 may capture audio generated during operation of a plant asset and may transmit the audio via the network 100 to a node (e.g., the server 150, the expert system 104, etc.) to identify the asset-type, for example, as a pump. In some circumstances the node may even identify to the UI device 803 the specific pump in question. The UI device 803 may also include a motion sensor (e.g., the accelerometers 840) used to detect vibration. For example, a plant asset may have an expected level of vibration during operation. A user may place the UI device 803 on or near the plant asset. The UI device 803 may use data detected by the motion sensor to identify a current level of vibration associated with the asset. If the current level of vibration exceeds the expected level of vibration, the user may utilize the UI device 803 to further diagnose the plant asset or request a work order for the asset. In some instances, a diagnostic routine may automatically launch when the UI device 803 is placed on or near the asset to detect vibration associated with the asset.

In some embodiments, the UI device 803 may include a peripheral interface (not shown) for establishing connection with other devices. The peripheral interface may be a serial interface such as a Universal Serial Bus (USB) interface. In other embodiments the peripheral interface may be a wireless interface for establishing wireless connection with another device, similar to some of the embodiments of the network interface. For example, in some embodiments the peripheral interface may be a short range wireless interface compliant with standards such as Bluetooth (operating in the 2,400-2,480 MHz frequency band) or Near Field Communication (operating in the 13.56 MHz frequency band). The peripheral interface may be used for transferring state information to or receiving state information from an external device as described below. The peripheral interface may also be used in certain embodiments for interacting with external devices that may provide the UI device 803 with context awareness. For example, a context ID device may be detected via the peripheral interface, as also described below. In some embodiments, a user may save state information or process information available at the UI device 803 to an external device via the peripheral interface.

In general operation of the UI device 803, the processor 810 may access the memory 815 to execute the UI routine 882. When the processor 810 executes the UI routine 882, the processor 810 causes output to be provided at the display 820, wherein the output represents information pertaining to entities (e.g., devices, equipment, network nodes, process data, control data, etc) in the process plant 10. The output may be based on data stored in the memory 815 (e.g., graphics data, historian data or any previously received and stored data) or data received via the network interface 825 (e.g., data received from the controller 11 or the database 151). Furthermore, when input is received at the input interface 830, the input interface 830 may generate input data. The input data may be transferred to the processor 810 over the system bus 835, where the processor 810 may execute one or more instructions or routines in accordance with the received input. In many instances the input data may represent a user interaction with the graphical output provided at the display 820. For example, the input data may represent the movement of a mouse, where the processor 810 operates to move a cursor displayed on the display 820 in accordance with the mouse movement. The input data may also represent a selection of a UI element displayed on the display 820, such as a window (e.g., a browser window), a device graphic (e.g., a tank, pump, valve, meter, etc), or an operating system element. Furthermore, the input data may represent the control input. For example, the user may use a keyboard, mouse, or touch screen to enter a setpoint value with regard to a process device. When the input data represent a control input, the processor 810 may transmit the input data over the system bus 835 to the network interface 825, where the network interface 825 transmits the input data to the process control network 100 where it may be received at another node (such as the controller 11 or the server 150 shown in FIG. 1A). The processor 810 may also cause any other type of input data to be transmitted to the process control network 100.

State Awareness, Transfer, and Collaboration

As process control operation, configuration, and maintenance is facilitated by mobile devices, personnel may be expected to move from device to device and, in any event, may desire the capability to switch from device to device without having to re-create (and/or re-navigate to) on a second device the displays they were viewing and/or the processes in which they were engaged on the first device. As illustrated in the examples above, an operator may desire to check the status of the process plant remotely, from a mobile phone, as she commutes to work, so that she may be prepared for whatever may be happening when she arrives on-site. When she arrives on-site, she may walk to her office and wish to pick up in the same location on a workstation. Thereafter, she may pick up a tablet computer and move to plant floor to survey areas of the plant or attend to various tasks. Generally, personnel involved in the operations and maintenance of the process plant may desire that the devices they use include some level of state awareness and be able to transfer a state between devices to facilitate mobility and/or collaboration.

In an embodiment of the present disclosure, state information is seamlessly transferred from a first UI device to a second UI device, allowing a user to resume on, or transfer to, the second UI device a session from the first UI device without any interruption in work flow. The state transfer may also allow a first user of a first UI device to collaborate with a second user of a second UI device, so that the two users may work on tasks or work items in a cooperative manner. In another embodiment, a UI device may provide output according to the context of the UI device's operation. For example, the UI device may account for the UI device location and equipment location, the type of UI device, or other considerations when determining what information to provide or how to provide information at the UI device display. The UI device and mobile control room disclosed herein offers the benefit of "untethering" operators and users of UI devices from physical control rooms. A user of such a UI device may move freely throughout the plant without interruption in workflow and without loss of functionality or capability with regard to monitoring and controlling the process.

Figure 9A:
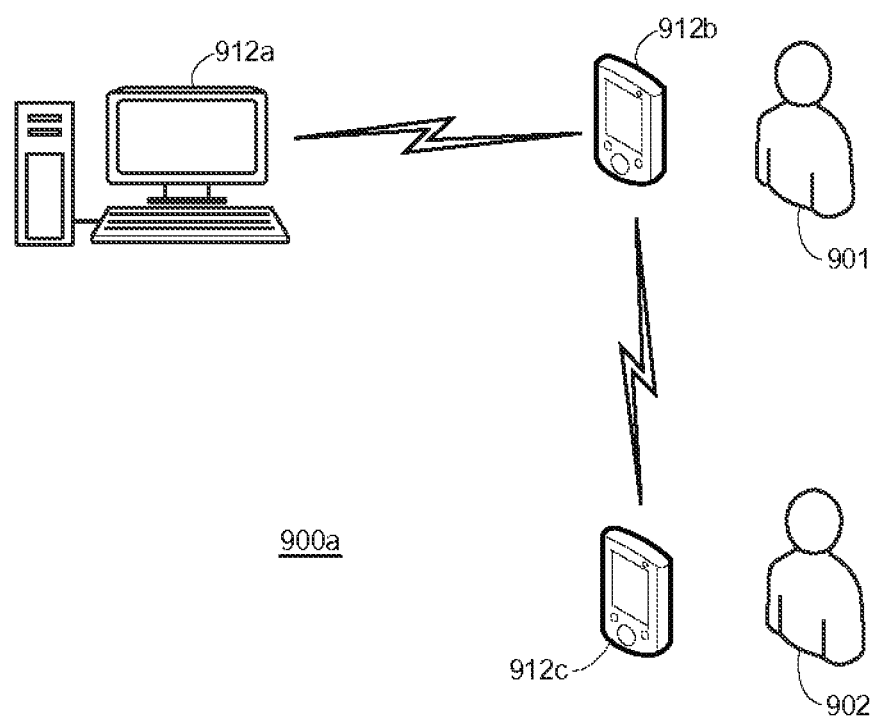
FIG. 9A illustrates an aspect of an exemplary mobile control room.

FIG. 9A illustrates an aspect of an exemplary mobile control room 900a. The mobile control room 900a includes a UI device 912a, a UI device 912b, and a UI device 912c, each of which can be used by a user 901 and/or a user 902.

The mobile control room 900a may enable the user 901 to synchronize the UI devices 912a and 912b by transferring the state of the UI device 912a to the UI device 912b. The UI state transfer may cause the UI device 912b to display similar information to the information displayed at the UI device 912a. The state transfer may also cause the UI device 912b to execute similar routines or applications executing at the UI device 912a. Furthermore, the similar routines or applications on the UI device 912b may execute at the same state as the routines or applications executing at the UI device 92a. By transferring the UI state of operation from UI device 912a to UI device 912b, the user 901 may stop using UI device 912a and start using UI device 912b without any loss in workflow.

Similarly, the control room 900a may enable a secure collaboration session to be established between at least two UI devices. In an embodiment, the secure collaboration session may be established automatically when the two devices 912 move into each other's proximity and become mutually aware of one another. Once the session is established, synchronization of data between the UI devices during a collaborative work session may be performed. More particularly, the user 901 may collaborate with the user 902, where the UI device 912b may transfer state information to the UI device 912c. By transferring state information from UI device 912b to UI device 912c, the UI device 912c may identify the state of operation of the UI device 912b. For example, the UI device 912c may depict the same or similar information being displayed at the UI device 912b. The UI devices 912b and 912c may also launch communication routines, allowing the users 901 and 902 to exchange information (such as text, video, and Voice over IP) via the UI devices 912b and 912c. For example, the UI devices 912b and 912c may exchange information pertaining to work items or tasks, allowing the users 901 and 902 to work on an item or task in a coordinated manner, even if the users 901 and 902 are not viewing the same displays on the respective UI devices 912b and 912c. In one example, the users may be able to checkout a device via the UI devices, so that other user knows the device is being addressed.

In some embodiments, the UI devices 912a-912c may transfer state information directly between each other. The UI devices 912a-912c may use short-range wireless technology such as near field communication (ISO/IEC 14443 and 1809 standards) to detect proximity and then may use WiFi (IEEE 802.11 standards) or Bluetooth (IEEE 802.15.1 standards) to transfer state information. In other embodiments, the UI devices 912a-912c may transfer state information via a node, such as the server 150 shown in FIG. 1A, via the network backbone 105. In certain embodiments, the UI devices 912a-912c may be thin clients, where the UI devices 912a-912c may render graphics but the bulk of the processing for the UI devices 912a-912c occurs at a node (such as the server 150 shown in FIG. 1A) on the process control network 100. In such embodiments, transferring states between UI devices 912a-912c may include transferring state information between UIs executing at the node.

Figure 9B:
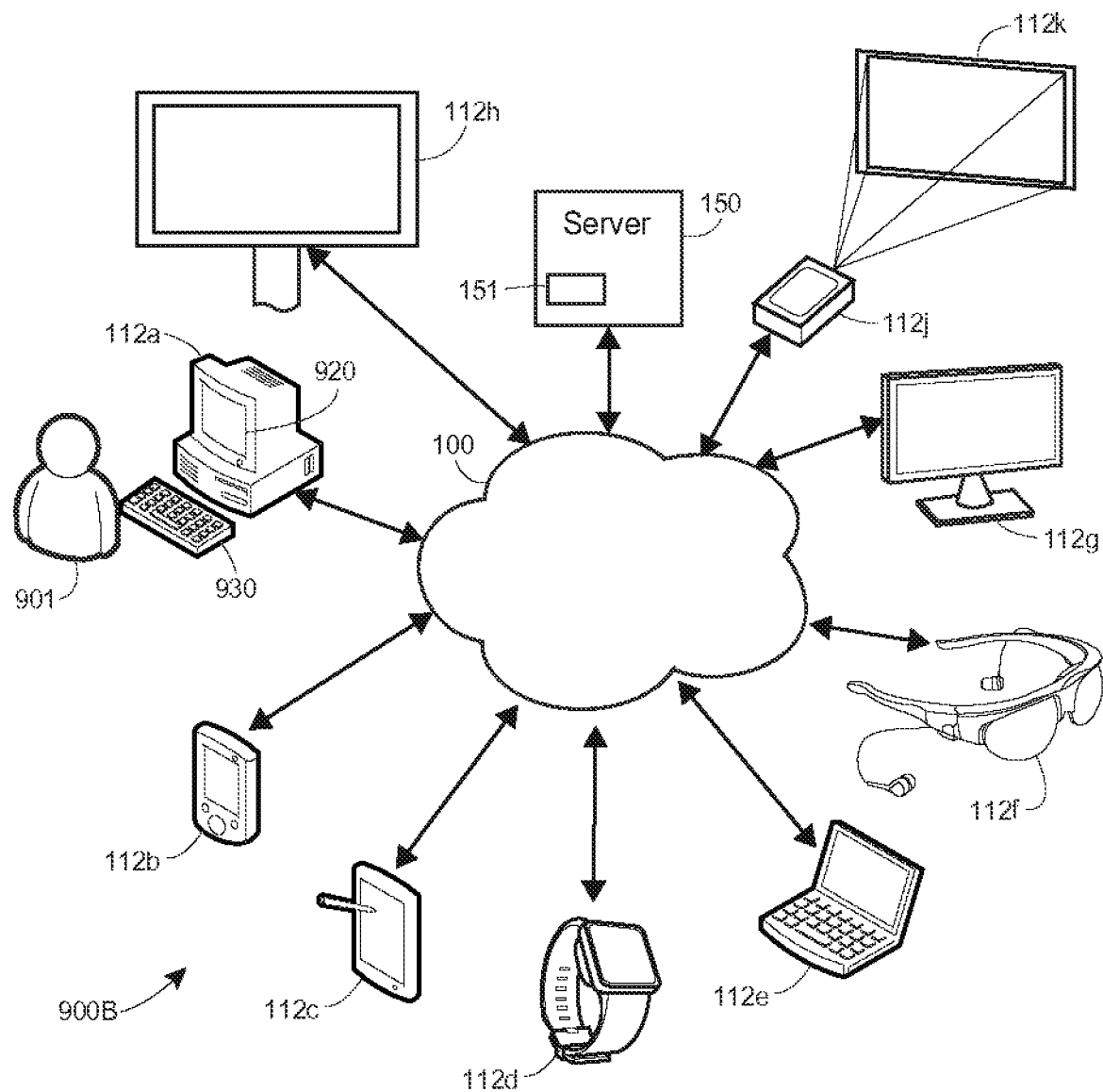
FIG. 9B illustrates devices in an exemplary mobile control room.

FIG. 9B illustrates UI devices 112 in an exemplary mobile control room 900c. The mobile control room 900c may enable the transferring of a state of operation to or from any of UI devices 112a-112k, enabling UI device synchronization and user collaboration. The mobile control room 900c includes the server 150, the process control network 100, the user 901, and the UI devices 112a-112k. The server 150 may include a database 151, which may include display data, parameter data, historian data, context data, UI state information data, or any other process plant data. The database 151 may be stored at a memory on the server 150, separately from the server 150, or among several devices in the process plant. Each of the UI devices 112a-112k may be any type of process control UI device 112 that provides information about, and accepts user input with respect to, a process or elements associated with a process. Each of the UI devices 112a-112k may execute a corresponding UI. In alternative embodiments, the UI may execute, in whole or in part, at the server 150 and be provided to UI devices 112a-112k, e.g., via a web page. Each of the UI devices 112a-112k may communicate with the server 150 via the backbone 105 of the process control network 100. In the embodiment shown in FIG. 9B, the user 901 may interact with the UI device 112a through a display 920 and an input interface 930 (though the user 901 may interact with any of the UI devices 112a-112k). In this embodiment, the UI device 112a is a stationary workstation, wherein the input interface 930 is a keyboard and display 920 is a monitor; the UI device 112b is a mobile device (such as a phone or PDA); the UI device 112c is a tablet capable of receiving touch input from a user's hand or a stylus; the UI device 112d is a wearable device (a watch with a touch screen in this instance); the UI device 112e is a laptop computer; the UI device 112f is a wearable device (a headset with a heads-up display in this instance); the UI device 112g is a television, which may have an associated input interface (not shown) such as a keyboard, a mouse, a touch-screen (such as a capacitive touch screen), a motion sensor, or any other type of device capable of accepting user input; the UI device 112h is a display and user input device (e.g., a touch screen) located in a process plant environment (e.g., wall-mounted, mounted on or near a process entity, etc.); and the UI device 112j is a mobile device (e.g., a smart phone) with a built-in projector operable to project a UI onto a surface 112k (e.g., a wall within the process plant). The UI projected onto the surface 112k may include a user input method (e.g., user motion tracking via the UI device 112j or an external device (not shown)). Of course, any combination of the UI devices 112a-112k may be employed in various embodiments. Furthermore, the mobile control room 900c may include additional UI devices similar to any of the UI devices 112a-112k. While specific types of input are described as associated with each of the devices 112a-112k, it is noted that any of the devices 112 may accept input from a variety of input sources, in various embodiments, according at least to the type of use for the UI device 112. As just one example, it is contemplated that UI devices 112 may accept devices from styli or may be touch-sensitive devices that are not capacitive in nature (e.g., resistive, surface acoustic wave, or any other type of touch screen technology), to facilitate input from a user that is, for example, wearing protective gloves. Voice inputs may also be used in any of the UI devices 112, particularly in environments where external noise is not a factor.

In the mobile control room 900c, each of the UI devices 112a-112k may enable the user 901 to monitor and/or control a process or elements associated with a process via the process control network 100. In an embodiment, each of the UI devices 112a-112k may implement web clients or thin clients. In such an embodiment, the server 150 may execute the UI and any other routines used for operation of one or more of the UI devices 112a-112k. The UI devices 112a-112k may pass user input data to the server 150, where the server 150 may respond to the user input. The server 150 may transmit display data to the UI devices 112a-112k. Because the server 150 may handle the bulk of the processing for operation of the UI devices 112a-112k in this embodiment, the server 150 may track the state of operation for each UI device 112a-112k by monitoring the execution of routines at the server 150 and monitoring the data being received from and transmitted to each of the UI devices 112a-112k.

In other embodiments, the UI devices 112a-112k operate solely as data clients. For example, in embodiments each UI device 112 includes a web browser and a routine for automatically generating dynamic HTML (or other code) for the display of information on the UI device 112. The routine and/or the dynamic web page generated by the routine retrieve data from the server 150 and display the retrieved data (and other data such as user-input data) on the display. The routine and/or the dynamic web page may also accept user input and send data back to the server 150. In such embodiments, much of the processing occurs on the UI device 112, while only data are transferred via the network to and from the server 150.

In another embodiment, instructions (e.g., JavaScript instructions) resident on the UI device 112 dynamically generate code (e.g., HTML5 code) that is rendered in an appropriate viewing application (e.g., an HTML5 viewer or a web browser). For example, the JavaScript code may open a WebSocket connection, used by a WebSocket Application Messaging Protocol to send messages between the JavaScript executing on the UI device 112 and the server 150.

The server 150 may save UI state information (e.g., to the database 151) periodically or in response to a triggering event. The UI state information may represent the state of the UI device at the time of capture. The UI state information may include information relating to the user or operator interacting with the UI device; the applications, programs, routines, or modules executing with respect to the UI device;

the graphics or sound being presented at the UI device; the portion(s) of the plant about which data displayed pertain; or any other information relating to operation of the UI device. When the server 150 receives a request for a state transfer, the server 150 may access locally saved UI state information at the database 151 and may transmit the UI state information to the appropriate UI executing at the server 150. The UI may transmit corresponding display data to the appropriate UI device. For example, the UI device 112*b* may request state information from UI device 112*a* (where the user 901 may wish to switch UI devices from 112*a* to 112*b* without disrupting workflow, for example). In some embodiments, the UI device 112*a* and 112*b* may each have a UI executing at the server 150. The server 150 may access locally stored UI state information at the database 151 and may pass the UI state information to the UI for the UI device 112*b*. The UI for the UI device 112*b* may determine what should be displayed at the UI device 112*b* based on the saved UI state information, and transfer display data to the UI device 112*b*.

In some embodiments, each of the UI devices 112*a*-112*k* may capture and store UI state information at the database 151 when a user interacts with the respective UI device. The UI device may transmit the UI state information to the server 150 over the network 100. The server 150 may transmit the UI state information to any of the UI devices 112*a*-112*k* so that, for example, upon receiving a request from a particular one of the UI devices 112*a*-112*k*, the particular UI device may operate in a manner consistent with the received UI state information.

As an example, the user 901 may begin using the UI device 112*a* (though the following example may be carried out with any of the UI devices 112*b*-112*k* as well). As the user 901 interacts with the UI device 112*a*, the UI device 112*a* may periodically capture and save UI state information. The UI state information may relate to the user 901, representing a user ID or user title/role, for example. The UI state information may also relate to the user's session, including information about the programs or routines running on the UI device 112*a*, the time of capture, the session length, the configuration of the graphics displayed at the display 920 of the UI device 112*a*, the entities (i.e., the process areas, devices, equipment or data) being monitored or controlled at the UI device 112*a*, and/or the type of UI device being used (a stationary workstation, in this case). After capturing and saving the UI state information, the UI device 112*a* may transmit the UI state information to the server 150 over the process control network 100 so that the server 150 may store the UI state information at the database 151.

The user 901 may decide to use a mobile UI device, such as any of the UI devices 112*b*-112*f* or 112*i*-112*k*. In an embodiment, the user 901 may utilize the UI device 112*b*, where the UI device 112*b* may recognize the user 901. The UI device 112*b* may communicate with the server 150 to retrieve the most recent UI state information associated with the user 901 (i.e., the UI state information most recently captured at the UI device 112*a* in this case). In some embodiments, the communication may trigger in the UI device 112*a* an additional capture of state information related to the UI device 112*a*. The UI device 112*b* may generate a GUI configuration based on the received UI state information so that the display of the UI device 112*b* corresponds, at least in part, to the display of the UI device 112*a* at the time of the most recent state information capture. Put another way, the mobile control room 900*c* operates to cause a state transfer, or state synchronization, between UI device 112*a* and UI device 112*b* (for an example of what the displays may look like in a UI synchronization or state transfer, see FIG. 10). As a result of the state transfer, the user 901 experiences minimal interruption in workflow.

In some embodiments, the capture of UI state information may occur automatically. For example, the UI device 112*a* may capture state information on a predetermined, periodic basis (e.g., capturing state information every 5, 10, or 30 minutes). The UI device 112*a* may also capture state information in reaction to a triggering event or activity. The triggering event may be related to user input (e.g., capturing state information any time user input is received, or on a schedule correlated to receiving user input) or the information provided at the UI device 112*a* (e.g., capturing state information any time there is an alarm, or any time a particular measurement or value reaches a specified threshold). Alternatively, or additionally, the UI device 112*a* may capture UI state information manually, in response to user input representing a command to capture or to transfer the UI state information. For example, the display 920 may provide a graphic that the user 901 may interact with that causes a capture to occur. The input interface 930 may also have a mechanism (such as a button, key, or trackpad) allowing the user 901 to initiate a capture. In certain instances, a request by another UI device (such as one of the UI devices 112*b*-*k*) may also trigger capture at the UI device 112*a*. As another example, the UI devices 112*a*-112*k* may capture and transfer state information when two UI devices are touched (or brought within close proximity—e.g., within a 5 cm, 2 cm, 1 cm, etc.—to each other (e.g., via near-field communication).

In further embodiments, the UI device 112*b* may recognize the user 901 automatically. For example, the user 901 may have a unique tag (in a badge or card with an RFID chip, for example) identifying the user 901. In other embodiments the tag may be any tag or device capable of providing identification information, such as a NFC device, a barcode, a Bluetooth device, or any other wireless access point. The UI device 112*b* may have a tag scanner or reader (such as an RFID scanner) that detects the unique tag. The UI device 112*b* may access a database to identify the user associated with the unique tag, allowing the UI device 112*b* to recognize the user 901. The database may be at the UI device 112*b*, but in other embodiments the database 151 at the server 150 correlate tags to users, and the UI device 112 may communicate with the server 150 to identify the user 901. In other embodiments, each UI device may be assigned to a specific user so that only a single user interacts with the UI device. In such an embodiment, the UI device 112*b* may be assigned to the user 901 so that the UI device 112*b* may assume that any user interacting with the UI device 112*b* is the user 901. Alternatively, the UI device 112*b* may force the user 201 to enter a user ID and password in order to log on to the UI device 112*b*, allowing the UI device 112*b* to recognize the user 901.

In alternative embodiments, the user 901 may use another UI device, such as any of the UI devices 112*c*-112*k*, instead of the UI device 112*b*, causing a state transfer or state synchronization from the UI device 112*a* to one of the UI devices 112*c*-112*k*. For example, the user 901 may synchronize a tablet such as the UI device 112*c* to the most recently captured state information at the UI device 112*a*. In other instances, the user 901 may synchronize a watch such as the UI device 112*d*, a laptop such as the UI device 112*e*, a headset such as the UI device 112*f*, or a television such as the UI device 112*g* to the most recently captured state information at the UI device 112*a*.

Furthermore, the UI device 112a state information may be transferred to the UI device 112a, allowing the user 901 to save a session on the UI device 112a and resume the session on the same UI device 112a at some later time. The UI device 112a may return to a previous UI state by accessing the state information saved to the UI device 112a or to the server 150. This contrasts with some prior art systems, where resuming a session at a later time, even on the same device, may be difficult due to multiple users interacting with the same console.

In further alternative embodiments, the user 901 may use any of the UI devices 112b-112k instead of the UI device 112a. The respective UI device being utilized by the user 901 may capture state information about the respective UI device. The captured state information may be passed to the server 150, where the state information may be stored at the database 151 and accessed by the same or another UI device.

In some instances, the server 150 may be a UI device similar to any of the UI devices 112a-112k (i.e., the server 150 may include a display and input interface, and may be used as a UI device). In such a scenario, the state information saved at the server 150 may be accessed to provide UI information at the server 150 so that a user may utilize the server 150 as a UI device. Similarly, in some embodiments any of the UI devices 112a-112k may operate as a server 150 similar to server 150.

In another embodiment, the UI devices 112a-112k may transfer state information to each other through the network 100 or through some other network or communication, such as a personal area network (e.g., a Bluetooth network) or near field communication. In some embodiments, the receiving UI device may initiate the transfer of UI state information, while in other embodiments the transferring UI device initiates said transfer. In yet another embodiment, the state transfer may occur by saving the UI state information to a memory (such as a the memory on a USB thumb drive) and accessing the memory to retrieve the UI state information at a second UI device.

In certain embodiments, state transfers may be automatic and transparent to users of any of the UI devices 112a-112k. For example, a state transfer may initiate automatically when a UI device is brought within proximity of another UI device. The UI devices may include circuitry, such as NFC circuitry, allowing the UI devices to detect one another. Proximity may also be detected by location data, received at a GPS receiver, for example, that may be included on one or more of the UI devices. The UI devices may transmit location data to the server 150, where the server 150 may use the location data to determine proximity and initiate a state transfer. In some embodiments, one or more of the UI devices may display an indicator graphic that indicates the respective UI device is receiving or transmitting state information. The indicator graphic may also indicate that a UI device is collaborating with another UI device.

Figure 10:
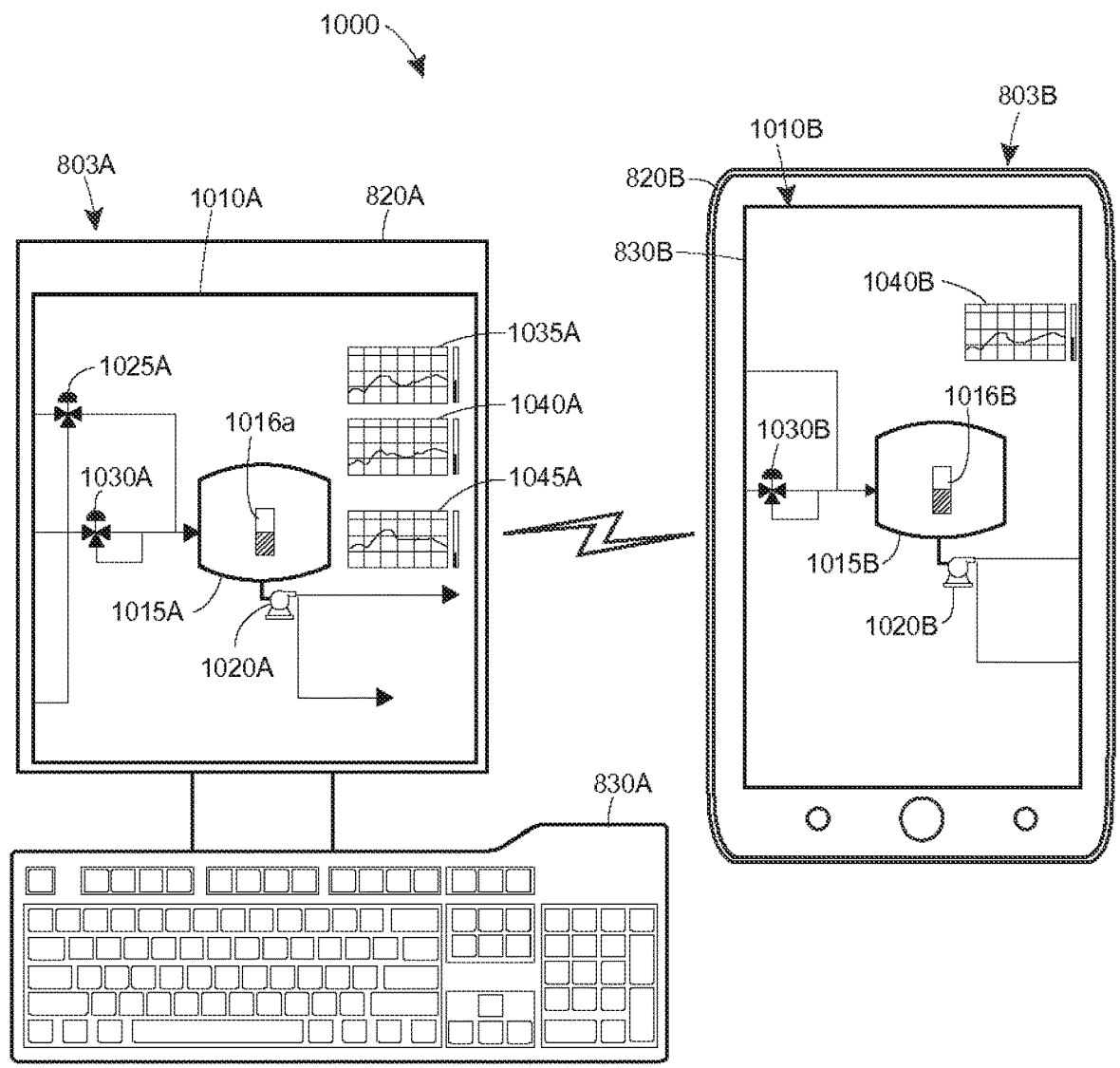
FIG. 10 illustrates example device displays associated with UI synchronization between UI devices.

FIG. 10 illustrates example device displays associated with UI synchronization between UI devices 803a and 803b, such as may occur during or after state transfer, for example. In FIG. 10, the UI device 803a may be a stationary workstation and the UI device 803b may be a mobile device (such as a tablet). The UI device 803a includes a display 820a and an input interface 830a. The display 820a may provide a GUI configuration 1010a that includes a tank graphic 1015a, a level indicator graphic 1016a, a pump graphic 1020a, valve graphic 1025a, a valve graphic 1030a, a graph 1035a, a graph 1040a, and a graph 1045a. The UI device 803b includes a display 820b and an input interface 830b. The display 820b provides a GUI configuration 1010b that includes a tank graphic 1015b, a level indicator graphic 1016b, a pump graphic 1020b, a valve graphic 1030b, and a graph 1040b.

The UI device 803a may capture UI state information 896 and transmit the UI state information 896 to the server 150 or another UI device such as UI device 803b. When capturing UI state information 896, the UI device 803a may determine which entities are related to the output provided at the display 820a. For example, the UI device 803a may identify the entities associated with graphics 1016a-1045a (a tank, a pump, two valves, and the devices associated with the graphs 1035a-1045a) and save the entities as state information 896. In addition to identifying the aforementioned entities, the UI device 803a may also identify coordinate locations associated with the graphics provided at the display 820a. As a result, the UI state information 896 may reflect that the tank graphic is located in the middle of the screen, for example. The UI device 803a may also identify the location of various windows or boxes associated with any executing applications. Moreover, the UI device 803a may identify the programs or routines executing at the UI device 803a and may save information indicating each program state. For example, a browser may be executing and the UI device 803a may identify a resource (e.g., a web page, image, video, or some other content) being accessed or used by the browser.

The UI device 803b may receive the UI state information 896 from the UI device 803a (or from the server 150 in other embodiments). The UI device 803b provides output based on the received UI state information 896. In particular, the UI device 803b may display visual representations or graphics at the UI display 830b based on the received UI state information 896. Because the UI device 803b may be a different type of device with a different size display than the UI device 112a, the UI device 112b may provides a different GUI configuration than what was provided at the UI device 112a. In particular, the UI device 112b may identify the highest priority entities and programs from the UI state information 96 and may generate the GUI configuration 1010b accordingly. In particular, the UI device 803b may identify the entities associated with graphics 1015b, 1016b, 1020b, 1030b, and 1040b as high priority. Due to limited screen space, the UI device 803b may not generate graphics correlating to the graphics 1025a, 1035a, or 1045a depicted at the display 820a of UI device 803a. The UI device 803b may also generate graphics at locations in the GUI configuration 1010b that correlate to the relative locations of the corresponding graphics in the GUI configuration 1010a.

In addition, due to having a different type of input interface (i.e., screen-touch based instead of keyboard based), the UI device 803b may generate graphics of a different size and shape than the graphics generated at the UI device 803a. For example, the UI device 803b may generate larger graphics that are easier to interact with via touch.

In some embodiments the GUI configuration 1010b of the UI device 803b may be identical to the GUI configuration 1010a of the UI device 803a, particularly in embodiments where the UI device 803a and the UI device 803b are the same type of device. In yet other embodiments, the GUI configuration 1010b may have very little correlation to the GUI configuration 1010a. In some instances, for example, the output provided at the display 830b of the UI device 803b may be partially or entirely text based. Even in such embodiments, the UI device 803b may still use the UI state information 896 to determine the process entities about which the UI device 803b should provide information. For example, even if UI device 803b does not display a graphic corresponding to the tank graphic 1015*a* of the UI device 803*a*, the UI device 803*b* may still determine that the tank is a high priority entity and may provide information about the text (a textual tank level value corresponding to the tank level indicator 1016*a*, for example).

Figure 11:
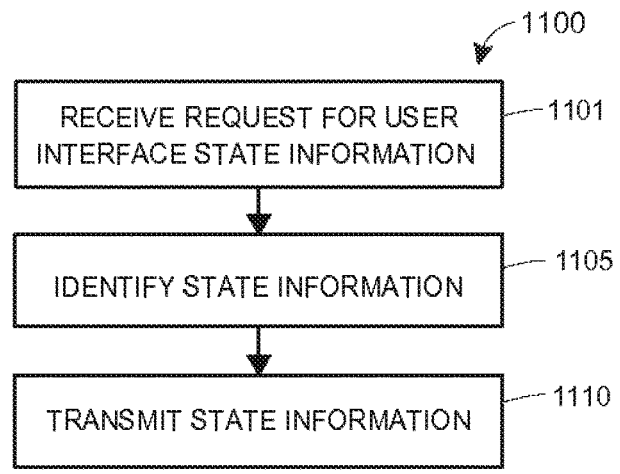
FIG. 11 is a flow chart depicting an example method for synchronizing UI devices.

FIG. 11 is a flow chart depicting one example method 1100 for synchronizing UI devices 112. Other example methods will be described below, and the method 1100 is not intended to be limiting. As described above, synchronizing UI devices 112 may enable a user to resume a previous session from the same or another device, and it may enable two or more users to collaborate by exchanging information. The method 1100 may be implemented, in whole or in part, by one or more devices and systems such as those shown in FIGS. 1-10. The method 1100 may be implemented as a set of instructions, routines, programs, or modules saved on the memory 815 of the UI device 112 and may be executed by the processor 810 of FIG. 8.

In the method 1100 the UI device 112 receives a request for UI state information 896 (block 1101). The UI device 112 identifies a UI state of the first UI device 112 (block 1105). Identifying a UI state may include identifying the output provided on a display of the first UI device 112. Identifying the output provided on the display may include identifying the visual representations and graphics being provided at the display of the first UI device 112 and identifying entities associated with said visual representations and graphics. Identifying the output provided on the display may also include: identifying the process parameters being provided at the display; identifying the GUI configuration at the display; and identifying the UI type or device type of the UI device 112.

The first UI device 112 may identify process entities associated with the output provided at the display. The process entities may include process parameter data, process plant areas, field devices, executing applications, or application states. For example, a first UI device 112 may identify a tank graphic provided at the display. Based on that identification, the first UI device 112 may identify tank level measurements, the process plant area for the tank (e.g., the boiler area), field devices associated with the tank (e.g., inlet valves to the tank, discharge pumps for the tank, temperature sensors for the tank material, etc.), applications executing on the first UI device 112 (e.g., a browser, historian, an alarm management suite, etc), and/or the state of the executing applications (e.g., the resources being accessed or used by the browser, the parameters being used or display by the historian, or the alarms being displayed by the alarm management suit).

After identifying a UI state of the first UI device 112, the first UI device 112 may transmit data representing the identified UI state to a second UI device 112 (block 1110). More particularly, the first UI device 112 may transmit data representing the identified entities to the second UI device 112. In alternative embodiments the first UI device 112 may transmit the entity data to the server 150, where the server 150 may subsequently transmit the entity data to the second UI device 112.

After receiving the UI state information 896 at the second UI device 112, the second UI device 112 may provide output corresponding to the received UI state, and more particularly, to the received entity data. For example, the second UI device 112 may provide the identified process parameter data (i.e., the process parameter data that was provided at the first UI device 112) at a display. The second UI device 112 may also generate a graphical overview of the identified plant area or areas (i.e., the areas associated with the identified output at the first UI device 112) at a display. Additionally or alternatively, the second UI device 112 may generate graphical representations of one or more identified field devices (i.e., the devices associated with the output provided at the first UI device 112) at a display. The second UI device 112 may also launch applications corresponding to the identified applications (i.e., the applications running at the first UI device 112). Finally, the second UI device 112 may cause one or more applications to be put into an identified state (i.e., the one or more application states identified at the first UI device 112).

By way of further example, and with reference still to FIG. 11, the UI device 803 may capture the UI state information 896 and transmit the state information to the process control network 100. The UI state information 896 may represent the state of the UI device 112 at the time of capture. The processor 810 may operate to capture the UI state information 896 by causing the memory 815 to store data representing the UI state. The processor 810 may retrieve the UI state information 896 from the memory 815 and transmit the UI state information 896 via the network interface 825 to the process control network 100. The UI state information 896 may ultimately be received by a node on the process control network 100, such as the server 150. In alternative embodiments the UI state information 896 may be transmitted via the peripheral interface (such as a USB interface, the WiFi interface, the Bluetooth interface, or the NFC interface), where the peripheral interface transmits the UI state information 896 to another UI device 803.

As discussed with regard to FIG. 1A and, later, with regard to FIG. 12A, 12B, the UI state information 896 may include information or data such as profile data relating to the user or operator interacting with the UI device 803. All or some of the profile data may be received at the input interface 830 or the network interface 825. The processor 810 may cause the input interface 830 or the network interface 825 to transmit the profile data over the system bus 825 to the memory 815. In certain embodiments the processor 810 may generate the profile data in response to data received from the input interface 830 or the network interface 825, the data relating to the user of the UI device 803 or a similar UI device 803. In other embodiments, the profile data may already exist on the memory 815, where the processor 810 may access the profile data, or save the profile data under a different data structure (for example, the processor 810 may access profile data collected during operation of the operating system 880 or another application on the UI device 803, and may cause the profile data to be saved to a particular database used for the UI state transfer operation).

In addition to profile data, the UI state information 896 may also include session data, relating to the output (i.e., graphics or sound) provided at the UI device 803 and relating to the applications executing at the UI device 803 and the state of the respective applications. Stated another way, in the depicted embodiment the processor 810 may generate the session data based on output provided at the display 825 and based on data generated or used during the operation of other applications executed by the processor 810. In addition to user profile data and session data, the UI state information 896 may include any other data relating to the operation or state of the UI device 803.

In another embodiment of the UI device 803, the UI device 803 may receive UI state information 896 from the process control network 100 and may operate to place the UI device 803 in a state corresponding to the UI state information 896. In such an embodiment, the UI state information

896 may represent a previously captured state of operation for another UI device ("previous UI device") (e.g., the UI device 803*b*) or for the UI device 803. In operation of such an embodiment of the UI device 803, the UI state information 896 may be received at the network interface 825 via the process control network 100. The network interface 825 may transmit the UI state information 896 to the memory 815 to be stored. The processor 810 may access some or all of the UI state information 896 stored in the memory 815 to put the UI device 803 in a state consistent with some or all of the UI state information 896. The UI state information 896 may indicate a UI state of operation in which the previous UI device provided information relating to particular entities in the process or process control network 100. The processor 810 may cause the display 820 to display information corresponding to the same particular entities. The display 820 may depict the information in the same or similar GUI configuration used by the previous UI device 803*b*, but may utilize a different GUI configuration in certain circumstances (e.g., where the UI device 803 is a different type of device than the previous UI device 803*b*). In some embodiments the processor 810 may identify points of interest (e.g., entities of interest) based on the UI state information 896 and may cause the display 820 to provide information on the identified points of interest.

In addition or alternative to indicating process entities, the UI state information 896 may indicate the state of one or more of the applications that were running on the previous UI device 803*b*. The processor 810 may cause the one or more applications to launch and operate at the indicated state. For example, the UI state information 896 may indicate that a browser window was open and displaying a particular webpage. In such an example the processor 810 may cause a browser application to launch and open the same particular webpage. In another example, the UI state information 896 may indicate that a process history viewing tool was running and that particular process values were being accessed or displayed by viewing tool. In such an example the processor 810 may cause a viewing tool application to launch and access or display the same particular process values.

Figure 12A:
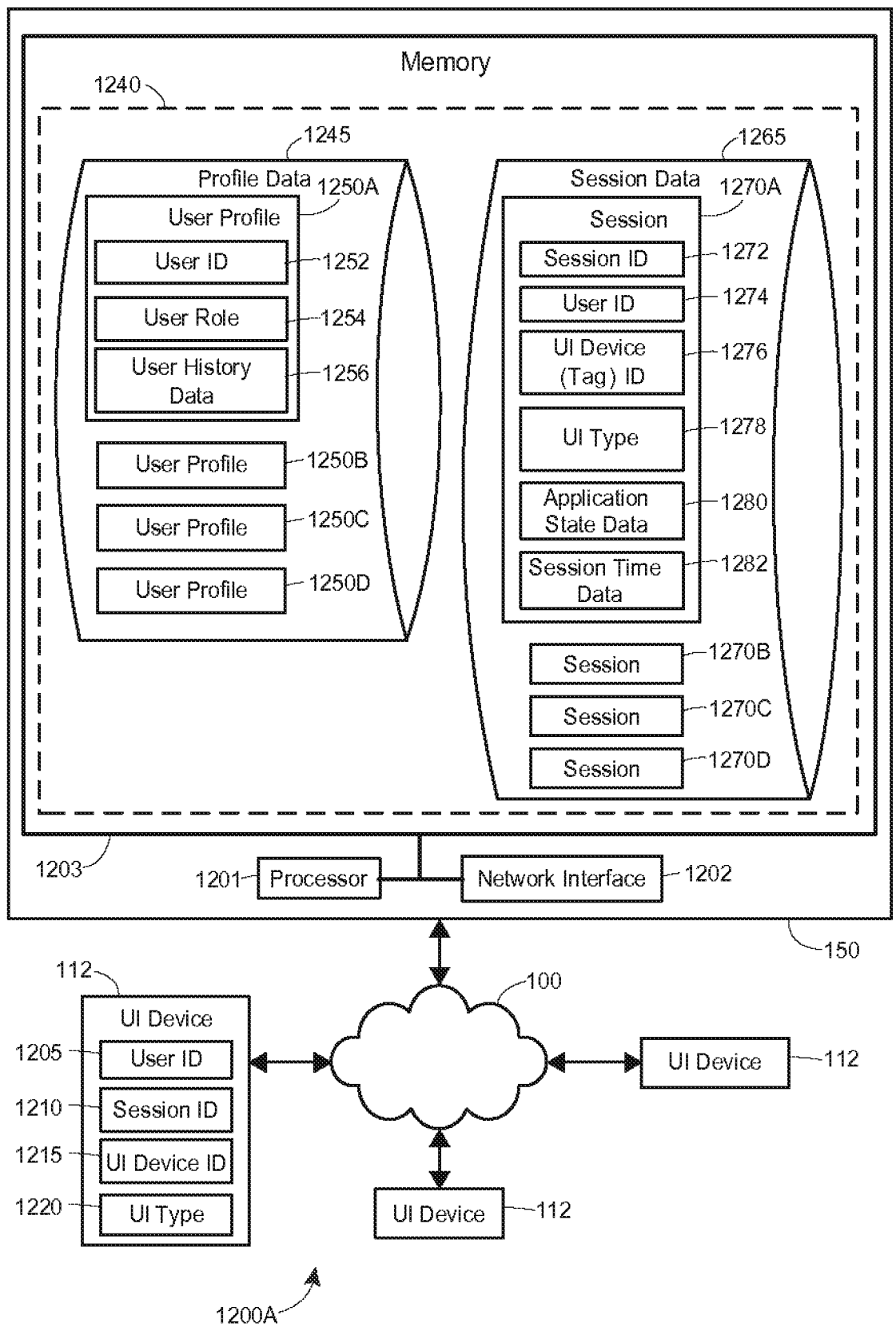
FIG. 12A is a block diagram depicting exemplary data associated with UI devices in an example mobile control room.

Turning to FIG. 12A, a block diagram depicts exemplary data associated with UI devices 112 in a mobile control room 1200*a*. The mobile control room 1200*a* may enable a state transfer to one or more UI devices 112, allowing a user of the respective UI device 112 to resume workflow from a previously saved state or allowing the user of the UI device 112 to collaborate with users of other UI devices 112. The mobile control room 1200*a* includes the server 150, the process control network 100, and the UI devices 112. In some embodiments the server 150 may also function as a UI device 112, where the server 150 includes the display 820 for displaying a GUI configuration and providing an operator or user with process information. In such an embodiment the server 150 may also include the input interface 830 for receiving user input.

The server 150 includes a processor 1201, a network interface 1202, and a memory 1203. The memory 1203 stores UI state information 1240, which may include profile data 1245 and/or session data 1265. The UI state information 1240 may be stored in the database 151 depicted in FIG. 9B. The server 150 may communicate over the process control network 100 using a wired or wireless communication channel. Similarly, each of the UI devices 112 may communicate over the process control network 100 using a wired or wireless communication channel, and each of the UI devices 112 may communicate with the server 150.

The memory 1203 of the server 150 may include volatile and/or non-volatile memory and may be removable or non-removable memory. For example, the memory 1203 may include computer storage media in the form of random access memory (RAM), read only memory (ROM), EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information. The processor 1201 is configured to fetch and execute instructions stored in the memory 1203. The memory 1203 may store data such as operating system data or program data. The network interface 1202 may include one or more antennas for wireless communication, one or more ports for wired connection, or both. In some embodiments, the network interface 1202 may include one or more GPS receivers, Bluetooth transceivers, NFC transceivers, RFID transceivers, and/or local network transceivers. The network interface 1202 may communicate with the UI devices 112 via the process control network 100.

Each UI device 112 may include data representing a user ID 1205, a session ID 1210, a client device ID 1215, and/or a UI type 1220. The user ID 1205 may correspond to a single user or operator and operates as a unique identifier. Similarly, the session ID 1210 may function as a unique identifier of a particular user session at the UI device 112. A user session is generally considered a period of use by a particular user without any extended breaks. In general, when a user stops using the UI device 112*a* for an extended period of time, and later resumes using the UI device 112*a*, the subsequent use represents the start of a new session (unless a session is resumed as described below). The client device ID 1215*a* may operate as a unique identifier of the UI device 112*a*. Finally, the UI type 1220*a* may represent the type of GUI implemented at the UI device 112*a*. The UI type often corresponds to the device type of the UI device. In the preferred embodiment, there are two common UI types: a normal UI and a mobile UI. Desktops, laptops, and other UI devices with larger screens typically implement a normal UI. Mobile devices, on the other hand, such as phones, PDAs, and tablets often implement a mobile UI, which provides larger graphics and text (relative to the screen size). In many embodiments, the mobile UI may provide a different GUI configuration and graphics due to the limited size of many mobile device screens. In other embodiments, there may be other UI types, such as a phone UI, a tablet UI, or a headset UI.

The profile data 1245 may include user profiles 1250*a*-1250*d*. Each of the user profiles 1250*a*-1250*d* may correspond to a unique user or operator. The user profile 1250*a* may include data representing a user ID 1252, a user role 1254, and user history data 1256. The user profiles 1250*b*-1250*d* may include similar elements. The user ID 1250*a* may represent a unique identifier for a particular user and may correspond to the user ID 1205*a* at the client device 112*a*. The user role 1254 may represent a particular user's responsibility, title, or role at the process plant. For example, the user role 1254 may limit the areas of the plant that the user has permission to control. The user role 1254 may also limit the extent of control the user can implement, or the types of programs the user may access. In some embodiments the user role 1254 may also limit the user's permissions for accessing and controlling entities in the process plant based on a schedule. For example, the user role 1254 may only have permission to implement control during his work schedule (from Sam-5 pm, for example). Finally, the user history data 1256 may represent trends, habits, and preferences of the user associated with the user profile 1250a. The user history data 1256 may reveal, for example, a particular area in the process plant, particular devices or equipment, or particular process parameters that tend to be focused on by the user.

The session data 1265 may include sessions 1270a-1270d. The session 1270a may include data representing a session ID 1272, a user ID 1274, a client device ID 1276, a UI type 1278, application state data 1280, and session time data 1282. Each of the sessions 1270b-1270d may include data representing similar entities. The session ID 1272 serves as a unique identifier for a particular session. The user ID 1274 may represent a unique user and may correspond to the user ID 1252 of the user profile 1250a and the user ID 1205a of the UI device 112a. The client device ID 1276 may uniquely identify a particular UI device and may correspond to the UI device ID 1215a. Similarly, the UI type 1278 may correspond to the UI type 1220a at the UI device 112a. The application state data 1280 may represent programs that were running at a UI device when the UI state information 1240 was captured, and may also represent the state of each particular application at the time of capture. The session time data 1282 may represent temporal data such as the start time of the session, the end time of the session, and the length of the session, etc.

In operation, the UI device 112a may capture the UI state information 1240 (including the profile data 1250a and the session data 1270a). When a user session has ended, the UI device 112a may transmit the UI state information 1240 to the server 150 to be stored. The network interface 1202 may receive the UI state information 1240 from the process control network 100. The processor 1201 may operate to transmit the UI state information 1240 to the memory 1203 where it is stored. In alternative embodiments, the UI device 112a may transmit some or all of the UI state information 1240 to the server 150 on a periodic basis, or in reaction to a triggering event. The server 150 may subsequently transmit some or all of the UI state information 896 to a UI device, such as UI device 112b.

Figure 12B:
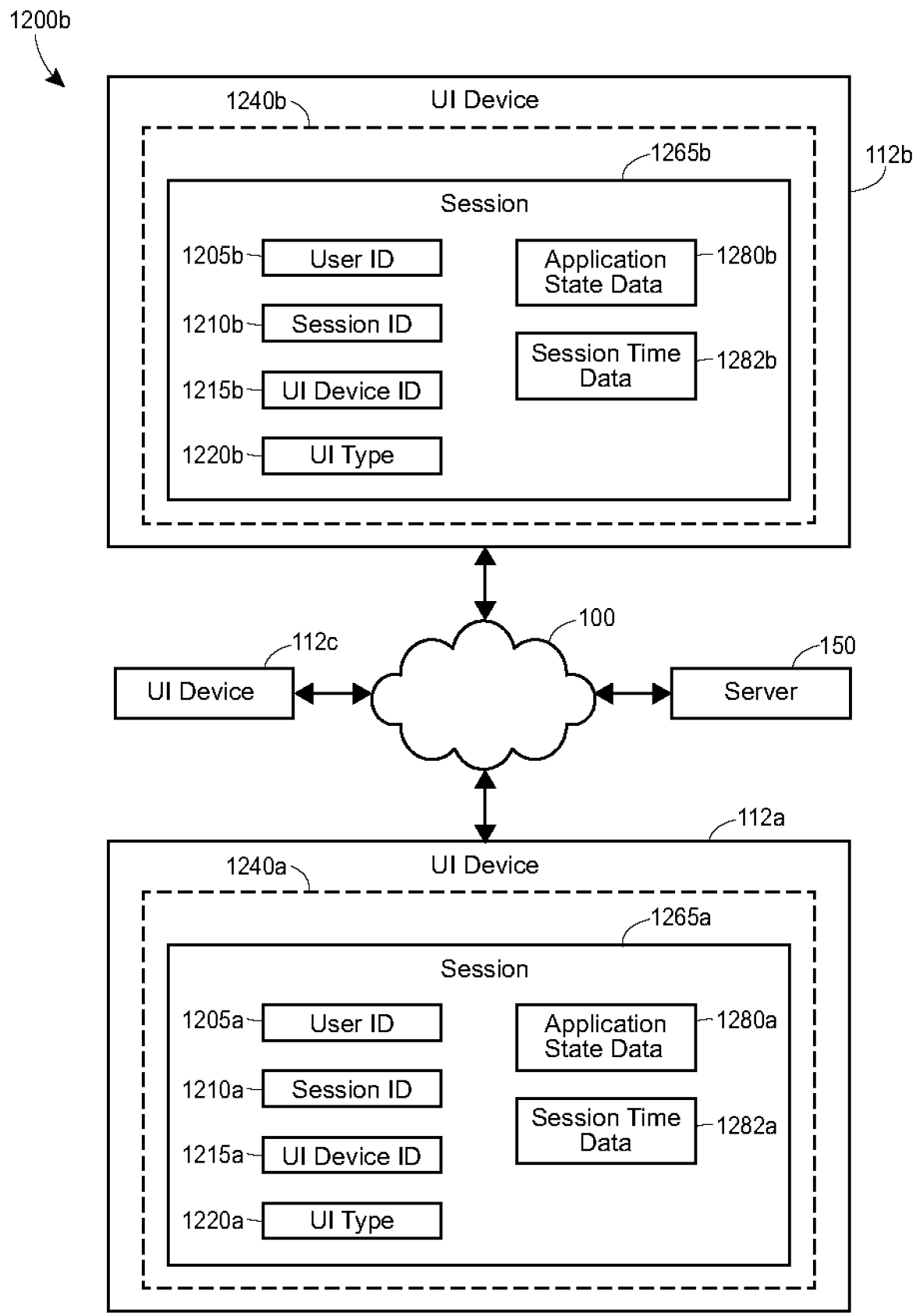
FIG. 12B is a block diagram depicting exemplary data associated with UI devices in another example of a mobile control room.

Similar to FIG. 12A, FIG. 12B is a block diagram depicting exemplary data associated with UI devices 112 in a mobile control room 1200b. The mobile control room 1200b may enable state transfer from a first UI device 112a to one or more other UI devices 112b, 112c. As in the mobile control room 1200a, the mobile control room 1200b allows a user of the UI device 112a to resume and/or continue a workflow on the UI device 112b, or to collaborate with another user using the UI device 112b. The mobile control room 1200b includes the server 150, the process control network 100, and the UI devices 112a-c. In some embodiments the server 150 may also function as a UI device 112, where the server 150 includes the display 820 for displaying a GUI configuration and providing an operator or user with process information. In such an embodiment the server 150 may also include the input interface 830 for receiving user input.

The mobile control room 1200b differs from the mobile control 1200a in at least one respect. Specifically, in the mobile control room 1200b, the state and/or session data are transferred, for example from the UI device 112a to the UI device 112b, directly rather than via the server 150. Each of the UI devices 112 stores the UI state information 1240, which may include the session data 1265. The session data 1265 stored by each of the UI devices 112 may include the User ID 1205, the Session ID 1210, the UI Device ID 1215, the UI device type 1220, the application state data 1280, and the session time data 1282.

The user profile data 1245 described with reference to FIG. 12A, may be stored in the server 150 and/or in the memory of the individual UI devices 112. In this way, any user may use any of the UI devices 112, and the user's profile (including the user's preferences, roles, history data, etc.) will be available to the UI device 112. In some embodiments, the UI device 112 may download or otherwise access the user profile data 1245 from the server 150 when a particular user logs into the UI device 112. In other embodiments, the profiles of all users, or of users who have previously used a particular UI device 112, may be resident in the memory of the UI device 112.

In operation, each UI device 112 may have stored in the memory 815 one or more applications, such as display applications, for viewing information about the process plant. The UI device 112 may periodically store the state of the application(s) in the application state data 1280 and/or may store the state of the application(s) upon a request to transfer that state to another UI device 112. By way of example, a user may be viewing process plant data using a viewing application on the UI device 112a. The viewing application may be resident on the UI device 112a, and may be retrieving and/or receiving data (e.g., process data) from the server 150. In embodiments, the UI device 112a receives both process data and visualization data from the server 150. For example, the UI device 112a may receive from the server 150 trend data related to a particular process parameter, and with that trend data may additionally receive rendering instructions indicating the manner in which the data are to be displayed (e.g., 3D plot information, table information, axis information, etc.). The rendering data may be sent as a separate entity, allowing the same data to be sent with different rendering (e.g., formatting) information according to the target device. In any event, the UI device 112a maintains certain information regarding the state of the application(s) running on the UI device 112a, including information about which data are being displayed, which process plant areas or devices are being displayed, which tasks are being executed, and the like.

The user may desire to switch from the UI device 112a to the UI device 112b, for example to move from a workstation UI device to a tablet UI device. To do so, the user may initiate a state transfer from the UI device 112a to the UI device 112b. In a first embodiment, the user brings the UI device 112b proximate to the UI device 112a such that NFC devices in each UI device 112 can communicate with each other to establish and set up a connection. The NFC devices may cooperate, for example, to set up a connection via Bluetooth or WiFi, such that the session data 1265a may be passed from the UI device 112a to the UI device 112b, allowing the UI device 112b to resume the session in a state similar to or the same as that which was operating on the UI Device 112a. In a second embodiment, the user may engage one or more menus on the UI device 112b to select a session number, for example, displayed on the display 820 of the UI device 112a. Other embodiments for transferring state, which may be employed in this circumstance or in others, are described throughout this description. The devices may then communicate, via the network 100 (and optionally the server 150) or directly between them via Bluetooth or WiFi to transfer the session data 1265a from the UI device 112a to the UI device 112b. Once the UI device 112b has received the session data 1265a and stored it as session data 1265b, the UI device 112b may resume the session that was previously operating on the UI device 112a.

In embodiments, the transfer of state from a first UI device 112 to a second UI device 112 also transfers any control associated with the UI device 112. For example, in some instances, a controller or other process device may receive inputs from only a single source at a time. In such instances, it is important that the source of the inputs be definitely established, and that any potential for conflicts be removed. Where a user switches from a first UI device 112 to a second UI device 112, any such inputs must definitively be associated with the second UI device 112 after the transfer of state to that device. In such instances, the server 150 may maintain tracking data (e.g., the UI device ID 1276 associated with a particular session 1265), and may re-assign the UI device ID upon the transfer to the second UI device. The server 150 may be able to establish that a transfer occurred, even if the transfer occurs directly between the first and second UI devices 112, according to the most recent request for process control data. For example, the server 150 may determine that the UI device 112b has most recently requested data and, therefore, may determine that the UI device 112b now has control over the session. Alternatively, the UI device 112a may relinquish or disavow the session once the session has been transferred, by sending a message to the server 150 indicating that the UI device 112a is no longer associated with the session transferred to UI device 112b, or the UI device 112b may send a similar message to the server 150 positively identifying that the UI device 112b is now associated with the session and instructing the server 150 that the UI device 112a is no longer associated with the session. In still another embodiment, each session may have associated with it a "session token," stored in the memory of the UI device, that is passed from device to device. When the device does not have the session token for a particular session, the device will not send commands (or at least will refrain from sending a subset of commands) from that device, even if the device otherwise maintains the session. In this manner, data associated with a particular session may continued to be displayed on the UI device 112a, even after the state transfer has occurred and the session token has been passed to the UI device 112b. The session token may take any form, including, by way of example, a secure file, a hash code, a particular code or character sequence, etc.

A variety of methods related to the concepts described in the preceding paragraphs will now be described with reference to corresponding figures.

Figure 13:
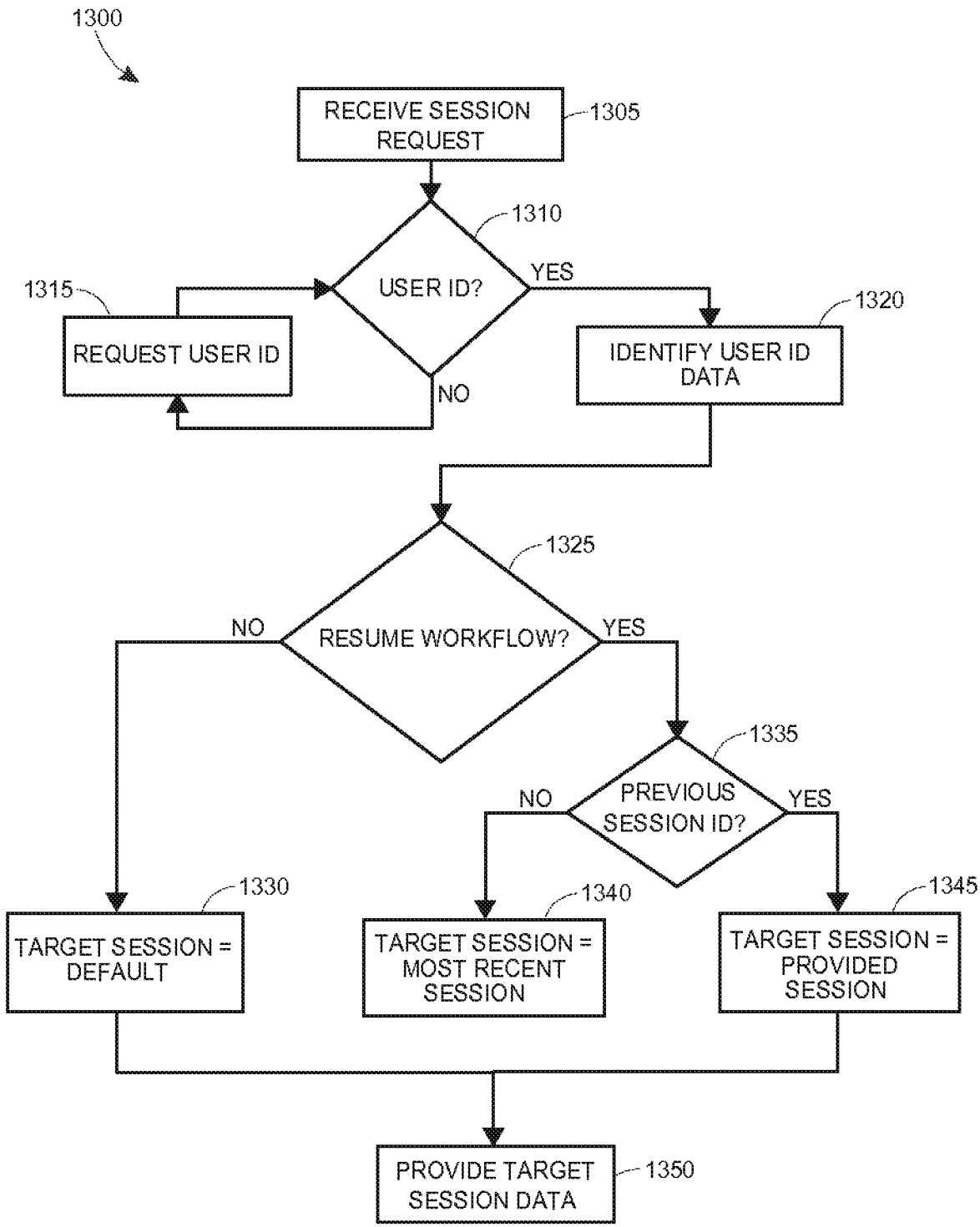
FIG. 13 is a flow chart of an example method for providing session data to a UI device.

FIG. 13 is a flow chart of an example method 1300 for providing session data to a UI device 112. Providing session data may facilitate UI state transfer or synchronization, enabling continuous workflow or worker collaboration. The method 1300 may be implemented, in whole or in part, at one or more devices or systems such as the server 150 shown in FIGS. 1, 9, and 12. The method may be saved as a set of instructions, routines, programs, or modules on the memory 1203, and may be executed by the processor 1201.

The method 1300 begins when the server 150 receives a session request from the UI device 112 (block 1305). The server 150 may determine whether the UI device 112 is providing a user ID (block 1310) and may request a user ID when one has not been provided (block 1315). Once the user ID has been provided, the server 150 may identify the data associated with the user ID (block 1320). For example, there may be one or more user profiles, sessions, or UI devices 112 associated with the user ID. In alternative embodiments, the server 150 may receive a UI device ID and identify data associated with the UI device ID (rather than the user ID).

After identifying data associated with the provided user ID, the server 150 may determine whether the UI device 112 is requesting to resume work flow from a previous session (block 1325). When no such request exists, the server 150 may identify a default session (i.e., data representing a new session or default session) as the "target session" that will be provided to the UI device (block 1330). The default session data may include data such as default GUI configuration data, default process parameter data, or default display data. For example, the default GUI configuration for new sessions that do not resume previous work-flow may include an active window with a plant overview graphic. The server 150 may transmit the default session data to the UI device 112 (block 1350).

When the server 150 receives a request to resume previous work flow, the server 150 may determine whether a particular session has been identified by the UI device 112 (block 1335). When no particular session has been identified, the server 150 may identify the most recently saved session associated with the user ID (or UI device ID in alternative embodiments) as the "target session" that will be provided to the UI device 112 (block 1340). The server 150 may transmit the recent session data to the UI device 112 (block 1350). When the server 150 receives a particular session associated with the request to resume workflow, the server 150 may identify the stored session data for that particular session (stored in the memory 1203 of the server 150 shown in FIG. 12A, for example) as the data for the "target session" that will be provided to the UI device 112 (block 1345). The server 150 may transmit the particular session data to the UI device 112 (block 1350).

In alternative embodiments, the server 150 may be a second UI device 112, wherein the second UI device 112 receives the session request from a first UI device 112 and provides session data to the first UI device 112.

Figure 14:
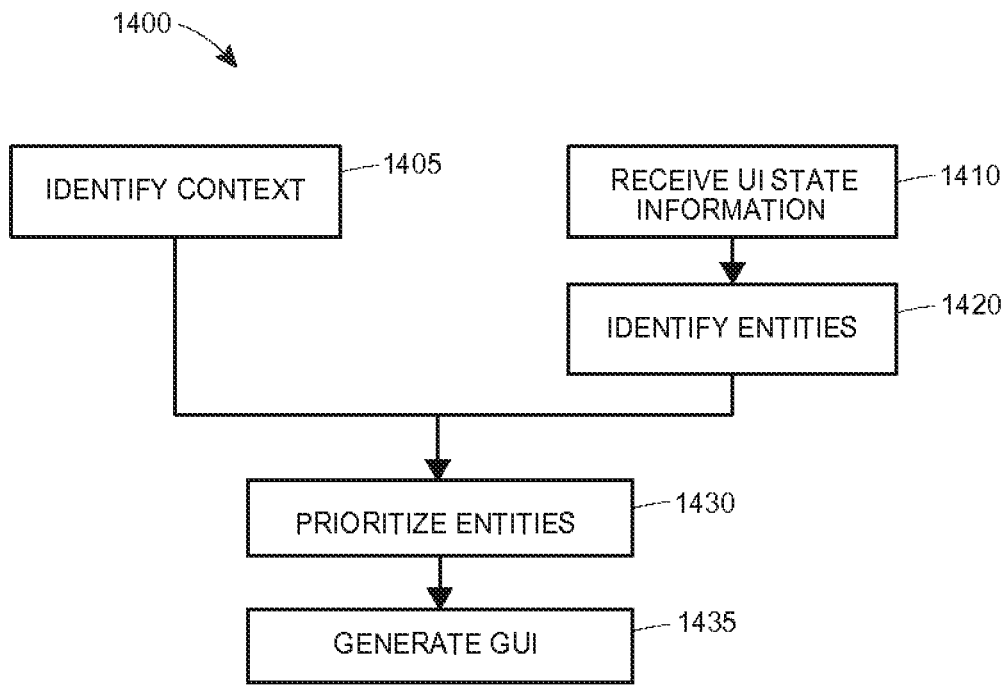
FIG. 14 is a flow chart of an example method for generating a GUI configuration at a UI device.

FIG. 14 is a flow chart of an example method 1400 for generating a GUI configuration at the UI device 112. The method 1400 may enable the UI device 112 to provide output in accordance with the information received in a UI state transfer and in accordance with the context of the UI device's 112 environment and use. The method 1400 may be implemented, in whole or in part, at one or more devices or systems such as any of the UI devices 112 or 112a-g (FIGS. 1-10 and 12). The method 1400 may be saved as a set of instructions, routines, programs, or modules on the memory 815, and may be executed by the processor 8310.

The method 1400 begins when the UI device 112 identifies context data (block 1405). The UI device 112 may also identify entities associated with the context data. The context data may be any context information or item. In one embodiment, the context data may represent any of the elements included in the context awareness data 1540 or the work item data 1550 described in relation to FIG. 15. The associated entities may be any area, equipment, devices, or parameter associated with the context item.

The method 1400 may include receiving UI state information 896, such as the UI state information 896 shown in FIG. 12 (block 14). The UI device 112 may receive the UI state information 896 from a device or system implementing the method 1300 shown in FIG. 13. After receiving the UI state information 896, the UI device 112 may identify entities associated with the received UI state information 896 (block 1420). An entity may be any area, device, system, or parameter in the process. In general, the entities associated with the UI state information 896 are also associated with the information that was provided at the previous UI device 112 where the UI state information 896 was captured.

The UI device 112 may prioritize the entities (block 1430). An entity may be higher or lower priority depending on factors such as the entity's importance to stable operation of the process, time sensitivity (e.g., a batch may be ruined if an entity is not addressed quickly), location (e.g., the UI device 112 is proximate to a location associated with an entity), status (e.g., an entity is malfunctioning or associated with a malfunction), alarm condition, (e.g., the entity is associated with a parameter value outside the normal operating range), schedule (e.g., an entity may be associated with off-line equipment), or work item relevance (e.g., the entity may be related to a work item associated with the user or UI device 112).

The UI device 112 may generate a GUI configuration based on the prioritized entities (block 1435). Prioritizing the entities may be necessary when the UI device 112 cannot display all of the information relevant to the entities identified in the context data and the received session. For example, in some embodiments the previous UI device 112 may be a workstation with a normal UI type, while the UI device 112 receiving the UI state information 896 is a tablet with a mobile UI type. Because mobile UI devices are configured for smaller screens, they often provide less information. Thus, even if the UI device 112 avoided identifying entities associated with context data, the UI device 112 would still prioritize entities in order to identify for which entities the UI device 112 should provide information.

In alternative embodiments, the system or device providing the UI state information 896 may identify the UI type or device type of the UI device 112 receiving the UI state information 896. In such embodiments, the providing system may tailor the UI state information 896 provided to the UI device 112. In other words, the providing system may provide more or less information based on the UI type or device type. The providing system may also provide display data formatted for the UI type or device type.

Figure 15:
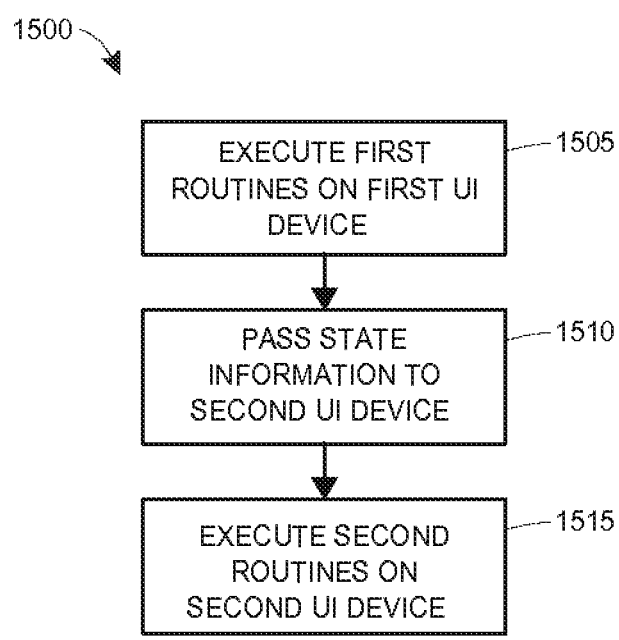
FIG. 15 is a flow chart depicting an exemplary method for direct state information transfer between two UI devices.

FIG. 15 is a flow chart depicting a method 1500 for direct state information transfer between two UI devices 112 in the process control plant 10. The method 1500 may be implemented, in whole or in part, at one or more devices or systems such as any of the UI devices 112. The method 1500 may be saved as a set of instructions, routines, programs, or modules on the memory 815, and may be executed by the processor 810.

The method 1500 beings with a first UI device 112 that may execute one or more first routines for performing a function (block 1505). The function may be a control function, operation function, configuration function, a maintenance function, a data analysis function, a management function, a quality control function, or a security function. The first UI device 112 may be coupled, via a network, to a unitary, logical data storage area, such as the big data appliance 102. The unitary, logical data storage area may be configured to store, using a common format, process data corresponding to the process plant. The process data may include multiple types of process data, including configuration data, continuous data, batch data, measurement data, and event data.

The first UI device 112 may pass state information to a second UI device 112 (block 1510). The state information may indicate one or more first routines operating on the first UI device 112. In some embodiments, the state information may be passed via an Internet connection. In other embodiments, the state information may be passed via an intermediary network. In still other embodiments, the state information may be passed from the first UI device 112 to the second UI device 112 via point-to-point wireless connection. In some instances, the state information may be passed via wireless communication according to a protocol such as the Bluetooth protocol or the NFC protocol. In other instances, the state information may be passed from the first UI device 112 to the second UI device 112 via an intermediary device (which may be the server 150). In certain instances, the first UI device 112 may pass the state information to the second UI device 112 when the UI devices 112 mutually detect one another and the same user is logged onto both devices. In some embodiments, the state information may be passed upon an receiving an instruction, at the first UI device 112, to pass the state information. In certain embodiments, passing the state information may facilitate one or more of: collaboration on the two UI devices 112 between different users; mobility of a single user across the two UI devices 112; device awareness of user location within the process plant; or device awareness of user proximity to particular process plant equipment.

The second UI device 112 may receive the state information and execute one or more second routines (block 1515). The display of the second UI device 112 may be configured according to the stored state and according to the device type of UI type of the second UI device 112. The second routines may correspond to one or more of the first routines operating on the first UI device 112. In some embodiments, the second UI device 112 may receive a signal from a location awareness component and may modify the execution of the one or more second routines according to the received signal. In certain instances, the location awareness component may receive a signal from the second UI device 112. The signal may cause, via the network, the second UI device 112 to modify execution of the one or more routines according to the received signal. Modifying executing of the one or more routines may include one or more of: highlighting an area of the process plant in which the second UI device 112 is located; displaying information about a particular device within a predetermined distance of the second UI device 112; displaying an alarm relevant to a device in the area of the process plant in which the second UI device 112 is located; or displaying a work item pertaining to a device in the area of the process plant in which the second UI device 112 is located.

In some embodiments, the second UI device 112 may receive a signal from an equipment awareness component and modify execution of the one or more second routines in accordance with the received signal. In certain embodiments, the equipment awareness component may include a transmitter to transmit a wireless signal to the second UI device 112. The wireless signal may identify the equipment with which the transmitter is associated.

In some embodiments, either or both the first UI device 112 and the second UI device 112 may be mobile devices. In other embodiments, either or both the first and second UI devices 112 may be workstations. In some embodiments, one UI device 112 may be a mobile device and the other may be a workstation. In an embodiment, the second UI device 112 may configure a display according to the state information received from the first UI device 112 and according to a device type or UI type associated with the second UI device 112.

Figure 16:
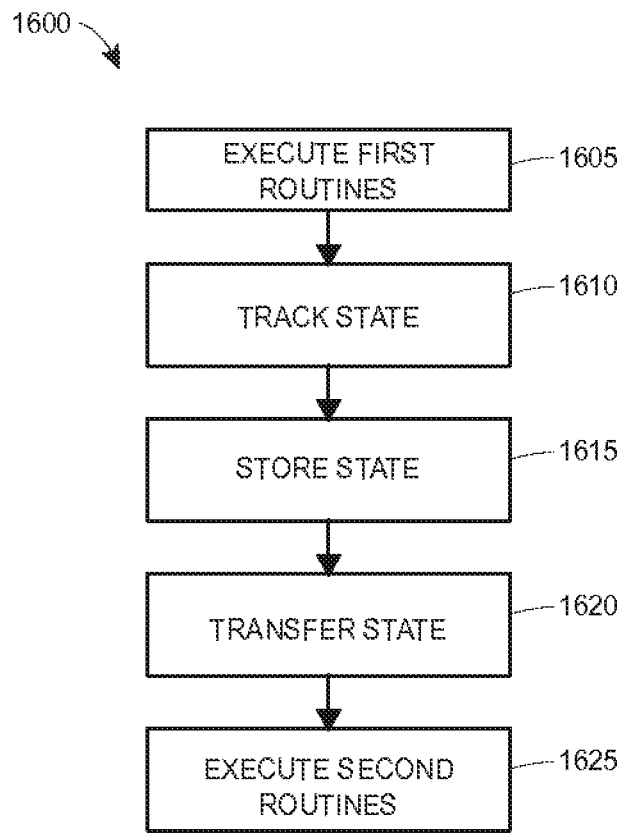
FIG. 16 is a flow chart depicting an example method for transferring state information between two UI devices coupled to a server.

FIG. 16 is a flow chart depicting an example method 1600 for transferring state information between two UI devices 112 coupled to the server 150 in the process plant 10. The method 1600 may be implemented, in whole or in part, at one or more networks or systems such as the process control network 100. In particular, the method 1600 may be implemented, in whole or in part, at one or more devices or systems such as the server 150 or at one or more devices or systems such as any of the UI devices 112. The method 1600 may be saved as a set of instructions, routines, programs, or modules on the memory 815 or the memory 1203, and may be executed by the processor 810 or the processor 1201.

The method 1600 begins with a first UI device 112 that may execute one or more first routines for performing a function in a process plant (block 1605). The first UI device 112 may track the state of the one or more first routines executing at the first UI device 112 (block 1610). In some embodiments, the server 150 may track the state of the one or more first routines executing at a first UI device 112. The first UI device 112, or the server 150, may store the tracked state of the one or more first routines (block 1615)

The first UI device 112, or the server 150, may transfer the stored state of the one or more first routines to a second UI device 112 (block 1620). In some embodiments, the state information may be passed via an Internet connection. In other embodiments, the state information may be passed from the first UI device 112 or server 150 to the second UI device 112 via point-to-point wireless connection. The state information may also be transferred from the first UI device 112 to the second UI device 112 via an intermediary device or server 150. In some instances, the state information may be passed via wireless communication according to a protocol such as the Bluetooth protocol or the near field communication protocol. In certain embodiments, the state may be transferred to the second UI device 112 upon detection of the first UI device 112 by the second UI device 112, or upon detection of the second UI device 112 by the first UI device 112. Transferring the stored state to the second UI device 112 may include transferring the stored state upon an instruction received at the first UI device 112, where the instruction instructs the first UI device 112 to pass the stored state to the second UI device 112.

The second UI device 112 may execute one or more second routines, where the second routines correspond to the one or more first routines executed at the first UI device 112 (block 1625). In some embodiments, the second UI device 112 may receive a signal. The signal may indicate the proximity of the second UI device 112 to a device or location. After receiving the signal, the second UI device 112 may modify the execution of the one or more second routines according to the received signal. In some embodiments the second UI device 112 may transmit, to a location awareness component, a signal indicating the proximity of the second UI device 112 to the device or location. In such an embodiment the second UI device 112 may receive, from a server 150, information specific to the device or location.

In some embodiments, the second UI device 112 may take one or more of the following actions when in proximity to the device or location: highlighting an area of the process plant in which the second UI device 112 is located; displaying information about a particular device within a predetermined distance of the second UI device 112; displaying an alarm relevant to a device in the area of the process plant in which the second UI device 112 is located; displaying a work item pertaining to a device in the area of the process plant in which the second UI device 112 is located; highlighting on a display process plant equipment associated with the received signal; displaying on the second UI device 112 information about a particular device associated with the received signal; displaying an alarm relevant to the device associated with the received signal; or displaying a work item pertaining to the device associated with the received signal.

In some embodiments, either or both the first UI device 112 and the second UI device 112 may be mobile devices. In other embodiments, either or both the first and second UI device 112 may be workstations. In some embodiments, one UI device 112 may be a mobile device and the other may be a workstation. In an embodiment, the second UI device 112 may configure a display according to the state information received from the first UI device 112 and according to a device type or UI type associated with the second UI device 112.

Figure 17:
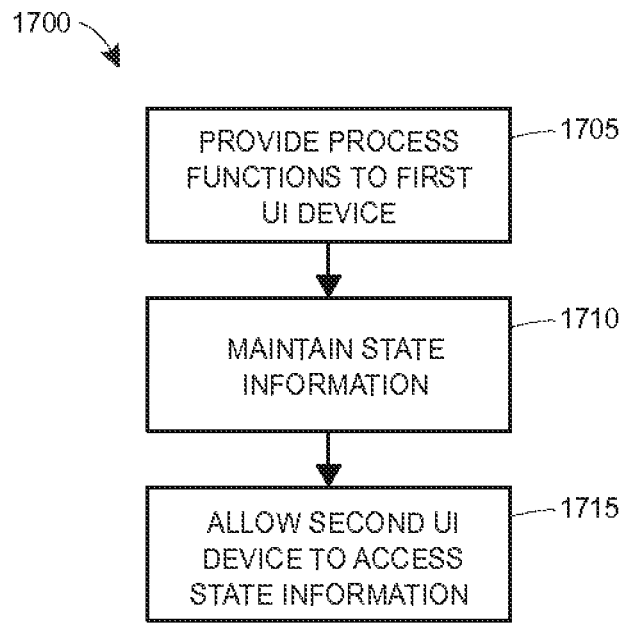
FIG. 17 is a flow chart depicting an additional method for transferring state information between two UI devices.

FIG. 17 is a flow chart depicting an additional method 1700 for transferring state information between two UI devices 112 in the process control plant 10. The method 1700 may be implemented, in whole or in part, at one or more devices or systems such as the server 150 or at one or more devices or systems such as any of the UI devices 112. The method 1700 may be saved as a set of instructions, routines, programs, or modules on the memory 815 or the memory 1203, and may be executed by the processor 810 or the processor 1201 of FIG. 12.

The method 7500 begins with the server 150 that may provide one or more functions related to process data (block 1705). In some embodiments, the process data may be stored at a unitary, logical, data storage area and may be stored using a common format. The process data may include multiple types of process data, including configuration data, continuous data, batch data, measurement data, and event data.

The server 150 may allow a first UI device 112 to access, via the server 150, the process data. The server 150 may also allow the first UI device 112 to maintain state information on the server 150 (block 1710). The state information may be indicative of the state of the UI executing on the first UI device 112.

The server 150 may allow a second UI device 112 to access, via the server 150, the process data and state information (block 1710). The second UI device 112 may execute a UI in accordance with the state information.

In some embodiments, either or both the first UI device 112 and the second UI device 112 may be mobile devices. In other embodiments, either or both the first and second UI devices 112 may be workstations. In some embodiments, one UI device 112 may be a mobile device and the other may be a workstation.

Figure 18:
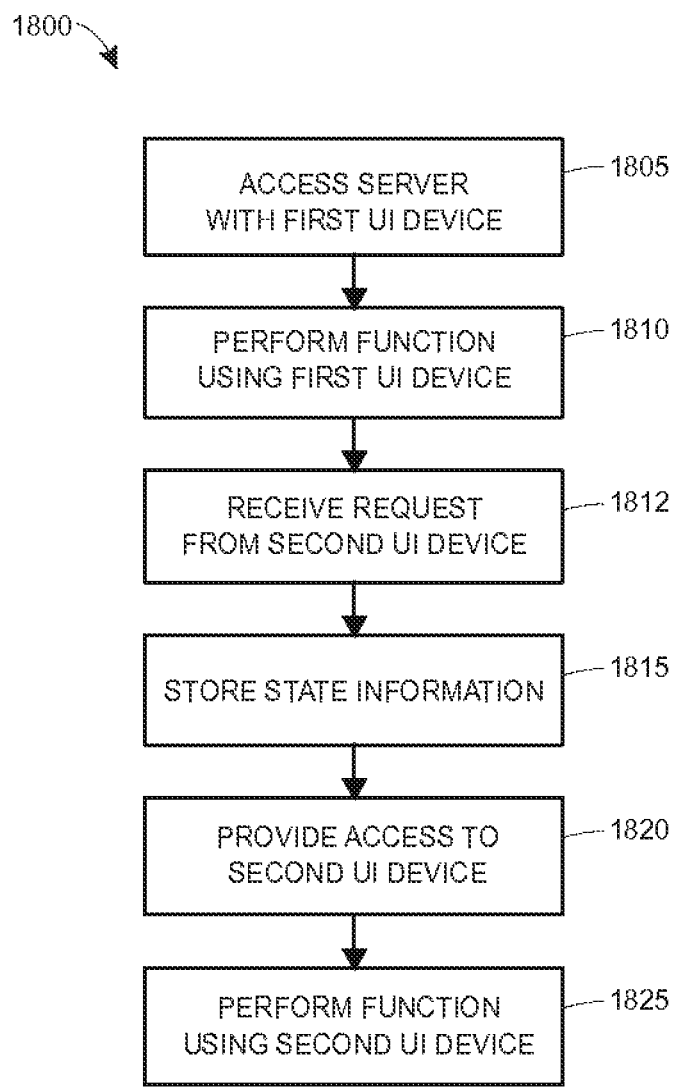
FIG. 18 is a flow chart depicting still another exemplary method for controlling a process plant using UI devices associated with a mobile control room.

FIG. 18 is a flow chart of an exemplary method 1800 for operating the process control plant 10 using UI devices 112 associated with the mobile control room. The method 1800 may be implemented, in whole or in part, at one or more devices or systems such as the server 150 or at one or more devices or systems such as any of the UI devices 112. The method 1800 may be saved as a set of instructions, routines, programs, or modules on the memory 815 or the memory 1203, and may be executed by the processor 810 or the processor 1201.

The method 1800 begins with a first UI device 112 that may access the server 150 (block 1805). The server 150 may be communicatively coupled to a database storing process data. The first UI device 112 may be associated with a first user profile. The first UI device 112 may perform a function in the process plant (block 1810).

A second UI device 112 may request access to the server 150 (block 1812). The second UI device 112 may be associated with the first user profile. The server 150 may store state information, where the state information is associated with the state of the first UI device 112 (block 1815).

The server 150 may provide access to the second UI device 112, where the access may be in accordance with the stored state information (block 1820). The second UI device 112 may perform a function in the process plant (block 1825).

In some embodiments, either or both the first UI device 112 and the second UI device 112 may be mobile devices. In other embodiments, either or both the first and second UI devices 112 may be workstations. In some embodiments, one UI device 112 may be a mobile device and the other may be a workstation.

Figure 19:
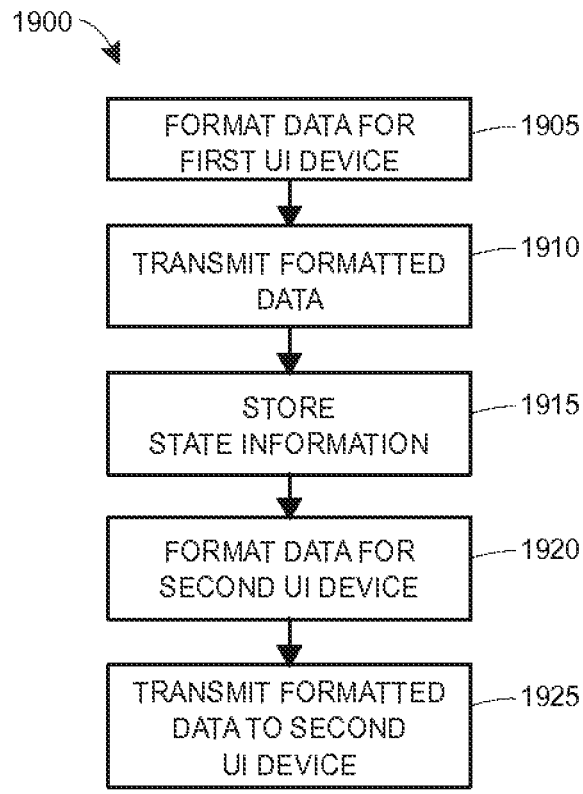
FIG. 19 is a flow chart depicting a method executed on a server for facilitating mobile control of a process plant using UI devices.

FIG. 19 is a flow chart depicting an exemplary method 1900, executed on a server, for facilitating mobile control of the process plant 10. The method 1900 may be implemented, in whole or in part, at one or more networks or systems such as the process control network 100. In particular, the method 1900 may be implemented, in whole or in part, at one or more devices or systems such as the server 150 or at one or more devices or systems such as any of the UI devices 112. The method 1900 may be saved as a set of instructions, routines, programs, or modules on the memory 815 or the memory 1203, and may be executed by the processor 810 or the processor 1201.

The method 1900 begins with the server 150 that may format process data for display on a first UI device 112 (block 1905). In some instances, the formatted process data may be viewable in a web browser executing on the first UI device 112. The server 150 may format the process data according to a device type or a UI type of the first UI device 112.

The server 150 may transmit, to the first UI device 112, the formatted process data (block 1910). In particular, the server 150 may transmit, to the first UI device 112, process data viewable in a multi-purpose process control application executing on the first UI device 112.

The server 150 may store state information associated with the display of the process data on the first UI device 112 (block 1915). Storing the state information may include storing one or more of: a display configuration of the first UI device 112; a portion of the process plant displayed by the first UI device 112; data of a process control device displayed by the first UI device 112; a function being performed on the first UI device 112, the function including one or more of a control function, an operation function, a configuration function, a maintenance function, a data analysis function, a quality control function, or a security function; and a user profile active on the first UI device 112.

The server 150 may format the process data for display on a second UI device 112 according to the stored state information (block 1920). The server 150 may transmit, to the second UI device 112, the process data (block 1925). In particular, the server 150 may format the process data according to a device type or UI type of the second UI device 112. In some instances, the device type of the second UI device 112 may be different than the device type of the first UI device 112. For example, the first UI device 112 may be a workstation and the second UI device 112 may be a mobile device. Alternatively, the first UI device 112 may be a mobile device and the second UI device 112 may be a workstation. In some embodiments, the server 150 may format the process data for display on the second UI device 112 such that an operation state of the first UI device 112 is duplication on the second UI device 112.

In some embodiments, the server 150 may receive a request from the second UI device 112 to provide to the second UI device 112 a user interface according to the stored state information. The server 150 may establish, with the second UI device 112 and in response to the request to provide a user interface, a secure communication channel between the server 150 and the second UI device 112.

Figure 20:
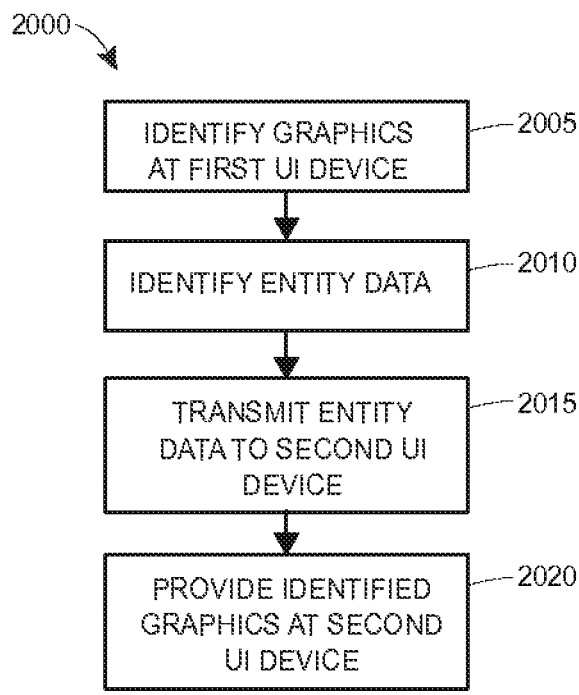
FIG. 20 is a flow chart depicting a method for transferring a state of a first UI device to a second UI device.

FIG. 20 is a flow chart of an exemplary method 2000 for transferring a state of the first UI device 112 to the second UI device 112. The method 2000 may be implemented, in whole or in part, at one or more networks or systems such as the process control network 100. In particular, the method 2000 may be implemented, in whole or in part, at one or more devices or systems such as the server 150 or at one or more devices or systems such as any of the UI devices 112. The method 2000 may be saved as a set of instructions, routines, programs, or modules the memory 815 or the memory 1203, and may be executed by the processor 810 or the processor 1201.

The method 2000 begins with a first UI device 112 or the server 150 that may identify the graphics depicted at a display of the first UI device 112 (block 2005).

The first UI device 112 or the server 150 may identify process entity data associated with the graphics provided at the display of the first UI device 112 (block 2010). Identifying the process entity data may include identifying one or more of: process parameter data associated with the graphics provided at the display of the first UI device 112; a process plant area associated with the graphics provided at the display of the first UI device 112; a field device associated with the graphics provided at the display of the first UI device 112; an application executing on the first UI device 112; or a state of an application executing on the first UI device 112.

The first UI device 112 or the server 150 may transmit the identified process entity data to a second UI device 112 (block 2020). The first UI device 112 or the server 150 may provide the identified graphics to the second UI device 112 (block 2020).

Figure 21:
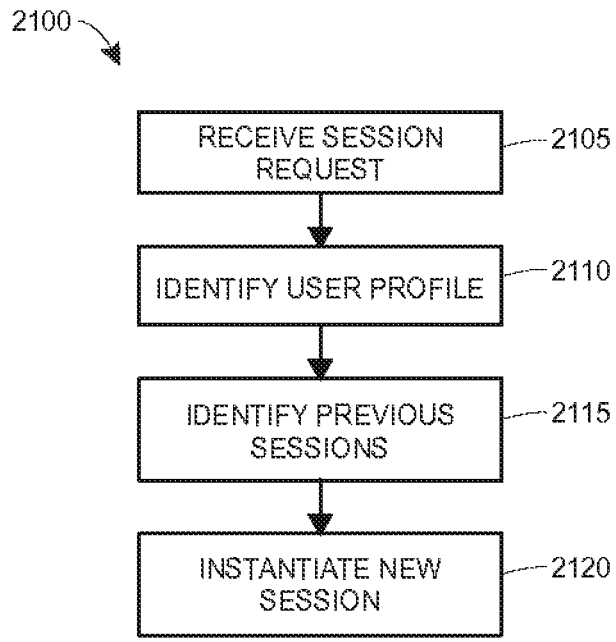
FIG. 21 is a flow chart depicting a method for initiating a UI session on a first UI device.

FIG. 21 is a flow chart depicting a method 2100 for initiating a UI session on the first UI device 112. The method 2100 may be implemented, in whole or in part, at one or more networks or systems such as the process control network 100. In particular, the method 2100 may be implemented, in whole or in part, at one or more devices or systems such as the server 150 or at one or more devices or systems such as any of the UI devices 112. The method 2100 may be saved as a set of instructions, routines, programs, or modules on the memory 815 or the memory 1203, and may be executed by the processor 810 or the processor 1201.

The method 2100 begins with the server 150 that may receive, from a first UI device 112, a session request (block 2105).

The server 150 may identify a user profile associated with the session request (block 2110). Identifying a user profile associated with the session request may include receiving, from the first UI device 112, a user identifier associated with the user profile. The user identifier may be currently logged into the first UI device 112. Identifying a user profile may also include receiving, from the first UI device 112, a user identifier associated with the user profile, where the user identifier may be currently logged into a second UI device 112.

The server 150 may determine whether a previous session exists (block 2115). The making the determination may include requesting, from the first UI device 112, a session identifier associated with the previous session. In some embodiments, making the determination may include receiving, from the first UI device 112 and in response to the session identifier request, a session identifier. In some embodiments, making the determination may include identifying the session identifier received with the session request.

The server 150 may instantiate a new session according to the previous session when a previous session exists (block 2115). Alternatively, the server 150 may instantiate a new session if no previous session exists, where the new session may be instantiated using a default session configuration. Instantiating a new session according to a previous session may include determining whether a session identifier was received with the session request. When a session identifier was received with the session request, the server 150 may instantiate a session associated with the session identifier. When a session identifier was no received with the session request, the server 150 may instantiate a session associated with a recent session, such as the most recent session of a user identifier associated with the first UI device 112.

In some embodiments, the method 2100 may further include the server 150 transmitting, to the second UI device 112, a request to instantiate on the first UI device 112 a session according to the session operating on the second UI device 112. The method 2100 may also include the server 150 receiving, from the second client device, a confirmation.

Figure 22:
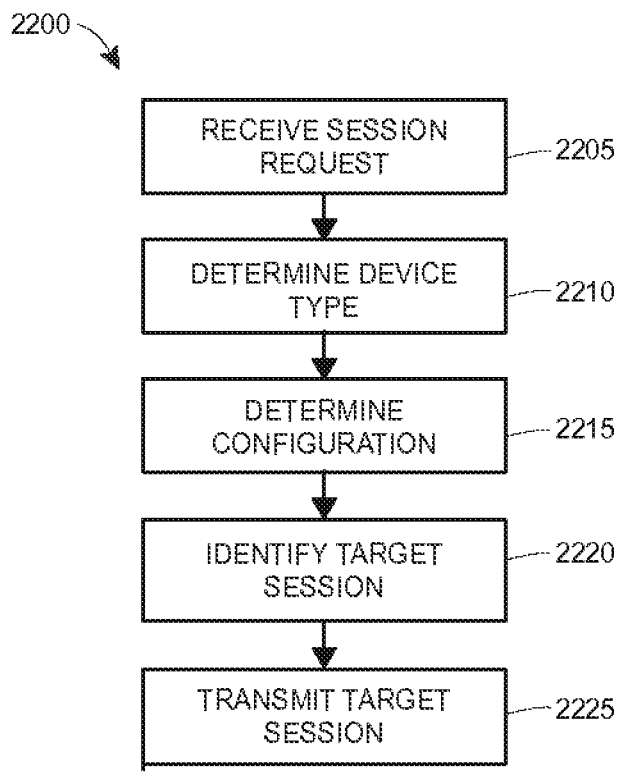
FIG. 22 is a flow chart depicting a second method for instantiating a UI session on a first UI device.

FIG. 22 is a flow chart of a second method 2200 for instantiating a UI session on the first UI device 112. The method 2200 may be implemented, in whole or in part, at one or more networks or systems such as the process control network 100. In particular, the method 2200 may be implemented, in whole or in part, at one or more devices or systems such as the server 150 or at one or more devices or systems such as any of the UI devices 112. The method 2200 may be saved as a set of instructions, routines, programs, or modules on the memory 815 or the memory 1203, and may be executed by the processor 810 or the processor 1201.

The method 2200 begins with the server 150 that may receive, from a first UI device 112, a session request (block 2205). Receiving the session request may include receiving a target session identifier and a device type.

The server 150 may determine a device type associated with the session request (block 2210). The server 150 may identify a graphical user interface configuration according to the device type (block 2215). The server 150 may identify a target session associated with the session request (block 2220).

The server 150 may configure a new session for the first UI device 112 according to the identified graphical user interface configuration and the identified target session. The server 150 may transmit, to the first UI device 112, data associated with the new session (block 2225). Configuring the new session may include identifying, as session data, one or more of a process area, an equipment resource, or a set of process data monitored or controlled in the target session. Configuring the new session may also include configuring the new session according to constraints associated with the identified graphical user interface configuration. Configuring the new session may further include identifying context data associated with the session request.

Identifying context data may include: identifying a location of the first UI device 112 in the process plant, identifying a user type or a user identifier associated with the session request; identifying a user type or a user identifier associated with the first UI device 112; identifying one or more process control devices within a predetermined distance from the first UI device 112; identifying a function being performed on a second UI device 112 associated with the target session; or identifying a user identifier associated with a second US device associated with the target session.

Context Awareness

Figure 23:
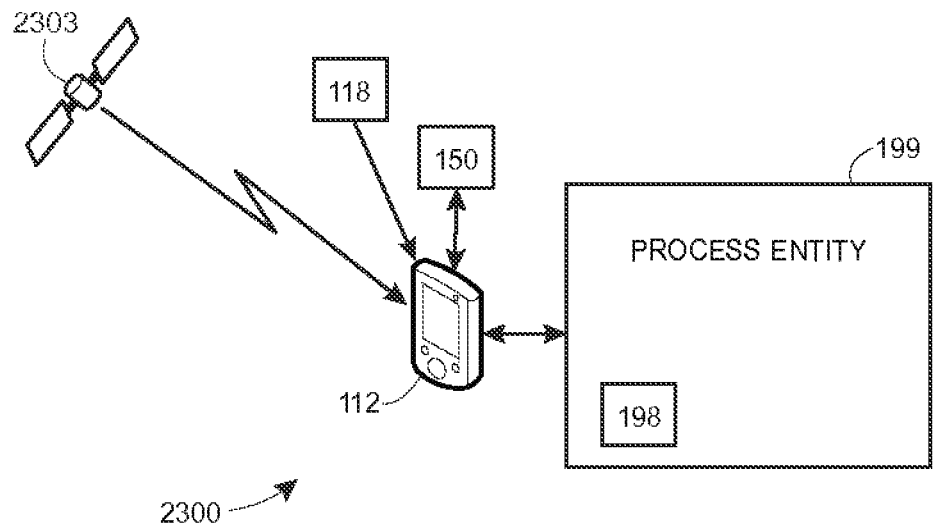
FIG. 23 illustrates a second aspect of an exemplary mobile control room.

FIG. 23 illustrates a second aspect of an exemplary mobile control room 2300—context awareness. The mobile control room 2300 includes a UI device 112 and a process entity 199. The process entity 199 may be a current task, a user, a process area, a device, a piece of equipment, or another UI device. The mobile control room 2300 may respond to one or more contexts in combination, and may respond to the one or more contexts in a variety of manners, as described below. Generally, the UI device 112 will retrieve information about what data to display and the format in which to display the data, and will retrieve and/or display data according to the context.

In embodiments, the information that specifies the types and format of data to display is included in an extended device description language (DDL). A DDL is a human-readable language that provides a protocol for describing the data available from a smart device, the meaning of the data associated with the smart device and retrieved therefrom, the methods available for implementation of the smart device, the format for communicating with the smart device to obtain data, user interface information about the device (such as edit displays and menus), and data necessary for handling or interpreting other information pertaining to the smart device. An extended DDL may also include, among other things: what information should be displayed to different types of users; how to format the information displayed to different types of users; what information should be displayed on different types of displays; how to format the information displayed on different types of displays; what information should be displayed according to a target function (i.e., what information to display when a user is performing a specific task); how to format the information displayed for a user performing a target function; and how to merge instructions according to various profiles according to some combination of user, target function, and display type.

The UI device 112 may download the DDL or extended DDL for a particular device from the server 150 when the UI device 112 is proximate to a specific process control device and/or when the user requests to display information related to the process control device. In some embodiments, the UI device 112 may cache the DDL or extended DDL (referred to collectively hereafter as "the DDL") for future use once it has been used. By caching the DDL for a device, the UI device 112 can more quickly provide the display information when a particular context or display is activated/requested. The UI device 112 may update the DDL information in the background, in case the DDL has changed. The DDL may change according to user preferences, according to standards for the process plant, according to determinations by the expert system regarding what information is useful in a particular context (e.g., if the expert system determines that a particular parameter or value is important in the event of an alarm, etc.), and the like.

In an embodiment, the mobile control room 2300 and, in particular, the UI device 112 carried by a user, may display for the user information (e.g., status, process variables and/or parameters, etc.) related to a particular process control device proximate to the user. The UI device 112 may determine the location of the UI device 112 and/or may determine that the UI device 112 is proximate to the process control device in the manner described below. After determining that the UI device 112 is proximate to the process control device, the UI device 112 may access or retrieve a DDL that specifies the device-specific data (e.g., process parameters, status, maintenance information, etc.) to display, and then may download and display the device-specific data according to the DDL. In embodiments, the data displayed for a specific process control device may include data related to other process control devices, such as data about the operation or status of adjacent devices, data about the operation of the process (e.g., state of a batch recipe), etc.

In another embodiment, the UI device 112 may display information according not only to the location of the device and/or the proximity of the device to a particular process control device, but also according to the user and, in particular, according to the span of control of the user. In process control, the span of control refers to the role of the user and the tasks and equipment for which the user is responsible. A user's span of control may affect aspects of the process such as the process parameters the user can view, the process parameters the user can modify, the times at which the user can modify process parameters, the areas and/or equipment of the process plant that the user can view/modify, the alarms/alerts that the user can acknowledge, the maintenance tasks the user can perform, the decisions that the user may be asked or required to make, etc. Thus, in these embodiments, the UI device 112 may retrieve from a user profile for the user (stored on the UI device 112 or on the server 150) information about the user's role and/or span of control, and may display data specific to the user's role and/or span of control. For example, the data displayed may be data useful or required for the user to make control decisions in a specific plant condition, if the user is an operator. Additionally, the information displayed by the UI device 112 may be formatted according to the user's role or span of control. For example, when the UI device 112 is proximate to a mixing tank, the UI device 112 being used by an operator may display the operational status of the tank, the capacity of the tank, the fill level of the tank, temperature of the material in the tank, the pressure in the tank, the status of any input/output valves controlling material flowing into/out of the tank, any alarms or alerts related to the tank, and the status of an executing batch recipe. If the same UI device 112 is used by a maintenance technician proximate to the same mixing tank, the UI device 112 may display the status of the mixing tank, the calibration dates of sensors in the mixing tank, the date the tank was last serviced and/or cleaned, a list of scheduled maintenance tasks for (or affecting) the mixing tank, any alarms that indicate required maintenance, the material inside the tank, any lockouts on the tank if the tank is out of service, the presence of any residual fumes, etc.

In still another embodiment, the UI device 112 may display information according not only to the location of the device and/or the proximity of the device to a particular process control device, but also according to a target function. For example, a user may be assigned a work item (e.g., by the supervisor engine 106). The UI device 112 may be aware (e.g., because of the time the work item is scheduled to be performed, because of an input from the user, etc.) that the user is going to perform a task related to the work item. When the user arrives at a location or proximity to a process control device related to the work item (i.e., the target equipment and target location), the UI device 112 may information related to the specific task. Referring again to the example mixing tank above, a maintenance technician performing a work item related to cleaning or servicing the tank may be presented by the UI device 112 with the operational status of the tank and instructions or commands for disabling the tank, taking the tank out of service, locking out the tank, or any other procedures necessary to commence the cleaning or servicing function associated with the work item. The UI device 112 may also extract information from the supervisor engine 104, from the server 150, from the big data appliance 102, or from one or more controllers, to implement and/or support maintenance functions and safe operation. As described in examples above (e.g., in example 4), the UI device 112 may extract information/data to facilitate safety during a maintenance task. The implementation of these concepts is described in the following paragraphs.

In operation, the mobile control room 2300 may enable the UI device 112 to receive information about the environment and manner of use of the UI device 112. For example, the UI device 112 may identify its location in a process plant by receiving location data from a stationary location device 118, such as a GPS device, or from a node on the process control network 100 shown in FIG. 1A. For example, the UI device 112 may execute a context awareness routine and/or location awareness routine that may track a user's location, schedule, skill set, and/or work item progress. In other embodiments, the server 150 shown in FIG. 1A may execute the context and/or location awareness routine, where the context and/or location awareness routine communicates with the UI device 112. Based on the tracking, the location and/or context awareness routine may enable the UI device 112 to automatically determine and/or display plant maps, equipment photos or videos, GPS coordinates and other information corresponding to a worker's location or to aid the mobile worker in navigation and equipment identification. Additionally or alternatively, as a user may have a particular skill set, the context awareness routine or UI device 112 may automatically customize the appearance of the GUI configuration based on the skill set and/or the location of the UI device 112. For example, in another scenario, the context awareness routine may inform the user in real-time of a newly opened work item or alarm that pertains to a piece of equipment in his or her vicinity and that the mobile worker is qualified to address. In yet another scenario, the context awareness routine may cause one or more applications that specifically pertain to the location and/or skill set of the user to be automatically launched at the UI device 112.

The UI device 112 may identify a particular process entity, such as a field device or piece of equipment, in its vicinity. The process entities may automatically self-identify to the UI device 112, e.g., by using a wireless communication protocol such as an IEEE 802.11 compliant wireless local area network protocol, a mobile communication protocol such as WiMAX, LTE or other ITU-R compatible protocol, a short-wavelength radio communication protocol such as near field communications (NFC) or Bluetooth, a process control wireless protocol such as Wireless HART, or some other suitable wireless communication protocol. In some embodiments the UI device 112 may receive schedules or work items relevant to the identified location, equipment or field device. In an embodiment, identifying a process entity may cause the UI device 112 to automatically launch one or more applications that pertain to the identified process entity, such as a work order, a diagnostic, an analysis, or other application.

In operation, the UI device 112 may identify the process entity 199 via an image sensor at the UI device 112, in some embodiments. In some instances, a user of the UI device 112 may take a picture of the process entity 199 and the UI device 112 may identify the process entity 199 based on the captured image. In some embodiments, the process entity 199 may include, or be proximate to, a context ID device 198 that provides a unique tag or identifier (e.g., a barcode). The UI device 112 may capture the unique tag, allowing the UI device 112 to identify the process entity 199 or the context ID device 198. The UI device 112 may provide information (via a display, for example) relevant to the process entity 199 or relevant to the context ID device 198. In some embodiments, the UI device 112 may determine the location of the UI device 112 by determining the location of the identified process entity 199 or the context ID device 198. Once the location of the UI device 112 has been determined, the UI device 112 may provide context information (via a display, for example) relevant to the determined location. The context information may, for example, relate to other process entities in the area, schedules, or work items. In some embodiments, the context ID device 198 may transmit the contextual information to the UI device 112. In other embodiments, the UI device 112 may receive the context information from the server 150 in response to transmitting its location to the server 150.

In some implementations, the UI device 112 may identify the process entity 199 via a motion sensor or an audio sensor. For example the audio sensor may be used to capture audio associated with the process entity 199 (e.g., via a sound capture routine). The audio may be generated by the process entity 199 during normal operation of the process entity. In other implementations, the audio may be generated by a speaker of an audio device associated with the process entity 199. In any event, the captured audio may be used to identify the process entity 199. The UI device 112 may also detect vibrations via a motion sensor to identify the process entity 199. For example, a plant asset may have an expected level of vibration during operation. A user may place the UI device 112 on or near the plant asset. The UI device 112 may use data detected by the motion sensor to identify a current level of vibration associated with the asset. The UI device 112 may correlate the current level of vibration to a signature vibration associated with the process entity 199, allowing the UI device 112 to identify the process entity 199. In some instances, a motion sensor and/or audio sensor may be used in conjunction with another identified image/sound/vibration/location to identify a unique identifier. For example, based on a detected vibration level associated with a plant asset and the location of the UI device 112, the UI device 112 may identify a particular tag associated with the process entity 199, allowing the UI device 112 to identify the process entity 199.

In further operation, the UI device 112 may identify its own location by receiving location data from one or more GPS satellites 2303. After identifying its location, the UI device 112 may communicate with a database or server to identify process entities with locations proximate to the location of the UI device 112. The UI device 112 may transmit its location to the server 150. The server 150 may transmit context information back to the UI device 112. The context information may relate to one or more process areas, devices, or equipment proximate to the UI device 112. The context information may also relate to schedules or work items relevant to the location of the UI device 112. FIGS. 24-27, described below, elaborate on the operation of the context awareness routine in various embodiments of the present disclosure.

Figure 24:
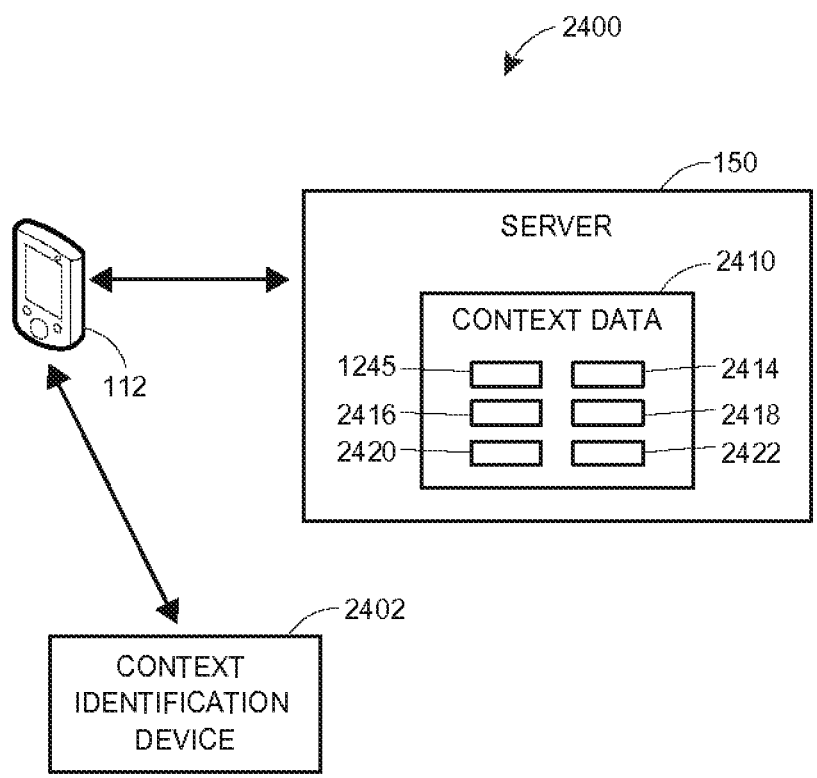
FIG. 24 is a block diagram of an exemplary context-aware UI device.

FIG. 24 is a block diagram of an exemplary context-aware UI device 112 in a mobile control room 2,400. The context aware mobile control room 2400 may enable the UI device 112 to provide output in response to its environment and manner of use. The context aware mobile control room 2400 may include a context identification ("context ID") device 2402, the UI device 112, and the server 150. The UI device 112 may interact with the context ID device 2402 to identify context data or context items. In certain embodiments the context ID device 2402 may communicate with the UI device 112 over wireless or wired channels. In certain embodiments, the context ID device 2402 may transmit process parameter data and/or display data to the UI device 112. The context ID device 2402 may utilize image identification technology (such as a bar code or QR code), audio identification technology (emitting a unique sound signature), or wireless radio frequency technology such as RFID, NFC, Bluetooth, or Wi-Fi (IEEE 802.11 standards) technology. The UI device 112 may communicate with the server 150 via a network such as the process control network 100. In other embodiments, the context ID device 2402 may be in the UI device 112, and a device (e.g., a plc device) may receive a signal from the context ID device 2402 and report the location of the UI device 112 to the server 150.

In any event, the server 150 may store context data 2410. The context data may include user profile data 1245 (relating to users/operators at the plant), UI device profile data 2414 (relating to the registered UI devices at the plant), field device profile data 2416 (relating to the installed devices at the plant), equipment profile data 2418 (relating installed equipment at the plant), schedule data 2420 (relating to user and equipment/device schedules), and work item data 2422 (relating to tasks or jobs at the plant). In some embodiments the field device profile data 2416 may be included in the equipment profile data 2418. The user profile data 1245 may include skill set data, indicating a skill level or level of responsibility associated with a particular user. Work item data 2422 may include data such as a task ID (identifying a particular task), a skill threshold (identifying a minimum skill level or role/responsibility necessary to work on the task), target equipment (the equipment associated with the task), and work item progress (identifying how near to completion the task is). Each of the context items 1245 and 2414-2422 may include information such as location or area (associated with a user, device, equipment, schedule, or work item, for example), status, related process entities, unique identifiers/tags, and/or permission information.

In operation of the context ID device 2402, the context ID device 2402 may include a unique identifier or tag that may be read, scanned, or otherwise received at the UI device 112 when the UI device 112 enters the range of the context ID device 2402. The range of the context ID device 2402 depends on the particular embodiment of the context ID device 2402, but may be as small as a few centimeters or less, as far as a kilometer or more, or some distance in between. In some embodiments, the context ID device 2402 may transmit the unique identifier to the UI device 112. In other instances, the context ID device 2402 may display or otherwise provide the unique identifier so that it may be received and/or retrieved by the UI device 112.

In any event, the UI device 112 may receive the unique identifier and identify a context item such as an area (i.e., a location, geographic area, or region), equipment, device, work item, or available schedule in the environment of the UI device 112 by correlating the unique identifier to the context item. For example, the UI device 112 may access a database, table, or data structure that pairs unique identifiers to particular context items. Such a database or table may exist at the UI device 112, at the context ID 2402, or at the server 150. When the database or table exists at the server 150, the UI device 112 may transmit the unique identifier to the server 150. The server 150 may access a database, table, or some other data structure to identify the context item associated with the unique identifier. The server 150 may transmit data representing the context item to the UI device 112.

Once the UI device 112 has identified a context item, the UI device 112 may provide output relevant to the identified context item. For example, the context item may indicate particular areas, devices, equipment, or alarms associated with an area. The UI device 112 may generate visual representations, sound, or other output pertaining to the particular devices, equipment, or alarms so that the user may be informed about process conditions in the process area. Likewise, there may be a number of devices or alarms associated with an identified piece of equipment. The UI device 112 may provide information about the devices or alarms associated with a device (from the field device profile data 2416). Similarly, the context item may cause the UI device 112 to provide information related to equipment (from the equipment profile data 2418), schedules (from the schedule data 2420), or work items (from the work item data 2422).

In certain embodiments, one or more process control devices in the process plant may be context ID devices 2402. In other embodiments, the one or more process control devices may include context ID devices 2402 or be associated with nearby context ID devices 2402. For example, one or more of the field devices 15-22 and/or 40-58 shown in FIG. 1A may be, may include, or may be positioned proximate to a context ID device 2402 (e.g., the context ID device 2402 may be attached to or proximate to each of the field devices, or the field devices may have internal circuitry enabling the field devices to function as context ID devices). Similarly, the controller 11, gateway 35, UI device 112, I/O cards 26 and 28, and router 58 shown in FIG. 1A may be, may include, or may be proximate to context ID devices 2402. In such embodiments, the UI device 112 may receive the unique identifier associated with each of the context ID devices 2402, allowing the UI device 112 to receive a context item (such as location or equipment ID) associated with each of the process control devices.

In alternative embodiments of the context aware mobile control room 2400, the UI device 112 may include or provide a unique identifier. For example, the UI device 112 may have a unique scannable image on the device or a chip that transmits unique identification data. In another example, the user of the UI device 112 may carry a badge, card, or some other accessory including a similar image or chip. In such embodiments, the context ID device 2402 may read, scan, or otherwise receive the unique identifier. The context ID device 2402 may operate to associate the unique identifier with a particular user or UI device 112. The context ID device 2402 may associate the unique identifier with a particular user or UI device by accessing a data structure stored at the context ID device 2402. Alternatively, the context ID device 2402 may transmit the unique identifier to the server 150, where the server 150 associates a particular user or UI device with the unique identifier.

In any event, once the context ID device 2402 has identified the UI device 112 or the user, the context ID device 2402 may transmit relevant context items to the UI device 112. Alternatively, the context ID device 2402 may communicate with one or more nodes on a network such as the process control network 100 to notify the one or more nodes that the user or the UI device 112 entered the range of the context ID device 2402. The one or more nodes may transmit one or more context items, UI data (e.g., display data, process parameter data), or any other data to the UI device 112. The UI device 112 may operate or provide output based on the received data. For example, in certain embodiments, the UI device 112 may launch a target application in response to receiving the unique identifier, the context item, the UI data, or other data from the context ID device 2402 or from the server 150. The target application may be an application, for example, dedicated to providing process graphics and information to the user. The target application may be a mobile application, for example, operable on phone or tablet devices. In other embodiments, the target application may be the browser routine 888. In certain instances, the browser routine 888 may be directed to a particular resource or group of resources pertaining to the received unique identifier, context item, UI data, or other data.

In some embodiments, the context ID devices 2402 may be part of a permission system. For example, permissions associated with a process entity may depend on the proximity of a UI device 112 to the process entity. In some embodiments a UI device 112 may receive permission or authorization to modify a parameter associated with a process entity when the user or the UI device 112 are proximate to the process entity. The UI device 112 may also deny permission to engage in a work item or modify a parameter when the user's skill level is below the indicated skill threshold associated with the work item or parameter.

Figure 25:
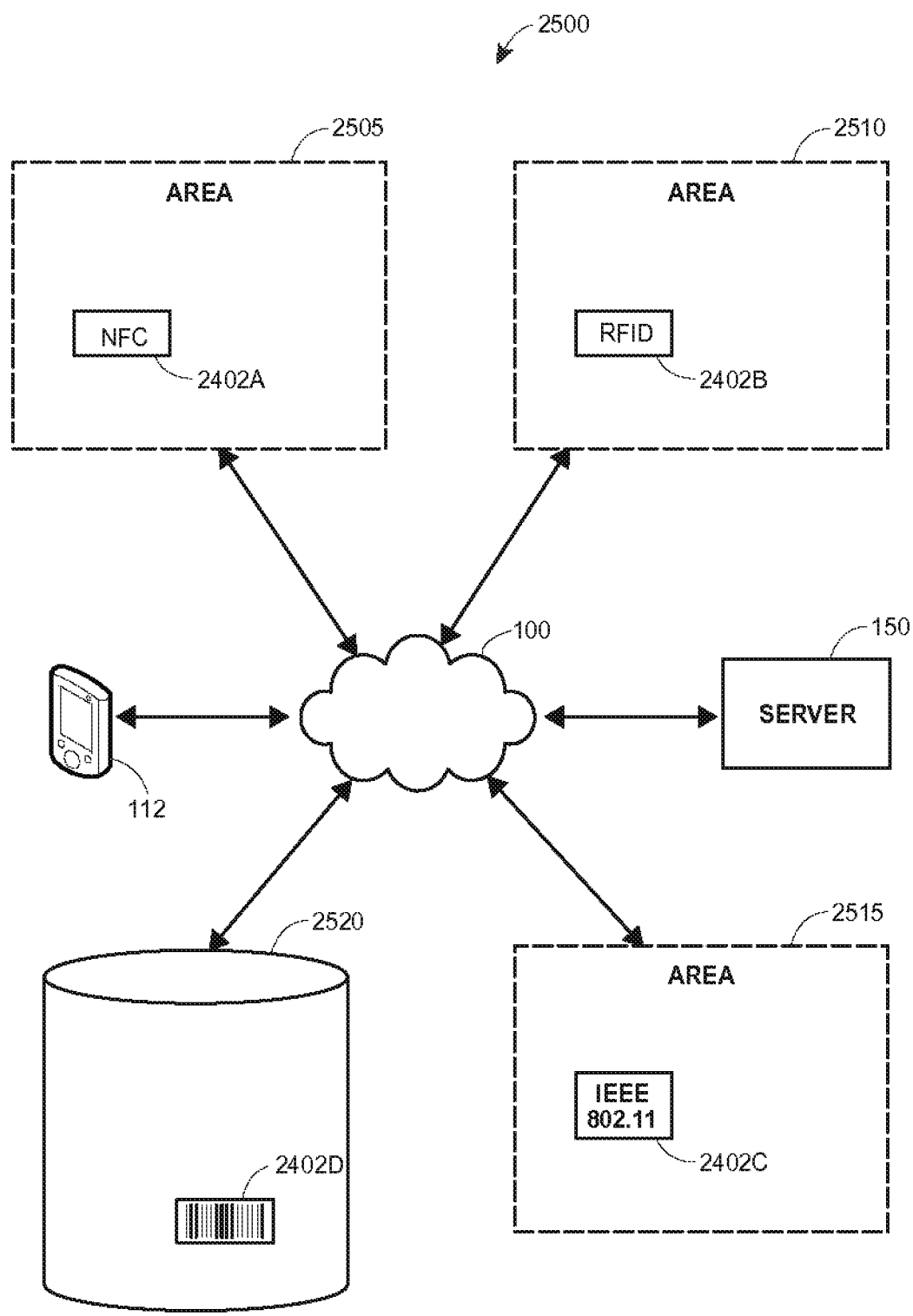
FIG. 25 is a block diagram of another embodiment of a mobile control room in a process plant.

FIG. 25 is a block diagram of another embodiment of a mobile control room 2500 in a process plant 10. The context aware mobile control room 2500 may enable the UI device 112 to provide output in response to its environment and manner of use. The mobile control room 2500 may include the UI device 112 communicatively coupled to the process control network 100, including areas 2505-2515 and a tank 2520. The UI device 112 is connected to the process control network 100. The area 2505 includes a context ID device 2402a; the area 2510 includes a context ID device 2402b; the process area 2515 includes a context ID device 2402c; and the tank 2520 includes a context ID device 2402d.

In an embodiment, the context ID device 2402a is, or includes, an NFC device. The UI device 112 and the context ID device 2402a generally operate at 13.56 MHZ and may operate according to NFC standards such as ISO/IEC 14443, ISO/IEC 1809, NFCIP-1, NFCIP-2, and JIS:X6319-f. NFC technology enables wireless transactions and data exchanges between the UI device 112 and the context ID device 2402a. NFC technology may also be used to automatically bootstrap other communication connections. In such an embodiment, the context ID device 2402a may transmit instructions to the UI device 112. The UI device 112 may receive and execute the instructions, causing the UI device 112 to connect to another network. In some embodiments, the other network may be a broader network, such as the process control network 100, that includes other nodes. In certain embodiments, the other network may be connection between the UI device 112 and the context ID device 2402a. For example, the other network may be a wireless ad-hoc network or a personal area network (e.g., Bluetooth, IEEE 802.15.1 standards). In any event, in addition to the network connection instructions, the context ID device 2402a may transmit authentication information to the UI device 112, allowing the UI device 112 to establish connection to a network without requiring the user of the UI device 112 to manually set up the network and enter authentication information.

In further operation of the context ID device 2402a, the NFC tag or device at the context ID device 2402a may also store other instructions that may be executed at the UI device 112. For example, the instructions may cause one or more applications to launch or execute in a particular manner. In the depicted embodiment, the instructions may cause the UI device 112 to launch a UI (such as the UI routine 882 of FIG. 8) or browser (such as the browser routine 888 of FIG. 8), or to put the UI or browser into a certain state. The instructions may cause the UI device 112 to provide a GUI configuration providing information pertaining to the devices and equipment in the area 2505. For example, the GUI configuration may include a window with a graphical overview of the process area 2505.

In further operation of the context ID device 2402a, the UI device 112 may receive a unique identifier from the context ID device 2402a via an NFC communication or via a network that the UI device 112 connected to after receiving authentication information via an NFC communication. The unique identifier generally represents the area 2505, but may represent other context items in certain embodiments. The UI device 112 may use the unique identifier to identify the context item (such as the area 2505) and operate or provide output in accordance with the identified context item (e.g., providing a graphical overview of the area 2505). Alternatively, the context ID device 2402a may receive a unique identifier from the UI device 112 and identify the UI device 112 (or its user), allowing the context ID device 2402a or another node on the process control network 100 to transmit data such as context data or UI data to the UI device 112. The UI device 112 may operate or provide output based on the received data.

In an embodiment of the context ID device 2402b, the context ID device 2402b is, or includes, an RFID tag. In such an embodiment, the UI device 112 includes an RFID scanner and uses the RFID scanner to obtain a unique identifier. The unique identifier generally represents the area 2510, but may represent other context items (e.g., specific devices, equipment, locations, etc.) in certain embodiments. The UI device 112 may use the unique identifier to identify the context item in a manner consistent with the methods discussed with regard to FIG. 24. In an alternative embodiment, the context ID device 2402b may be an RFID scanner and the UI device 112 may include an RFID tag. In such an embodiment, the context ID device 2402b identifies the UI device 112 when the UI device 112 enters the range of the context ID device 2402b (e.g., when the user enters the area 2510). After identifying the UI device 112, the context ID device 2402b may communicate with the UI device 112 (e.g., using the process control network 100; using another network such as a personal area network; or using a display) and transmit the unique identifier to the UI device 112 or to the server 150 which may use the unique identifier to provide contextual information to the UI device 112. The UI device 112 may identify the area 2510 in a manner consistent with the methods discussed with regard to FIG. 24 and operate or provide output based on the identified area 2510. In another embodiment, the context ID device 2402b may transmit the context item (rather than the unique identifier) to the UI device 112 (using, for example, a short range wireless network communication such as Bluetooth). In yet another embodiment, the user may have an RFID tag instead of or in addition to the UI device 112 having an RFID tag. In any of these embodiments, both the RFID scanner and the RFID tag may be either active or passive. The UI device 112 may operate or provide output based on the received data.

In operation of an embodiment of the context ID device 2402c, the context ID device 2402c may be a Wi-Fi access point with a range covering the process area 2515. When the UI device 112 enters the process area 2515, the context ID device 2402c may establish communication with the UI device 112. The context ID device 2402c may transmit a unique identifier, such as a MAC address or device tag, to the UI device 112. The unique identifier generally represents the area 2515, but may represent other context items in certain embodiments. The UI device 112 may use the unique identifier to identify the context item (such as data representing the area 2515) in a manner consistent with the methods discussed with regard to FIG. 24, and to operate or provide output in accordance with the context item (e.g., providing a visual representation of area 2515). For example, a database pairing MAC addresses or device tags to particular areas may be stored on the UI device 112, accessible by the UI device 112, or stored on a node in communication with the UI device 112. Alternatively, the UI device 112 may transmit a unique identifier, such as a MAC address of the UI device 112, to the context ID device 2402c. After receiving the unique identifier, the context ID device 2402c may operate to determine that the UI device 112 is associated with the unique identifier. The UI device 112 may operate or provide output based on the received data.

In an embodiment of the context ID device 2402d, the context ID device 2402d may include a barcode. The barcode may be a matrix barcode (such as a QR code) or a linear barcode (such as a UPC barcode). The UI device 112 may include, or be in communication with, an image sensor, which may be a camera or dedicated barcode scanner. In operation, the UI device 112 may use the image sensor to capture the barcode at the context ID device 2402d. The UI device 112 may decode the data encoded into the barcode ("barcode data"). The barcode data generally includes a unique identifier that represents the tank 2520 (or any other process control device or equipment to which it is affixed), though the unique identifier may represent other context items in certain embodiments. The UI device 112 may use the unique identifier to identify the context item (such as data representing the tank 2520) in a manner consistent with the methods discussed with regard to FIG. 24, and to operate or provide output in accordance with the context item (e.g., providing a visual representation of the tank 2520). In alternative embodiments, the barcode may contain data or instructions that cause the UI device 112 to take certain actions, such as launching a browser or UI so that the browser or UI provide particular information. The particular information may relate to any of a number of process entities, such as process parameter data, graphics of certain items (such as the tank 2520), or alarm data for a particular device. In further embodiments, the UI device 112 or the user of the UI device 112 may alternatively or additionally contain a barcode that is captured by the context ID device 2402d, allowing the context ID device 2402d to identify the UI device 112 or the user. A barcode at the UI device 112 may also provide instructions that are executed at the context ID device 2402d. For example, the barcode may cause the context ID device 2402d to provide relevant information to the user or the UI device 112.

In some embodiments, the UI device 112 may identify the unique identifier using other methods. For example, the UI device 112 may use an audio sensor to identify a unique identifier, where the unique identifier is a sound signature (as noted regarding FIG. 24) associated with a plant area/asset. The sound signature may be associated with the noise a particular plant area/asset produces during operation. Alternatively, the sound signature may be an audio signal generated by an audio output device associated with the asset. The UI device 112 may also use a motion sensor to identify the unique identifier. The unique identifier may be a certain vibration level associated with a plant asset. For example, a user may place the UI device 112 on a plant asset, allowing the UI device 112 to detect the vibration level. In some instances, a motion sensor may be used in conjunction with an identified image/sound/location to identify a unique identifier. For example, based on a detected vibration level associated with a plant asset and the location of the UI device 112, the UI device 112 may identify a particular tag associated with the plant asset.

In some embodiments, the UI device 112 may identify its location by receiving location data. The location data may be received via a network such as the process control network 100. Alternatively, the location data may be received via a GPS receiver at the network interface of the UI device 112. The UI device 112 may compare its location to the location of other process entities to identify process entities proximate to the UI device 112. The UI device 112 may transmit its location to a node on the process network 100, such as the server 150. In some embodiments, the node may respond by transmitting context information to the UI device 112. In other embodiments, the UI device 112 may transmit the location data to a context ID device 2402. The context ID device 2402 may transmit context data to the UI device 112 in accordance with the received location data.

The UI device 112 may cooperate with the context ID device(s) 2402 to provide real-time location data of the UI device 112, in embodiments. As a mobile operator carries a mobile UI device 112 through an environment, the UI device 112 may use the location information received from (or as a result of) the context ID devices 2402 to determine the current location of the UI device 112 in the process plant, and may display a current map of the mobile operator's position in the environment. The map may display the mobile operator's position from an overhead view, or in a three-dimensional perspective view. Of course, a desired or predicted route may also be displayed on the mobile UI device 112. Alternatively, the UI device 112 may use one or more accelerometers to determine the orientation and position of the device within the environment and cooperate with an image sensor on the UI device 112 to display an augmented reality view of the environment. For example, the mobile operator may point the image sensor at an area of the process plant, and the UI device 112 may display a diagram of the equipment over the image, may display a route to a desired piece of equipment (e.g., equipment associated with a current work item), may display parameter or other process data associated with the area of the process plant, and the like.

Figure 26:
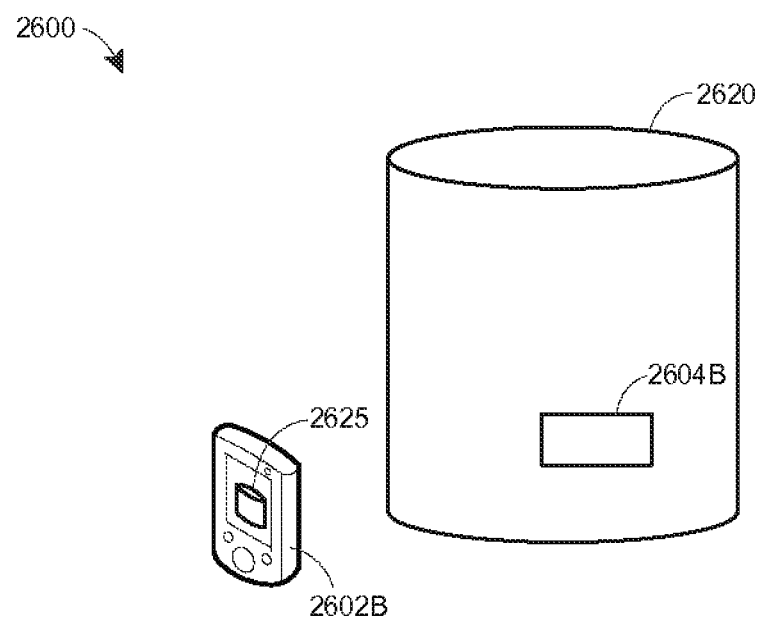
FIG. 26 is a diagram of yet another exemplary mobile control room.
Figure 26:
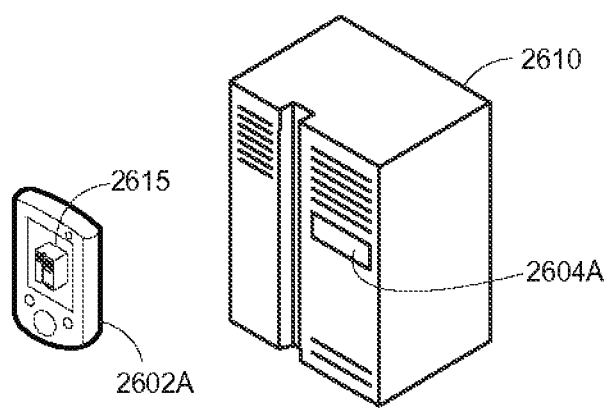

FIG. 26 is a diagram of an exemplary mobile control room 2600. The mobile control room 2600 may include a first UI device 2602a, a second UI device 2602b, equipment 2610, and equipment 2620. The first UI device 2602a may include a display providing a graphic 2615 representing the equipment 2610, or other data related to the equipment 2610 (e.g., current operating parameters, set points, alarms, errors, scheduled maintenance, calibration data, etc.). The second UI device 2602b may include a display providing a graphic 2625 representing the equipment 2620, or other data related to the equipment 2620 (e.g., current operating parameters, set points, alarms, errors, scheduled maintenance, calibration data, etc.). The equipment 2610 may include a first context ID device 2604a and the equipment 2620 may include a second context ID device 2604b.

In operation, an operator carrying the UI device 2602a may enter an area within the range of the context ID device 2604a. The UI device 2602a may communicate with or scan the context ID device 2604a, enabling the UI device 2602a to receive data from the context ID device 2604a. The UI device 2602a may operate or provide output in response to the received data. In the depicted embodiment, the UI device 2602a may provide the graphic 2615 representing the equipment 2610. In some embodiments the UI device 2602a may provide alternative or additional output, such as other graphics, process parameter values, or alarms. The operator carrying the UI device 2602b may enter the range of the context ID device 2604b, causing the UI device 2602b to provide the graphic 2625 representing the equipment 2620.

FIG. 27 is a flow chart depicting an exemplary method 2700 for generating a graphical user interface. The method 2700 may be implemented, in whole or in part, at one or more devices or systems such as any of the UI devices 112. The method 2700 may be saved as a set of instructions, routines, programs, or modules on the memory 815 and may be executed by the processor 810.

The method 2700 begins with the UI device 112 identifying an external device or identifier/tag (block 2705). The identifier may be an image, sound, or barcode. The identifier may alternatively be a unique tag associated with a transmission by an NFC system or RFID system. In some embodiments, the identifier may be associated with a process entity, such as a process area, device, piece of equipment, or another UI device 112.

The UI device 112 may receive context information based on the identified external device or identifier (block 2710). The UI device 112 may receive the context information from the identified external device or identifier, in some embodiments. In other embodiments, the UI device 112 may receive the context information from the server 150, in response to transmitting data representing the identifier to the server 150. The context information may represent context items such as location, equipment, schedules, work items, etc.

The UI device 112 may provide information at the UI device 112 display (block 2715). The information may be provided in accordance with received context information. For example, the UI device 112 may generate information relevant to a received location, identified equipment or devices, received schedules, or received work items.

Figure 28:
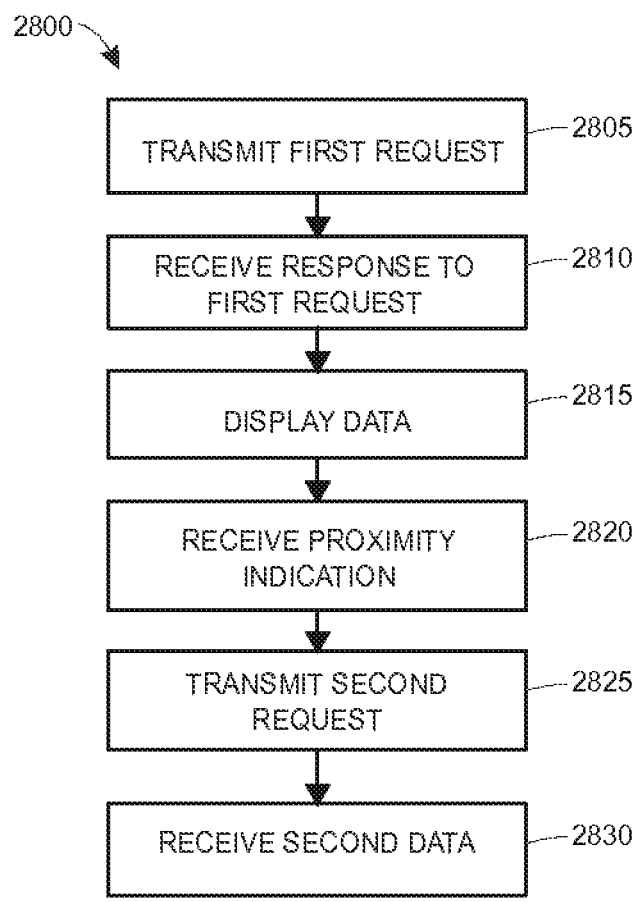
FIG. 28 is a flow chart depicting an exemplary method executed by a UI device.

Turning now to FIG. 28, a flow chart depicts an exemplary method 2800, executing on a UI device 112, for controlling the process plant 10 with the UI device 112. The method 2800 may be implemented, in whole or in part, at one or more networks or systems such as the process control network 100. In particular, the method 2800 may be implemented, in whole or in part, at one or more devices or systems such as the server 150 or at one or more devices or systems such as any of the UI devices 112. The method 2800 may be saved as a set of instructions, routines, programs, or modules on the memory 815 or the memory 1203, and may be executed by the processor 810 or the processor 1201.

The method begins with a UI device 112 that may transmit, to the server 150 via a network, a first request for first data from a data storage area (block 2805). The data storage area may be a unitary, logical data storage area including one or more devices configured to store, using a common format, process data corresponding to the process plant. The process data may include multiple types of process data such as configuration data, continuous data, batch data, measurement data, and event data.

The UI device 112 may receive, from the server 150 and in response to the first request, the first data from the storage area (block 2810). The UI device 112 may display the first data received from the server 150 (block 2815).

The UI device 112 may receive an indication that the UI device 112 is in proximity to an external device (block 2820). The UI device 112 may include a communication circuit that operates to detect the proximity of external devices. The communication circuit may include a near field communication (NFC) circuit, a radio frequency identification (RFID circuit, a Bluetooth circuit, a circuit operating according to the IEEE 802.11 protocol, or a circuit operating according to the Wireless HART protocol. In some instances, the UI device 112 may receive an indication that the UI device 112 is in proximity to an additional UI device 112.

The UI device 112 may transmit, to the server 150, a second request for second data according to the received indications (block 2825). In some embodiments, transmitting the second request includes transmitting, to the server 150, a request for state information of the additional UI device 112.

The UI device 112 may receive, from the server 150 and in response to the second request, second data (block 2830). In some embodiments, the second data may represent requested state information of the additional UI device 112. In such embodiments, the UI device 112 may also display process control data from the storage area according to the received state information. Displaying the process control data may include duplicating, on the display of the UI device 112, the display of the additional UI device 112. Displaying the process control data may include arranging, on the display of the UI device 112, the data displayed on the additional UI device 112.

In other embodiments, receiving the proximity indication (block 1720) may comprise receiving an indication that the UI device 112 is in proximity to a process control device. Transmitting the second request (block 2825) may include transmitting, to the server 150, an indication that the UI device 112 is in proximity to the process control device. In such embodiments, receiving second data may include receiving process control data related to the process control device (block 2830). Receiving process control data related to the process control device may comprise receiving and displaying data of one or more of: an alarm associated with the process control device; a maintenance task associated with the process control device; a diagrammatic depiction of the area of the process plant associated with the process control device; or a status of an area of the process plant associated with the process control device.

In some embodiments, receiving the proximity indication (block 2820) may comprise receiving an indication that the mobile device is in a particular area of the process plant. In such embodiments, transmitting a second request (block 2825) may include transmitting, to the server 150, an indication that the UI device 112 is in the particular area of the plant. Furthermore, receiving the second data (block 2830) may include receiving second process control data related to the particular area of the process plant. Receiving process control data related to the particular area may comprise receiving and displaying data of one or more of: an alarm associated with the particular area of the process plant; a maintenance task associated with the particular area of the process plant; a diagrammatic depiction of the particular area of the process plant; or a status of one or more process control devices associated with the particular area.

In certain embodiments, the UI device 112 may not be in communication with the server 150, but may be in communication with equipment in a particular area. For example, the UI device 112 may be proximate to a particular piece of process equipment in an area of the process plant, and may be able to communicate, directly or via an intermediary device (e.g., via a router or other access point that is part of a wireless network), with one or more devices (that are not the server 150) in the area of the process plant. This may be the case, for example, if the server 150 is unavailable, or if the area of the process plant is isolated physically or logically from the server 150. In any event, the UI device 112 may transmit data or requests directly to and/or receive data directly from devices in the area of the process plant. For example, the UI device 112 can transmit a request for data directly to another device (instead of to the server 150) via a network, can receive data from the device in response to the request, can display the received data, can receive an indication that the UI device 112 is proximate to an external device, etc.

Figure 29:
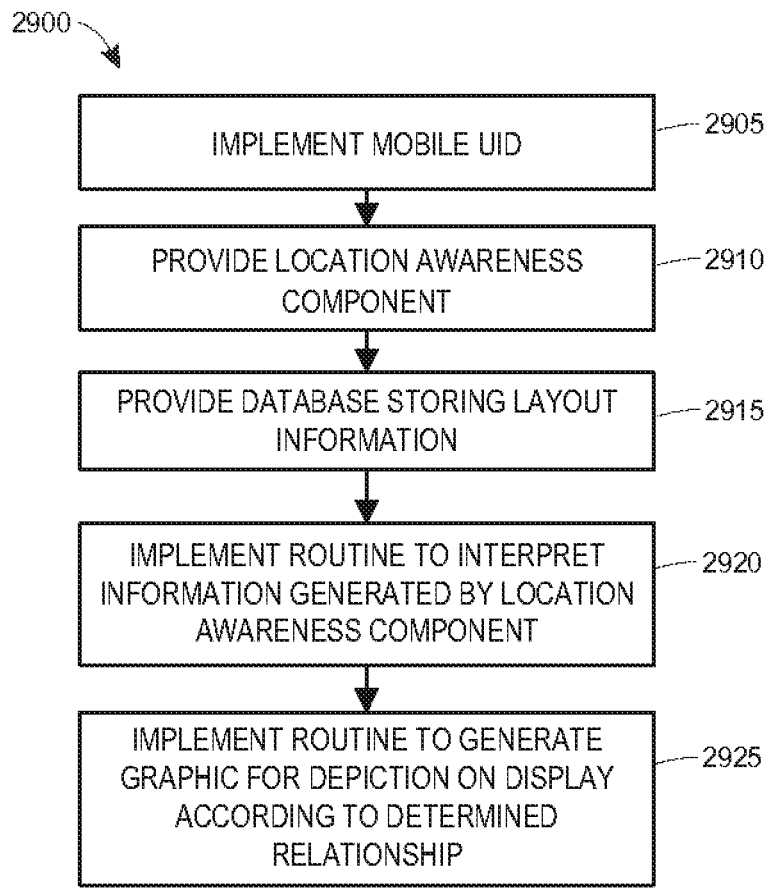
FIG. 29 is a flow chart depicting a method for facilitating mobile control of a process plant.

A flow chart depicting a method 2900 for facilitating mobile control of a process plant is provided in FIG. 29. The method 2900 includes implementing a mobile user interface device (block 2905) and providing in the mobile user interface device a location awareness component operable to generate information pertaining to the location of the mobile device (block 2910). The method 2900 also includes providing a database storing layout information of the process plant (block 2915) and implementing on the mobile user interface device a first routine (block 2920). The first routine may be operable to interpret information generated by the location awareness component according to information stored in the database to determine a relationship between the location of the mobile user interface device and the layout of the process plant. The mobile user interface device may also implement a second routine operable to generate a graphic for depiction on the display according to the determined relationship between the location of the mobile device and the layout of the process plant (block 2925). In embodiments, providing a database storing layout information may include providing the database storing layout information in from an overhead perspective or may include providing the database storing layout information from an eye-level perspective. The layout information may include, for each process device, a device tag, a device visualization (e.g., one or more visualizations, each corresponding to a mobile user interface device type or a mobile user interface device display type), a device location, and device connection information. The location aware component may be, for example, a GPS receiver, an RFID reader, an RFID tag and a communication channel between the mobile user interface device and a server providing data to the mobile user interface device, a plurality of sensors (e.g., accelerometers and gyroscopes) operable to determine, relative to an anchor point, the movement and position of the mobile user interface device, etc. Implementing the second routine includes, in some embodiments, implementing a routine operable to generate a real-time graphic of the location of the mobile user interface device within the process plant as the mobile user interface device moves within the process plant. Generating a real-time graphic of the location of the mobile user interface device may include depicting on a display the location of the mobile user interface device from an overhead perspective, or depicting on a display the location of the mobile user interface device in three dimensions from an eye-level perspective.

As should by now be evident, the UI devices 112 and, in some embodiments, the control network 100 may be aware of various contextual information including, importantly, the location of one or more of the UI devices 112 in the process plant 10. Various methods for the control network 100 (including the server 150) or the UI devices 112 to determine the location of a device have been described. For example, the UI devices 112 may cooperate with context ID devices 2402 and/or the server 150 to determine the location of a UI device 112. The UI devices 112 may also include the GPS receivers 832 that allow the UI device 112 to determine its location by receiving signals from GPS satellites, as generally understood. In some embodiments, however, one or more of the UI devices 112 may also include the inertial positioning system (IPS) 834. The IPS 834 may assume the form of discrete components or an integrated circuit. In at least one embodiment, the IPS 834 is an integrated circuit including a high-precision clock circuit, three accelerometers (one in each of the x-, y-, and z-axes), and three gyroscopes (one in each of the x-, y-, and z-axes). In some embodiments, the IPS 834 also includes a compass or magnetometer.

In any event, the IPS 834 may operate to detect the movement and orientation of the UI device 112 in which it is present, and to provide information regarding the distance and direction that the device is moving or has moved. By combining the information about the detected movement and orientation of the UI device 112 with another source of information indicating an initial position (an "anchor point") of the UI device 112, it is possible for the UI device 112 to determine its position independently of any continuing source of information. For example, a UI device 112 carried by an operator may have a GPS receiver, and may track the position of the UI device 112 as the operator moves through an outdoor environment toward an indoor environment. As the operator crosses the boundary between the outdoor and indoor environments, the UI device 112 and, in particular, the GPS receiver 832, will likely lose the GPS signal. The UI device 112 may use the last known location of the UI device 112, determined using the GPS receiver 832, as an anchor point. From the anchor point, the UI device 112 may determine the distance and direction that the UI device 112 has moved in the indoor environment. Using this information, the UI device 112, routines operating on the UI device 112, and potentially other devices (e.g., the server 150, the supervisor engine 106, etc.), may continue to track the position of the UI device 112. The UI device 112 may continue to provide to the operator a depiction of the operator's position in the indoor environment, may provide to the operator navigational directions to a particular plant asset (e.g., to a particular piece of equipment), may take or recommend action based on the operator's location within the plant, and so on.

It is noted that the GPS receiver 832 is not the only source of information that can provide an anchor point for use in combination with the IPS 834. Any of the context ID devices 2402 may also cooperate with the UI device 112 to determine an anchor point. For example, as the operator crosses the boundary between the outdoor and indoor environments, a context ID device 2402 at the threshold (e.g., an NFC device on a door frame) may communicate with the UI device 112 to establish the position of the UI device 112 and provide an anchor point. As another example, the operator may use the UI device 112 to scan or otherwise interact with a context ID device 2402 (e.g., an RFID tag, an NFC chip, a barcode, etc.) at any known, fixed position in the process plant (e.g., on a process device, near a particular plant area, etc.) to provide an anchor point.

The UI device 112 may use the anchor point and information provided by the IPS 834 to depict on the display of the UI device 112 the location of the UI device 112 in the process plant or other environment. In embodiments, this includes depicting the location on a floor plan of the process plant, depicting the location on a 3D map of the process plant, depicting the location on a schematic diagram of the process plant, etc. Alternatively or additionally, the UI device 112 may provide navigational information to direct the operator to a desired location in the process plant (e.g., to a location associated with an assigned work item, to a selected location, to a device associated with an error or alarm, etc.). In some embodiments, the UI device 112 may provide navigational or position information to guide an operator to other personnel in the plant environment. This may be useful, for example, when trying to locate injured personnel or personnel requesting assistance with a task.

Each UI device 112 having location data, whether provided by GPS data, IPS data, or cooperation with context ID devices 2402, may provide the location of the UI device 112 to the control system and, in particular, to the server 150 and/or the supervisor engine 106. In some embodiments, the presence of the UI device 112 in a particular area may cause the server 150, the supervisor engine 106, or the UI device 112 to disable one or more features of the UI device 112. For example, the microphone 842 and/or the camera 844 may be disabled when the UI device 112 is in a an area where the privacy of the operator might be important (e.g., in a washroom) or where security considerations require it.

Likewise, various control aspects of the process plant may, in some embodiments, be altered by the presence of personnel in an area. For example, certain safety systems may have a first threshold when no personnel are present in an area, and a second, more conservative threshold when personnel are present in the area. In this manner, the safety of personnel may be improved.

Figure 30:
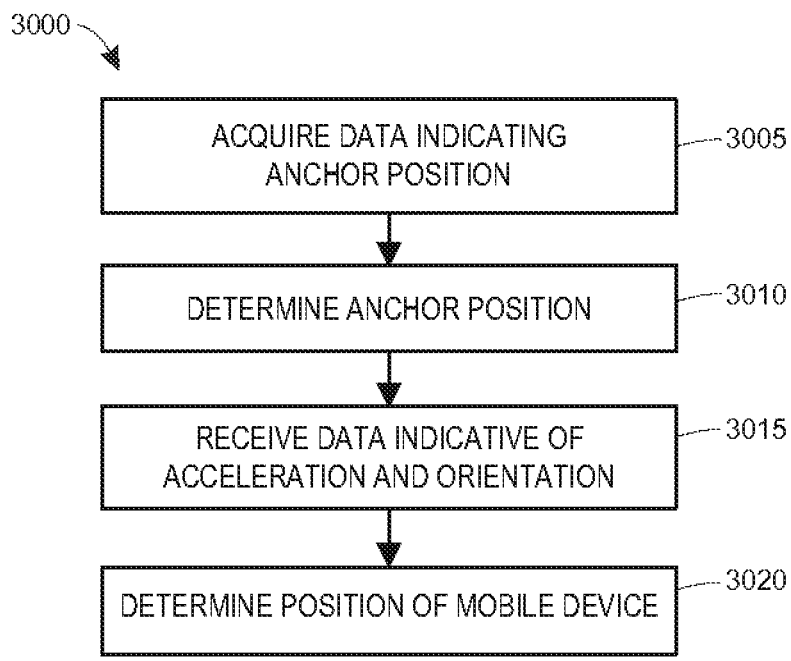
FIG. 30 is a flow chart depicting a method for determining a position of a mobile device within a process plant.

FIG. 30 is a flow chart depicting a method 3000 for determining a position of a mobile device within a process control environment. The method 3000 includes acquiring an anchor position within a process plant (block 3005) and determining the anchor position according to the acquired data (block 3010). The method also includes receiving from circuitry of the mobile device data indicative of acceleration and orientation of the mobile device (block 3015) and determining a position of the mobile device according to the received data and the anchor position (block 3020). In embodiments, acquiring data indicating an anchor position includes determining a position of the mobile device using a global satellite positioning system such as GPS, GLONASS, or any other satellite position system. Acquiring data indicating an anchor position includes acquiring an image (e.g., an image of a bar code, an image of a portion of the process plant, etc.) in some embodiments. Where an image of a portion of the process plant is acquired, for example, the captured image may be compared with a database of geo-located images (i.e., images associated with a corresponding physical location). The data of indicating the anchor position could also include data of one or more wireless signals, such as signals conforming to an IEEE 802.11 specification, acquiring data form an RFID device, establishing a Bluetooth connection, or establishing a near field communication session. Acquiring data indicative of the anchor position could also include ascertaining a process control device near the mobile device and receiving or retrieving from memory (or from a remote database) information associated with the position of the process control device.

Receiving data indicative of acceleration and orientation of the mobile device includes receiving data from one or more accelerometers and from one or more gyroscopes, receiving data from a magnetometer. Receiving data from an inertial measurement unit, and/or receiving data form an device that includes three accelerometers and three gyroscopes, in various embodiments. In some embodiments, the method also includes launching an application of the mobile device based, at least in part, on the determined position of the mobile device, wherein the application is operable to modify the operation of the process plant.

Figure 31:
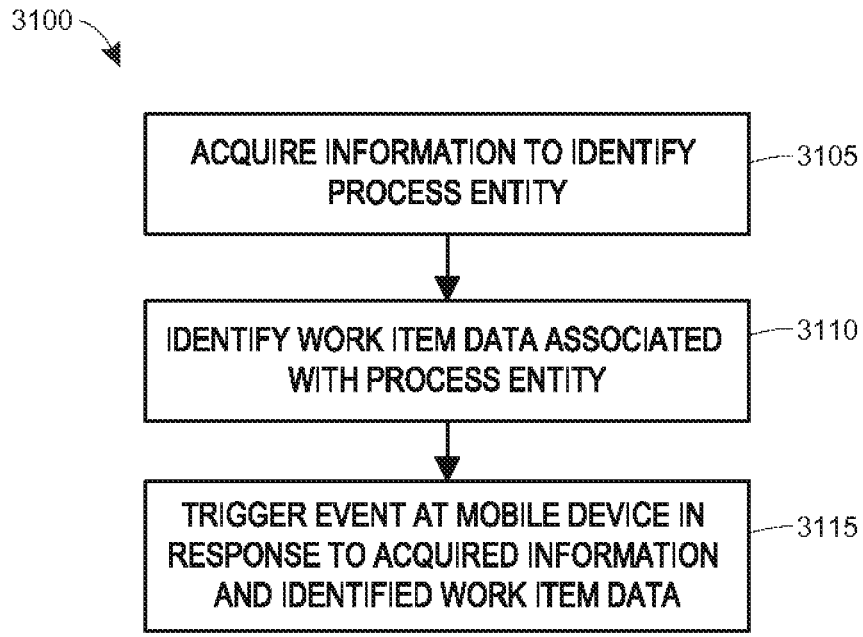
FIG. 31 is a flow chart depicting a method for contextual operation of a mobile device in a process control environment.

Turning to FIG. 31, a flow chart depicts a method 3100 for contextual operation of a mobile device in a process control environment. The method includes acquiring at the mobile device information to identify a process entity in the process control environment (block 3105). The process entity can be any process entity in the process plant including, but not limited to, an area of the process plant, a process control device, a controller, and the like. The method also includes identifying at the mobile device work item data associated with the process entity (block 3110). The work item data includes information regarding a target function associated with the process entity. An event at the mobile device is automatically triggered to facilitate implementing the target function associated with the process entity in response to the acquired information and the identified work item data (block 3115). The target function may be a scheduled task associated with the process entity. In embodiments, triggering an event at the mobile device comprises at least one of causing the mobile device to provide instructions relevant to executing the scheduled task, causing the mobile device to display safety information (e.g., the materials in a process control device, whether the process control device has been deactivated and/or locked out, whether residual material is detectable, etc.), causing the mobile device to launch an application for executing the scheduled task, or causing the mobile device to provide an interface for carrying out the scheduled task. The target function may be, in some embodiments, a permission verification function associated with the process entity. The event automatically triggered may be identifying a user identification associated with the user operating the mobile device, identifying a permission token associated with the process entity, determining a permission level based on the user identification and the permission token, and providing an interface for modifying parameters associated with the process entity to the extent indicated by the permission level. The permission level may indicate the extent to which the user is permitted to modify parameters associated with the process control entity. The target function associated with the process entity could also be an alarm inspection function, and triggering an event could include identifying the alarm and providing an indication of the alarm. The target function could be a location determination function, and the automatically triggered event could be a determination of a location associated with the process control entity and the provision of a map graphic that displays a location of the process entity within the process control environment. In embodiments, acquiring information to identify a process entity includes acquiring one or more data tags from one or more corresponding identification devices having a fixed spatial relationship relevant to a process entity in the process control environment and comprising a unique identifier. In embodiments, the context identification device is a barcode and acquiring the tag data comprises capturing an image of the barcode and analyzing the barcode to identify tag data. The context identification device may be a radio transmitter, and acquiring the tag data may include detecting a radio-frequency signal, emitted by the radio transmitter, carrying the tag data. The radio transmitter may be an NFC device, an RFID device or a personal area network device transmitting short-wavelength radio transmissions. Acquiring information to identify a process entity in the process control environment includes capturing an image uniquely associated with the process entity, in embodiments. Acquiring information may also include capturing an audio signal and determining that the audio signal is correlated to the process entity. Similarly, acquiring information may include detecting a movement pattern associated with a process entity.

Analysis of Physical Phenomena

The UI devices 112 may cooperate with the expert system 104 and the big data appliance 102, in embodiments, to analyze data related to physical phenomena. The physical phenomena that may be analyzed include (without limitation) phenomena related to light in the visible and non-visible spectra (e.g., flame color in the visible and infrared spectra) and phenomena related to vibration in the audible, sub-audible, and super-audible range (e.g., sound and other vibrations). Personnel carrying a UI device 112 equipped with a camera, accelerometers, a microphone, or other equipment may be used to capture and/or record data related to the physical phenomenon. A camera, for example, may sense and record an image in the visible or, in certain embodiments, in the infrared or other spectra. A microphone may sense and/or record audible, sub-audible, and/or super-audible vibrations communicated by air. Accelerometers may sense and/or record vibrations when the UI device 112 is placed against a piece of equipment. Any and/or all of these types of data may be sent from the UI device 112 to the expert system 104 to analyze and/or compare to data in the big data appliance 102.

Figure 32:
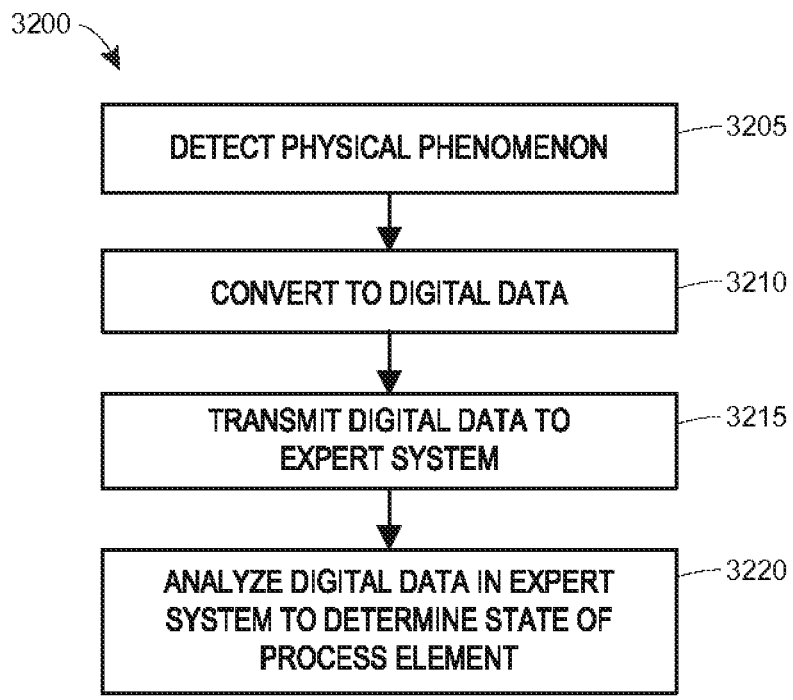
FIG. 32 is a flow chart depicting a method for analyzing physical phenomena in a process plant.

A method 3200 for analyzing physical phenomena in a process plant is depicted in FIG. 32. The method 3200 includes detecting, in a mobile device, a physical phenomenon in the process plant (block 3205). Detecting the physical phenomenon may include detecting a visual scene, detecting a sound, and/or detecting a vibration, in various embodiments. By way of example and not limitation, detecting the physical phenomenon may include detecting a visual scene including a flame, a sound associated with a combustion chamber, a sound associated with movement of a fluid, an image or video of a stack top, and/or a vibration associated with a rotating element, in various embodiments.

The method 3200 also includes converting, in the mobile device, the detected physical phenomenon to digital data representative of the physical phenomenon (block 3210). That is, taking the detected physical phenomenon (the visual scene, the sound, the vibration, etc.) and converting it to digital data, for example, in the form of a digital image, a digital video, a digital sound file, or a digital representation of the detected vibration. Further, the method 3200 includes transmitting the digital data to an expert system (block 3215) and analyzing the digital data in the expert system to determine a state of one or more process elements (block 3220). By way of example: where the detected physical phenomenon is a visual scene of a flame, analyzing the data may include analyzing the colors associated with one or more portions of the flame, analyzing the shape of the flame, and/or analyzing the movement of the flame; where the detected physical phenomenon is a sound or a vibration associated with movement of a fluid, analyzing the data may include detecting a cavitation associated with the fluid movement; where the detected physical phenomenon is a visual scene of a stack top, analyzing the data may include analyzing a color or volume of smoke emitted.

The method 3200 may also include, in various embodiments, detecting an abnormal condition associated with the one or more process elements, determining from the digital data a cause of the abnormal condition, automatically initiating a change to one or more process control parameters to correct the abnormal condition, automatically creating a work item to cause personnel to take action to correct the abnormal condition, providing to an operator an indication of a corrective action to be taken to resolve the abnormal condition, and/or determining a fuel composition associated with a flame or combustion chamber.

The following additional considerations apply to the foregoing discussion. Throughout this specification, actions described as performed by the server 150, the UI device 112, or any other device or routine generally refer to actions or processes of a processor manipulating or transforming data according to machine-readable instructions. The machine-readable instructions may be stored on and retrieved from a memory device communicatively coupled to the processor. That is, methods described herein may be embodied by a set of machine-executable instructions stored on a computer readable medium (i.e., on a memory device). The instructions, when executed by one or more processors of a corresponding device (e.g., a server, a mobile device, etc.), cause the processors to execute the method. Where instructions, routines, modules, processes, services, programs, and/or applications are referred to herein as stored or saved on a computer readable memory or on a computer readable medium, the words "stored" and "saved" are intended to exclude transitory signals.

User interface devices are referred to interchangeably in this specification as "UI devices" and "mobile UI devices." While, in most instances, these devices are referred to simply as "UI devices," in certain descriptions, the term "mobile" is added to indicate that, in a particular example use, the UI device may be a mobile UI device. The use or absence of the term "mobile" should not be considered limiting, as the concepts described herein may apply to any and all UI devices that can be used in the process plant environment.

Though many of the examples herein refer to browsers displaying information, each of the examples contemplates the use of native applications communicating with a server to provide information. The native applications may be designed for any mobile platform, for any workstation operating system, or any combination of mobile platforms and/or workstation operating systems and/or web browsers. For example, a mobile UI device may run on the Android™ platform while a cooperating stationary UI device (e.g., a workstation) may run on the Windows® 7 platform.

Further, while the terms "operator," "personnel," "person," "user," "technician," and like other terms are used to describe persons in the process plant environment that may use or interact with the systems, apparatus, and methods described herein, these terms are not intended to be limiting. As can be appreciated from the foregoing description, the systems, apparatus, and methods described herein may have the benefit or effect of freeing plant personnel, to some extent, from the traditional boundaries of process control systems. That is, operators may undertake some activities traditionally engaged in by technicians, technicians may participate in activities traditionally reserved to the operators, and the like. Where a particular term is used in the description, the term is used, in part, because of the traditional activities in which plant personnel engage, but is not intended to limit the personnel that could be engaging in that particular activity.

Additionally, throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Unless specifically stated otherwise, discussions herein using words such as "processing," "computing," "calculating," "determining," "identifying," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

When implemented in software, any of the applications, services, and engines described herein may be stored in any tangible, non-transitory computer readable memory such as on a magnetic disk, a laser disk, solid state memory device, molecular memory storage device, or other storage medium, in a RAM or ROM of a computer or processor, etc. Although the example systems disclosed herein are disclosed as including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, persons of ordinary skill in the art will readily appreciate that the examples provided are not the only way to implement such systems.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

Aspects

The following aspects of the disclosure are exemplary only and not intended to limit the scope of the disclosure.

1. A mobile user interface device for controlling a process plant, the mobile user interface device comprising: a processor communicatively coupled to a network; a memory communicatively coupled to the processor; a display communicatively coupled to the processor; a communication circuit operable to detect the proximity of the mobile user interface device to an external device; and one or more routines stored on the memory device and executable by the processor to cause the processor to: transmit, via the network, a first request for first data; receive first data, via the network, in response to the first request; cause the display to display the received first data; receive an indication that the mobile user interface device is in proximity to an external device; transmit, via the network, a second request for second data according to the received indication; and receive second data, via the network, in response to the second request.

2. A mobile user interface device according to aspect 1, wherein receiving an indication that the mobile user interface device is in proximity to an external device comprises receiving an indication that the mobile user interface device is in proximity to an additional user interface device.

3. A mobile user interface device according to either aspect 1 or aspect 2, wherein transmitting a second request for second data according to the received indication comprises transmitting to a server a request for state information of the additional user interface device and wherein receiving second data comprises receiving from the server the requested state information of the additional user interface device.

4. A mobile user interface device according to any one of aspects 1 to 3, further comprising displaying process control data from a storage area of a server according to the received state information of the additional user interface device, wherein the server is communicatively coupled to a unitary, logical data storage area including one or more data storage devices configured to store, using a common format, process data corresponding to the process plant, the process data including multiple types of process data selected from configuration data, measurement data, batch data, continuous data, and event data.

5. A mobile user interface device according to aspect 4, wherein displaying process control data from the storage area according to the received state information of the additional user interface device comprises duplicating on the display of the mobile user interface device the display of the additional user interface device.

6. A mobile user interface device according to either aspect 4 or aspect 5, wherein displaying process control data from the storage area according to the received state information of the additional user interface device comprises arranging on the display of the mobile user interface device the data displayed on the additional user interface device.

7. A mobile user interface device according to any one of aspects 1 to 6, wherein receiving an indication that the mobile user interface device is in proximity to an external device comprises receiving an indication that the mobile user interface device is in proximity to a process control device.

8. A mobile user interface device according to any one of aspects 1 to 7, wherein transmitting a second request for second data according to the received indication comprises transmitting an indication that the mobile user interface device is in proximity to the process control device, and wherein receiving second data comprises receiving process control data related to the process control device.

9. A mobile user interface device according to any one of aspects 1 to 8, wherein receiving process control data related to the process control device comprises receiving and displaying data of one or more of: (a) an alarm associated with the process control device; (b) a maintenance task associated with the process control device; (c) an diagrammatic depiction of the area of the process plant associated with the process control device; or (d) a status of an area of the process plant associated with the process control device.

10. A mobile user interface device according to any one of aspects 1 to 9, wherein receiving an indication that the mobile user interface device is in proximity to an external device comprises receiving an indication that the mobile device is in a particular area of the process plant.

11. A mobile user interface device according to any one of aspects 1 to 10, wherein transmitting a second request for second data according to the received indication comprises transmitting an indication that the mobile user interface device is in the particular area of the process plant, and wherein receiving second data comprises receiving process control data related to the particular area of the process plant.

12. A mobile user interface device according to any one of aspects 1 to 11, wherein receiving process control data related to the process control device comprises receiving and displaying data of one or more of: (a) an alarm associated with the particular area of the process plant; (b) a maintenance task associated with the particular area of the process plant; (c) a diagrammatic depiction of the particular area of the process plant; or (d) a status of an area of the process plant associated with the process control device.

13. A mobile user interface device according to any one of aspects 1 to 12, wherein the communication circuit comprises a Near Field Communication (NFC) circuit.

14. A mobile user interface device according to any one of aspects 1 to 13, wherein the communication circuit comprises a radio frequency identification (RFID) circuit.

15. A mobile user interface device according to any one of aspects 1 to 14, wherein the communication circuit comprises a Bluetooth circuit.

16. A mobile user interface device according to any one of aspects 1 to 15, wherein the communication circuit comprises a circuit operating according to an IEEE 802.11 protocol.

17. A mobile user interface device according to any one of aspects 1 to 16, wherein the communication circuit comprises a circuit operating according to the Wireless HART protocol.

18. A method performed by a mobile user interface device for a process plant, the method comprising: transmitting, via a network, a first request for first data from a data storage area; receiving, in response to the first request, first data from the storage area; causing a display of the mobile user interface device to display the received first data; receiving an indication that the mobile user interface device is in proximity to an external device; transmitting a second request for second data according to the received indication; and receiving second data in response to the second request.

19. A method according to aspect 18, wherein receiving an indication that the mobile user interface device is in proximity to an external device comprises receiving an indication that the mobile user interface device is in proximity to an additional user interface device.

20. A method according to either aspect 18 or aspect 19, wherein transmitting a second request for second data according to the received indication comprises transmitting to a server a request for state information of the additional user interface device and wherein receiving second data comprises receiving from the server the requested state information of the additional user interface device.

21. A method according to any one of aspects 18 to 20, further comprising displaying process control data from the storage area according to the received state information of the additional user interface device.

22. A method according to any one of aspects 18 to 21, wherein displaying process control data from the storage area according to the received state information of the additional user interface device comprises duplicating on the display of the mobile user interface control device the display of the additional user interface device.

23. A method according to any one of aspects 18 to 22, wherein displaying process control data from the storage area according to the received state information of the additional user interface device comprises arranging on the display of the mobile user interface device the data displayed on the additional user interface device.

24. A method according to any one of aspects 18 to 23, wherein receiving an indication that the mobile user interface device is in proximity to an external device comprises receiving an indication that the mobile user interface device is in proximity to a process control device.

25. A method according to any one of aspects 18 to 24, wherein transmitting a second request for second data according to the received indication comprises transmitting an indication that the mobile user interface device is in proximity to the process control device, and wherein receiving second data comprises receiving process control data related to the process control device.

26. A method according to any one of aspects 18 to 25, wherein receiving process control data related to the process control device comprises receiving and displaying data of one or more of: (a) an alarm associated with the process control device; (b) a maintenance task associated with the process control device; (c) an diagrammatic depiction of the area of the process plant associated with the process control device; or (d) a status of an area of the process plant associated with the process control device.

27. A method according to any one of aspects 18 to 26, wherein receiving an indication that the mobile user interface device is in proximity to an external device comprises receiving an indication that the mobile user interface device is in a particular area of the process plant.

28. A method according to any one of aspects 18 to 27, wherein transmitting a second request for second data according to the received indication comprises transmitting an indication that the mobile user interface device is in the particular area of the process plant, and wherein receiving second data comprises receiving process control data related to the particular area of the process plant.

29. A method according to any one of aspects 18 to 28, wherein receiving process control data related to the process control device comprises receiving and displaying data of one or more of: (a) an alarm associated with the particular area of the process plant; (b) a maintenance task associated with the particular area of the process plant; (c) a diagrammatic depiction of the particular area of the process plant; or (d) a status of an area of the process plant associated with the process control device.

30. A method according to any one of aspects 18 to 29, wherein the communication circuit comprises a Near Field Communication (NFC) circuit.

31. A method according to any one of aspects 18 to 30, wherein the communication circuit comprises a radio frequency identification (RFID) circuit.

32. A method according to any one of aspects 18 to 31, wherein the communication circuit comprises a Bluetooth circuit.

33. A method according to any one of aspects 18 to 32, wherein the communication circuit comprises a circuit operating according to an IEEE 802.11 protocol.

34. A method according to any one of aspects 18 to 33, wherein the communication circuit comprises a circuit operating according to the Wireless HART protocol.

35. A computer-readable medium storing instructions, executable by a processor in a mobile user interface device for controlling a process plant, the instructions operable to cause the processor to: transmit to a server a first request for first data from a data storage area; receive from the server, in response to the first request, first data from the storage area; cause the display to display the first data received from the server; receive an indication that the mobile user interface device is in proximity to an external device; transmit to the server a second request for second data according to the received indication; and receive from the server, in response to the second request, second data.

36. A computer-readable medium according to aspect 35, wherein the instructions for causing the processor to receive an indication that the mobile user interface device is in proximity to an external device comprise instructions for causing the processor to receive an indication that the mobile user interface device is in proximity to an additional user interface device.

37. A computer-readable medium according to either aspect 35 or aspect 36, wherein the instructions for causing the processor to transmit to the server a second request for second data according to the received indication comprise instructions for causing the processor to transmit a request for state information of the additional user interface device and wherein the instructions for causing the processor to receive from the server second data comprise instructions for causing the processor to receive the requested state information of the additional user interface device.

38. A computer-readable medium according to any one of aspects 35 to 37, further comprising instructions for causing the processor to display process control data from the storage area according to the received state information of the additional user interface device.

39. A computer-readable medium according to any one of aspects 35 to 38, wherein instructions for causing the processor to display process control data from the storage area according to the received state information of the additional user interface device comprise instructions for causing the processor to duplicate on the display of the mobile user interface device the display of the additional user interface device.

40. A computer-readable medium according to any one of aspects 35 to 39, wherein instructions for causing the processor to display process control data from the storage area according to the received state information of the additional user interface device comprise instructions for causing the processor to arrange on the display of the mobile user interface device the data displayed on the additional user interface device.

41. A computer-readable medium according to any one of aspects 35 to 40, wherein instructions for causing the processor to receive an indication that the mobile user interface device is in proximity to an external device comprise instructions for causing the processor to receive an indication that the mobile user interface device is in proximity to a process control device.

42. A computer-readable medium according to any one of aspects 35 to 41, wherein instructions for causing the processor to transmit to the server a second request for second data according to the received indication comprise instructions for causing the processor to transmit to the server an indication that the mobile user interface device is in proximity to the process control device, and wherein instructions for causing the processor to receive second data comprise instructions for causing the processor to receive process control data related to the process control device.

43. A computer-readable medium according to any one of aspects 35 to 42, wherein instructions for causing the processor to receive process control data related to the process control device comprise instructions for causing the processor to receive and display data of one or more of: (a) an alarm associated with the process control device; (b) a maintenance task associated with the process control device; (c) an diagrammatic depiction of the area of the process plant associated with the process control device; or (d) a status of an area of the process plant associated with the process control device.

44. A computer-readable medium according to any one of aspects 35 to 43, wherein instructions for causing the processor to receive an indication that the mobile user interface device is in proximity to an external device comprise instructions for causing the processor to receive an indication that the mobile user interface device is in a particular area of the process plant.

45. A computer-readable medium according to any one of aspects 35 to 44, wherein instructions for causing the processor to transmit to the server a second request for second data according to the received indication comprise instructions for causing the processor to transmit to the server an indication that the mobile user interface control device is in the particular area of the process plant, and wherein instructions for causing the processor to receive second data comprise instructions for causing the processor to receive process control data related to the particular area of the process plant.

What is claimed is:

1. A method comprising:
    receiving, at a mobile user interface device, a unique identifier transmitted from an external device in a plant environment, the unique identifier: (i) indicating that the mobile user interface device is in proximity to the external device, and (ii) stored to a database as being associated with one or more process entities relevant to an area in which the external device is disposed; and
    responding to receiving the unique identifier by;
        (i) identifying a process control device associated with the unique identifier; and
        (ii) causing the mobile user interface device to render a user interface interactable to modify a parameter at a process controller utilized to control the process control device associated with the unique identifier.

2. The method of claim 1, wherein receiving the unique identifier comprises receiving, the unique identifier via a near-field communication (NFC) circuit.

3. The method of claim 1, wherein receiving the unique identifier comprises receiving the unique identifier via a radio frequency identification (RFID) circuit.

4. The method of claim 1, wherein receiving the unique identifier comprises receiving the unique identifier via a circuit configured for wireless communication in a frequency between 2,400 MHz and 2,480 MHz.

5. The method of claim 1, wherein receiving the unique identifier comprises receiving the unique identifier via a circuit configured to operate according to an IEEE 80.2.11 protocol.

6. The method of claim 1, wherein receiving the unique identifier comprises receiving the unique identifier via a circuit configured to operate according by way of a wireless process control protocol.

7. The method of claim 1, wherein the external device is a context identification (ID) device.

8. The method of claim 1, wherein the mobile user interface device is a first mobile user interface device and wherein the external device is a second mobile user interface device.

9. The method of claim 8, further comprising:
    duplicating, via the user interface displayed at the first mobile user interface device, the display provided via the second mobile user interface device.

10. The method of claim 1, further comprising displaying, via the user interface, one or more of:
    an alarm associated with the process control device;
    a task associated with the process control device;
    a. diagrammatic depiction of an area of the process plant associated with the process control device; or
    a status of the area of the process plant associated with the process control device.

11. A mobile user interface device for controlling a process plant, the mobile user interface device comprising:
    one or more processors;
    a display coupled to the one or more processors;
    a communication circuit coupled to the one or more processors; and
    a memory coupled to the one or more processors and storing computer-readable instructions that, when executed, cause the one or more processors to:
    (a) receive, via the communication circuit, a unique identifier transmitted from an external device in a plant environment, the unique identifier: (i) indicating that the mobile user interface device is in proximity to the external device, and (ii) stored to a database as being associated with one or more process entities relevant to an area in which the external device is disposed; and
    (b) respond to receiving the unique identifier by causing the one or more processors to:
        (i) identify a process control device associated with the unique identifier; and
        (ii) render, via the display, a user interface interactable to modify a parameter at a process controller utilized to control the process control device associated with the unique identifier.

12. The mobile user interface device of claim 11, wherein the communication circuit includes a near-field communication (NFC) circuit and wherein receiving the unique identifier comprises receiving the unique identifier via the NFC circuit.

13. The mobile user interface device of claim 11, wherein the communication circuit includes a radio frequency identification (RFID) circuit and wherein receiving the unique identifier comprises receiving the unique identifier via the RFID circuit.

14. The mobile user interface device of claim 11, wherein the communication circuit includes a particular circuit configured for wireless communication in a frequency between 2,400 MHz and 2,480 MHz and wherein receiving the unique identifier comprises receiving the unique identifier via the particular circuit.

15. The mobile user interface device of claim 11, wherein the communication circuit includes a particular circuit configured to operate according to an IEEE 802.11 protocol and wherein receiving the unique identifier comprises receiving the unique identifier via the particular circuit.

16. The mobile user interface device of claim 11, wherein the communication circuit includes a wireless process control circuit configured to operate according by way of a wireless process control protocol and wherein receiving the unique identifier comprises receiving the unique identifier via the wireless process control circuit.

17. The mobile user interface device of claim 11, wherein the external device is a context identification (ID) device.

18. The mobile user interface device of claim 11, wherein the mobile user interface device is a first mobile user interface device and wherein the external device is a second mobile user interface device.

19. The mobile user interface device of claim 18, wherein the memory further includes computer-readable instructions that, when executed, cause the one or more processors to:
   duplicate, via the user interface displayed at the display of the first mobile user interface device, the display provided via the second mobile user interface device.

20. The mobile user interface device of claim 11, wherein the memory further includes computer-readable instructions that, when executed, cause the one or more processors to display via the user interface rendered via the display:
   an alarm associated with the process control device;
   a task associated with the process control device;
   a diagrammatic depiction of an area of the process plant associated with the process control device; or
   a status of the area of the process plant associated with the process control device.

\* \* \* \* \*